(12) United States Patent
Ikedo et al.

(10) Patent No.: US 10,607,490 B2
(45) Date of Patent: Mar. 31, 2020

(54) DRIVING SUPPORT APPARATUS

(71) Applicant: TOYOTA JIDOSHA KABUSHIKI KAISHA, Toyota-shi, Aichi (JP)

(72) Inventors: Yuji Ikedo, Sunto-gun (JP); Tomonori Akiyama, Susono (JP); Ryo Morishita, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 15/717,052

(22) Filed: Sep. 27, 2017

(65) Prior Publication Data

US 2018/0144637 A1 May 24, 2018

(30) Foreign Application Priority Data

Nov. 18, 2016 (JP) .................. 2016-224957

(51) Int. Cl.
*G08G 1/052* (2006.01)
*G08G 1/01* (2006.01)
(Continued)

(52) U.S. Cl.
CPC ............. *G08G 1/166* (2013.01); *B60Q 9/008* (2013.01); *G01S 13/87* (2013.01); *G01S 13/931* (2013.01); *G08G 1/0112* (2013.01); *G08G 1/0133* (2013.01); *G08G 1/04* (2013.01); *G08G 1/052* (2013.01); *G08G 1/056* (2013.01);
(Continued)

(58) Field of Classification Search
None
See application file for complete search history.

(56) References Cited

U.S. PATENT DOCUMENTS 9,043,132 B2 * 5/2015 Obi .................. G01S 13/931
701/400
2012/0035846 A1 2/2012 Sakamoto et al.
(Continued)

FOREIGN PATENT DOCUMENTS

JP 2010-079424 A 4/2010
JP 2010-250501 A 11/2010
(Continued)

OTHER PUBLICATIONS

Jan. 31, 2019 Decision to Grant issued in Japanese Patent Application No. 2016-224957.

*Primary Examiner* — Genna M Mott
*Assistant Examiner* — Melanie J Patrick
(74) *Attorney, Agent, or Firm* — Oliff PLC

(57) ABSTRACT

A driving support apparatus estimates an expected route of an own vehicle, calculates an effective length of the expected route, and alerts a driver of the own vehicle when it is determined that there exists an object which crosses a part within the effective length within a predetermined time. A formula of a circle with a radius of an estimated turning radius is used for an expected route formula expressing the expected route. Once it is determined that the own vehicle is trying to start turning left or right, the driving support apparatus calculates a turning angle of the own vehicle, and calculates the effective length of the expected route using a value based on a product of the estimated turning radius and a remaining turning angle which is an angle obtained by subtracting the turning angle from a predetermined angle.

10 Claims, 14 Drawing Sheets

(51) Int. Cl.

| | |
|---|---|
| *G08G 1/16* | (2006.01) |
| *G01S 13/931* | (2020.01) |
| *G01S 13/87* | (2006.01) |
| *B60Q 9/00* | (2006.01) |
| *G08G 1/04* | (2006.01) |
| *G08G 1/056* | (2006.01) |
| *B60Q 1/36* | (2006.01) |

(52) U.S. Cl.
CPC ........... *B60Q 1/36* (2013.01); *B60Y 2400/303* (2013.01); *B60Y 2400/304* (2013.01); *B60Y 2400/3017* (2013.01); *B60Y 2400/83* (2013.01); *G01S 2013/932* (2020.01); *G01S 2013/93271* (2020.01); *G01S 2013/93274* (2020.01); *G08G 1/0116* (2013.01)

(56) References Cited

U.S. PATENT DOCUMENTS

| | | | |
|---|---|---|---|
| 2014/0028451 A1 | 1/2014 | Takahashi et al. | |
| 2014/0303868 A1* | 10/2014 | Otake | B60W 30/181 701/70 |
| 2015/0371662 A1 | 12/2015 | Togawa et al. | |
| 2016/0140847 A1 | 5/2016 | Kawamata et al. | |
| 2018/0056995 A1* | 3/2018 | Deng | B62D 15/025 |

FOREIGN PATENT DOCUMENTS

| | | |
|---|---|---|
| JP | 5435172 B2 | 3/2014 |
| JP | 2015-170233 A | 9/2015 |
| JP | 2016-006440 A | 1/2016 |
| JP | 2016-095697 A | 5/2016 |

* cited by examiner

DRIVING SUPPORT APPARATUS

TECHNICAL FIELD

The present invention relates to a driving support apparatus comprising a function to alert a driver of a vehicle when there is a possibility that an object crosses a route through which the vehicle is expected to pass (hereinafter, simply referred to as an "expected route") under a situation where the vehicle turns left or right at a place where the turning is allowed.

BACKGROUND ART

A driving support apparatus mounted in a vehicle which is configured to alert a driver of the vehicle when there is a possibility that an object crosses an expected route of the vehicle has been conventionally known (Hereinafter, a vehicle in which the driving support apparatus is mounted may be also referred to as an "own vehicle".). This kind of driving support apparatus estimates the expected route of the own vehicle in front of the own vehicle based on a traveling direction of the own vehicle. Then, the driving support apparatus is configured to determine that there is a possibility that an object crosses the expected route of the own vehicle when it is estimated that the object intersects this expected route within a predetermined time, or the object exists in a virtual region set on and around this expected route within a predetermined time, or the like, and to alert the driver of the own vehicle. Therefore, it is important to properly estimate an expected route of the own vehicle in order to properly alert the driver of the own vehicle.

For example, an apparatus disclosed in Japanese Patent Application Laid-Open (kokai) No. 2016-6440 (hereinafter, referred to as a "prior art apparatus") determines whether or not the own vehicle is in a state where the own vehicle is actually turning left or right (hereinafter, may be also simply referred to as a "turning-right-or-left-state") at a place where the turning is allowed (hereinafter, may be simply referred to as a "turning place"). Further, the prior art apparatus estimates a curved expected route along an actual traveling route of the own vehicle when the own vehicle is determined to be in the turning-right-or-left-state, and sets the aforementioned virtual region (This region is referred to as a "target region" in Japanese Patent Application Laid-Open (kokai) No. 2016-6440.) based on the expected route.

It should be noted that in the present specification, "a vehicle turns left" means a series of actions that the vehicle tries to start turning left and thereafter actually turns left to finish turning left, and "a vehicle turns right" means a series of actions that the vehicle tries to start turning right and thereafter actually turns right to finish turning right.

More specifically, the prior art apparatus comprises a direction indicator sensor for detecting an operating state of a direction indicator, a GPS (Global Positioning System) sensor for detecting a current position of the own vehicle, and a memory in which a map information including a position and a shape of the turning place and the like is stored. In this map information, a point referred to as an "exit point" is registered in advance at an exit of each turning place.

The prior art apparatus determines that the own vehicle is in the turning-right-or-left-state when the direction indicator sensor has detected that the direction indicator is in the operating state. When the prior art apparatus determines that the own vehicle is in the turning-right-or-left-state, the prior art apparatus determines whether or not the own vehicle is positioned at the turning place based on the current position of the own vehicle acquired from the GPS sensor and the map information stored in the memory. Thereafter, when the prior art apparatus determines that the own vehicle is positioned at the turning place, the prior art apparatus estimates all possible routes from the current position of the own vehicle to the aforementioned exit point as estimated routes, and sets these estimated routes and their surroundings as the virtual region. Therefore, it is disclosed in Japanese Patent Application Laid-Open (kokas) No. 2016-6440 that the prior art apparatus can properly alert the driver of the own vehicle.

SUMMARY OF THE INVENTION

However, according to the prior art apparatus, when the turning place is positioned at a place where the GPS sensor cannot be used (for example, a place where an upper part of the own vehicle is covered with some shield) and/or a place which is not included in the map information (for example, a newly constructed road), it is impossible to property estimate the expected route of the own vehicle. Therefore, in such cases, the prior art apparatus cannot properly alert the driver. Hereinafter, a self position estimation using the map information and GNSS (Global Navigation Satellite System) including OPS may be also simply referred to as a "self position estimation by GNSS".

The problem mentioned above may arise in an apparatus which determines whether or not the own vehicle is positioned at the turning place by performing wireless communication (road-vehicle communication) between a roadside machine and a communication apparatus mounted on the own vehicle. That is, the own vehicle cannot acquire the information from the roadside machine at a turning place where the roadside machine is not placed and thus it is impossible to properly estimate the expected route of the own vehicle. Hereinafter, a self position estimation using the road-vehicle communication may be also simply referred to as a "self position estimation by wireless communication".

The present invention is made in order to resolve the problem above. That is, one of objects of the present invention is to provide a driving support apparatus capable of more properly alerting a driver of an own vehicle when the own vehicle is in a turning-right-or-left-state at a turning place even in a case where a self position estimation by GNSS and/or wireless communication cannot be performed.

A driving support apparatus of the present invention comprises,
  object information acquisition means (steps 1002, 1302) for acquiring object information including a position of an object existing around an own vehicle (100) with respect to the own vehicle (100), a moving direction of the object, and a moving speed of the object, using a first sensor apparatus (16L, 18R) mounted in the own vehicle (100);
  own vehicle information acquisition means (step 601) for acquiring own vehicle information including an own vehicle speed (V) which is a vehicle speed of the own vehicle (100), a yaw rate (Y) of the own vehicle (100), and a direction indicator signal showing a state of a direction indicator of the own vehicle (100), using a second sensor apparatus (15, 17, 13L, 13R) mounted in the own vehicle (100);
  turning-right-or-left-start-determination-means (steps 602, 802) for determining whether or not the own vehicle (100) is trying to start turning left or right based on the own vehicle information;

expected route estimation means (steps 624, 824) for estimating an expected route of the own vehicle (100) at a current point in time based on the own vehicle speed (V) and the yaw rate (Y) once it is determined that the own vehicle (100) is trying to start turning left or right;

alert request means (steps 1014, 1320) for generating a request signal to alert the driver of the own vehicle (100) based on the object information and the expected route; and alerting means (20, 21, 30, 31) for conducting an operation to alert the driver in response to the request signal.

In addition, the expected route estimation means is configured to use a formula of a circle as an expected route formula (fL, fR) expressing the expected route.

In this case, a center ((Cx, Cy)) of the circle is positioned at a position shifted from a current position (OL, OR) of the own vehicle (100) in a direction perpendicular to a traveling direction (TD) of the own vehicle (100) at a current point in time by a length of an estimated turning radius (RL, RR) estimated using at least the yaw rate (Y) at a current point in time to a left side with respect to the traveling direction (TD) when the own vehicle (100) is turning left and to a right side with respect to the traveling direction (TD) when the own vehicle (100) is turning right.

Further, a radius of the circle is the estimated turning radius (RL, RR).

According to this configuration, the alerting of the driver can be conducted by using "the object information and the own vehicle information" acquired by the sensor apparatuses mounted in the own vehicle even in a case where a self position estimation by GNSS and/or wireless communication cannot be performed.

However, when the expected route is estimated using a formula of a circle as mentioned above, it is necessary to consider that how far of the expected route should be set as a part to be a target of the alerting. That is, for example, in a case where a length of the expected route is set to a constant value, when a turning angle of the own vehicle at the turning place becomes large, there is a case that a front end of the expected route exceeds "a region which the own vehicle is supposed to enter by turning (a traffic lane on which the own vehicle is supposed to travel after turning left or right, for example)". In other words, there is a possibility that the expected route exceeds a traffic lane which the own vehicle is supposed to enter and intrudes into an opposite lane to this traffic lane or a pavement/sidewalk adjacent to this opposite lane. As a result, there is a possibility that an object originally unnecessary to be alerted to is erroneously determined to be an object (a target object of alerting) necessary to alert to, and therefore a proper alerting cannot be conducted.

When the own vehicle is turning left or right at the turning place, the turning angle after the turning left or right is started becomes gradually large, and therefore the turning angle necessary to finish this turning left or right (that is, a remaining turning angle) becomes gradually small. Thus, a length (an effective length of the expected route) of the expected route of a part which is to be a target of the alerting should become smaller as the turning left or right progresses.

Therefore, the alert request means is configured to;

calculate (steps 614, 814) a turning angle (θtotal) of the own vehicle (100) from a point in time when a determination that the own vehicle (100) is trying to start turning left or right is made by the turning-right-or-left-start-determination-means (steps 602, 802) to a current point in time, using at least the yaw rate (Y);

calculate (steps 626, 826) a value based on a product of the estimated turning radius (R, Rest) and a remaining turning angle which is an angle obtained by subtracting the calculated turning angle (θtotal) from a predetermined angle as an effective length (LLe, LRe) of the expected route;

determine whether or not there exists a target object of alerting which is an object which crosses a part within the effective length (LLe, LRe) of the expected route within a predetermined time, using the object information; and generate (steps 1014, 1320) the request signal when it is determined that there exists the target object of alerting.

According to this configuration, the effective length of the expected route is calculated using the value based on the product of the aforementioned estimated turning radius and the remaining turning angle (the predetermined angle−the turning angle) which is an angle obtained by subtracting "the turning angle of the own vehicle from a point in time when the determination that the own vehicle is trying to start turning left or right is made to a current point in time" from "the predetermined angle (a turning angle generally required to turn left or right, which is typically 90°)". When it is determined that there exists an object which crosses a part within the effective length of the expected route within the predetermined time, the request signal is generated and the alerting is conducted. That is, according to the driving support apparatus of the present invention, the effective length of the expected route is calculated based on the turning angle of the vehicle, and the effective length thereof becomes shorter as the turning angle becomes larger.

Therefore, a possibility that a part within the effective length of the expected route (in other words, a frond end of the expected route) exceeds a traffic lane which the own vehicle is supposed to enter and intrudes into an opposite lane to this traffic lane or a pavement/sidewalk adjacent to this opposite lane can be greatly reduced. Thus, a possibility that the driver is unnecessarily alerted when the own vehicle is in the turning-right-or-left-state at the turning place even in a case where a self position estimation by GNSS and/or wireless communication cannot be performed and therefore a more proper alerting of the driver can be conducted.

In another aspect of the driving support apparatus according to the present invention, the turning-right-or-left-start-determination-means (steps 602, 802) is configured to determine that the own vehicle (100) is trying to start turning left or right when it is determined that any one of at least one of following three conditions;

a condition which is satisfied in a case when the direction indicator signal shows that the direction indicator has changed from a non-operating state to an operating state when own vehicle speed (V) is more than or equal to a predetermined first vehicle speed threshold (V1th) and is less than or equal to a predetermined second vehicle speed threshold (V2th) greater than the first vehicle speed threshold, a condition which is satisfied in a case when the own vehicle speed (V) has become more than or equal to the first vehicle speed threshold (V1th) and less than or equal to the second vehicle speed threshold (V2th) when the direction indicator signal shows that the direction indicator is in the operating state, and a condition which is satisfied in a case when the direction indicator signal shows that the direction indicator has changed from the non-operating state to the operating state at a same time of the own vehicle speed (V) becoming more than or equal to the first vehicle speed threshold (V1th) and less than or equal to the second vehicle speed threshold (V2th).

According to this configuration, a determination of whether or not the own vehicle is trying to start turning left or right can be properly made.

In another aspect of the driving support apparatus according to the present invention, the expected route estimation means is configured to;

estimate (steps 624, 824) a left side expected route through which a left end (OL) of the own vehicle (100) at a current point in time is expected to pass and a right side expected route through which a right end (OR) of the own vehicle (100) at a current point in time is expected to pass as the expected routes; and use a formula of a circle as a left side expected route formula (fL) expressing the left side expected route and a right side expected route formula (fR) expressing the right side expected route.

In addition, a center (Cx, Cy) of a circle of the left side expected route formula (fL) is positioned at a position shifted from the left end (OL) of the own vehicle (100) in a direction perpendicular to a traveling direction (TD) of the own vehicle (100) at a current point in time by a length of a left side turning radius (RL) which is a turning radius of the left end (OL) calculated as the estimated turning radius to a left side with respect to the traveling direction (TD) when the own vehicle (100) is turning left and to a right side with respect to the traveling direction (TD) when the own vehicle is turning right, and a radius of the circle is the left side turning radius (RL), a center (Cx, Cy) of a circle of the right side expected route formula (fR) is positioned at a position shifted from the right end (OR) of the own vehicle (100) in a direction perpendicular to a traveling direction (TD) of the own vehicle (100) at a current point in time by a length of a right side turning radius (RR) which is a turning radius of the right end (OR) calculated as the estimated turning radius to a left side with respect to the traveling direction (TD) when the own vehicle (100) is turning left and to a right side with respect to the traveling direction (TD) when the own vehicle (100) is turning right, and a radius of the circle is the right side turning radius (RR).

Further, the alert request means (steps 626, 826) is configured to;

calculate a value based on a product of the left side turning radius (RL) and the remaining turning angle as the effective length (LLe) of the left side expected route; and calculate a value based on a product of the right side turning radius (RR) and the remaining turning angle as the effective length (LRe) of the right side expected route.

In this configuration, the expected route estimation means individually estimates the left side expected route which is an expected route of the left end of the own vehicle and the right side expected route which is an expected route of the right end of the own vehicle. The left side expected route and the right side expected route constitute edges of a region through which a body of the own vehicle is expected to pass. Therefore, for example, in comparison to a configuration where an expected route through which a center of the own vehicle in a vehicle width direction is expected to pass is estimated, it becomes possible to estimate expected routes closer to an actual traveling route of the own vehicle. As a result, a determination of whether or not the alerting is necessary can be made with a higher accuracy. In addition, the alert request means uses, as the estimated turning radius, the left side turning radius for the left side expected route and the right side turning radius for the right side expected route when calculating the effective lengths of the expected routes. Therefore, the effective length of the left side expected route and the effective length of the right side expected route can be properly calculated. According to this configuration as well, a determination of whether or not the alerting is necessary can be made with a higher accuracy.

In another aspect of the driving support apparatus according to the present invention, the alert request means is configured to;

calculate (step 1004) a formula (g) of a straight line extending toward a moving direction of the object at a current point in time based on the object information acquired by the object information acquisition means;

in a case when a straight line expressed by the formula (g) of a straight line crosses at least one of a part within the effective length (LLe) of the left side expected route and a part within the effective length (LRe) of the right side expected route at one or two first intersection points, when a number of the first intersection points is two, calculate (step 1010) a first time (t1) required for the object to reach a first intersection point (P) at which the straight line first crosses in the moving direction of the object at a current point in time, and when the number of the first intersection points is one, calculate (step 1010) a first time (t1) required for the object to reach the first intersection point; and in a case when a time condition that the first time (t1) is less than or equal to a first predetermined time is satisfied, determine that there exists the target object of alerting, and generate (step 1014) the request signal.

According to this configuration, the alert request means calculates the first time only when the straight line extending toward the moving direction of the object at a current point in time crosses a part within the effective length of the expected route, and does not calculate the first time when the straight line extending toward the moving direction of the object at a current point in time crosses a part other than the effective length of the expected route. Therefore, a processing time can be shortened. In addition, in the aforementioned configuration, when a number of the first intersection points is two, the alert request means calculates the first time only regarding a first intersection point at which the aforementioned straight line first crosses a part within the effective length of the expected route in the moving direction of the object at a current point in time. Therefore, in comparison to a configuration where the alert request means calculates the first time regarding a first intersection point at which this straight line crosses a part within the effective length of the expected route second time in the moving direction of the object at a current point in time, a determination of whether or not the alerting is necessary can be made faster. Therefore, a more proper alerting of the driver can be conducted.

In another aspect of the driving support apparatus according to the present invention, the alert request means is configured to;

calculate (step 1304) a formula (g) of a straight line extending toward a moving direction of the object at a current point in time based on the object information acquired by the object information acquisition means;

in a case when a straight line expressed by the formula (g) of a straight line crosses at least one of a first circle expressed by the left side expected route formula (fL)

and a second circle expressed by the right side expected route formula (fR) at two or four second intersection points,
  when a number of the second intersection points is four,
    identify two second intersection points (Q1, Q2) from among the four second intersection points at which the straight line expressed by the formula (g) of a straight line crosses the first circle or the second circle at a portion where the straight line enters a target region (r) which is a region between the first circle and the second circle from outside the target region (r) in the moving direction of the object at a current point in time,
    compare a length (LL1, LL2) of the left side expected route from the left end (OL) of the own vehicle (100) to an intersection point positioned on the left side expected route among the two identified intersection points (Q1, Q2) in a turning direction of the own vehicle (100) with a length (LR1, LR2) of the right side expected route from the right end (OR) of the own vehicle (100) to an intersection point positioned on the right side expected route among the two identified intersection points (Q1, Q2) in a turning direction of the own vehicle (100),
    extract (step 1312) an intersection point with a shorter length from among the two intersection points (Q1, Q2) as a target intersection point (Qt), and
    calculate (step 1314) a second time (t2) required for the object to reach the extracted target intersection point (Qt),
  when a number of the second intersection points is two,
    extract a second intersection point (Q) from among the two second intersection points at which the straight line expressed by the formula (g) of a straight line crosses the first circle or the second circle at a portion where the straight line enters the target region (r) from outside the target region (r) in the moving direction of the object at a current point in time,
    calculate (step 1314) a second time (t2) required for the object to reach the extracted intersection point (Q),
  determine (step 1316) whether or not a time condition that the second time (t2) is less than or equal to second predetermined time is satisfied, and
  in a case when a length condition is satisfied, the length condition being a condition that a length (LLt, LL) of the left side expected route from the left end (OL) of the own vehicle (100) to an intersection point (Qt, Q) at which the time condition is determined to be satisfied in a turning direction of the own vehicle (100) is less than or equal to the left side effective length (LLe) of the left side expected route when the determined intersection point (Qt, Q) is positioned on the left side expected route, or a length (LRt, LR) of the right side expected route from the right end (OR) of the own vehicle (100) to an intersection point (Qt, Q) at which the time condition is determined to be satisfied in a turning direction of the own vehicle (100) is less than or equal to the right side effective length (LRe) of the right side expected route when the determined intersection point (Qt, Q) is positioned on the right side expected route, determine that there exists the target object of alerting, and generate (step 1320) the request signal.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

First Embodiment

Figure 1:
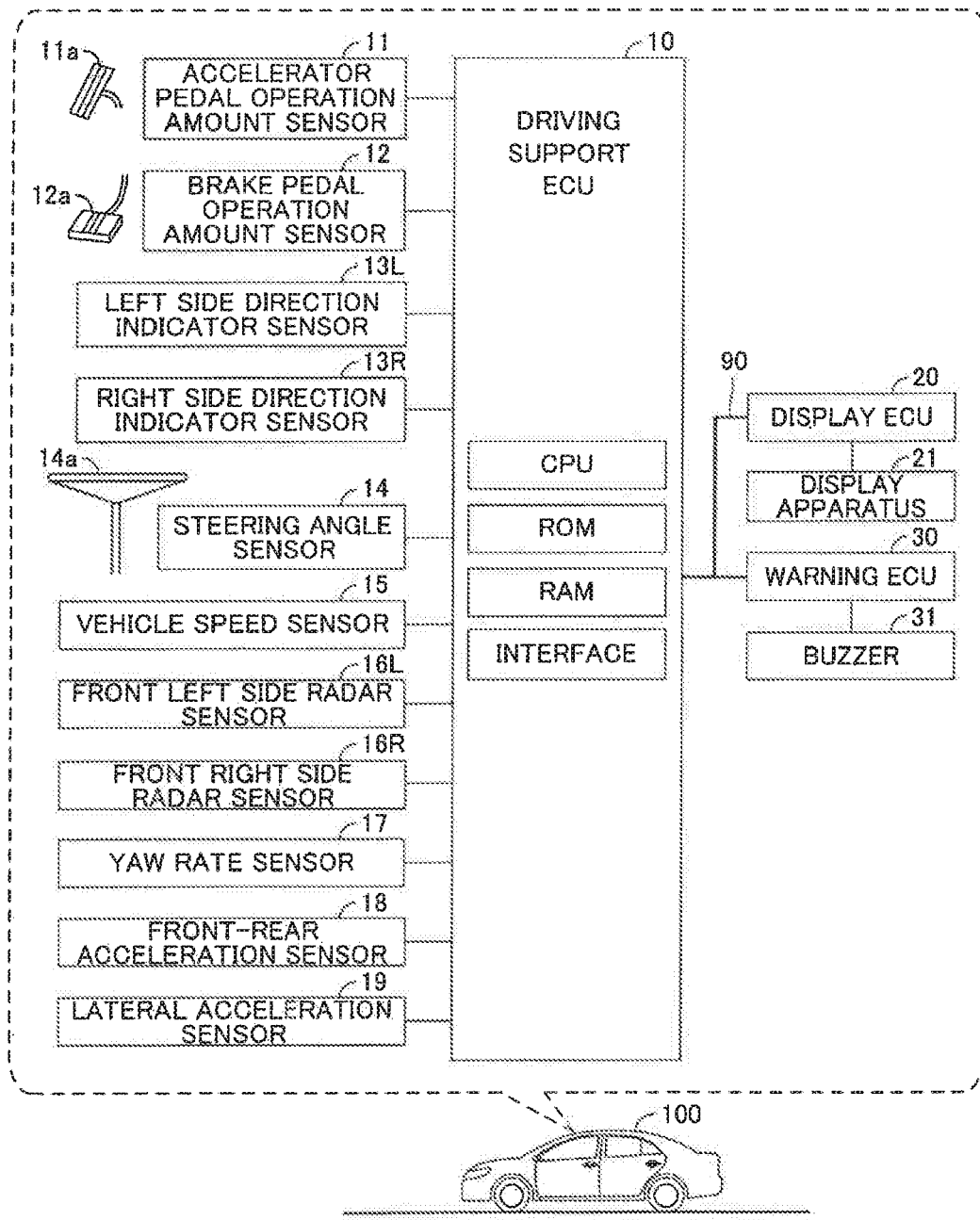
FIG. 1 is a diagram showing a driving support apparatus (hereinafter, referred to as a "first embodiment apparatus") according to a first embodiment of the present invention and a vehicle to which this driving support apparatus is applied.

A driving support apparatus (hereinafter, referred to as a "first embodiment apparatus") of a vehicle according to a first embodiment will be described below, referring to figures. The first embodiment apparatus is applied to a vehicle 100 shown in FIG. 1. The first embodiment apparatus comprises a driving support ECU 10, a display ECU 20, and a warning ECU 30.

ECU is an abbreviation of Electric Control Unit, and each of the ECU 10, 20, and 30 is an electronic control circuit having a microcomputer including CPU, ROM, RAM, an interface I/F, and the like as main components. The CPU is configured to realize/perform various functions mentioned later by executing instructions (i.e., programs or routines) stored in a memory (the ROM). These ECUs may be integrated into one ECU.

The driving support ECU 10, the display ECU 20, and the warning ECU 30 are connected to each other in such a manner that they can mutually exchange data (communicate) via a communication/sensor type of CAN (Controller Area Network) 90. Hereinafter, the driving support ECU 10 may be also referred to as a "DSECU 10".

The vehicle 100 comprises a winker lever (illustration omitted). The winker lever is arranged at a steering column and is operated by a driver. When the driver moves the winker lever toward one direction from a regular position, non-illustrated a pair of direction indicators (hereinafter, referred to as "a pair of left side direction indicators") provided at a front left end part and a rear left end part of the vehicle 100, respectively change from an unlit state (a non-operating state) to a blinking state (an operating state). When the driver moves the winker lever back to the regular position, a pair of the left side direction indicators change from the blinking state to the unlit state.

On the other hand, when the driver moves the winker lever toward an other direction from the regular position, non-illustrated a pair of direction indicators (hereinafter, referred to as "a pair of right side direction indicators") provided at a front right end part and a rear right end part of the vehicle 100, respectively change from the unlit state (the non-operating state) to the blinking state (the operating state). When the driver moves the winker lever back to the regular position, a pair of the right side direction indicators change from the blinking state to the unlit state.

The vehicle 100 comprises an accelerator pedal operation amount sensor 11, a brake pedal operation amount sensor 12, a left side direction indicator sensor 13L, a right side direction indicator sensor 13R, a steering angle sensor 14, a vehicle speed sensor 15, a front left side radar sensor 16L, a front right side radar sensor 16R, a yaw rate sensor 17, a front-rear acceleration sensor 18, and a lateral acceleration sensor 19. These sensors are connected to the DSECU 10.

The accelerator pedal operation amount sensor 11 is configured to detect an operation amount AP [%] of an accelerator pedal 11a, and output to the DSECU 10 a signal (one example of "own vehicle information") representing the operation amount (hereinafter, referred to as an "accelerator pedal operation amount") AP. The DSECU 10 acquires the accelerator pedal operation amount AP based on the signal received from the accelerator pedal operation amount sensor 11 every time a predetermined calculation interval Tcal elapses.

The brake pedal operation amount sensor 12 is configured to detect a operation amount BP [%] of a brake pedal 12a, and output to the DSECU 10 a signal (one example of "own vehicle information") representing the operation amount (hereinafter, referred to as a "brake pedal operation amount") BP. The DSECU 10 acquires the brake pedal operation amount BP based on the signal received from the brake pedal operation amount sensor 12 every time a predetermined calculation interval Tcal elapses.

The left side direction indicator sensor 13L is configured to output to the DSECU 10 a signal representing that a pair of the left side direction indicators are in the blinking state when a pair of the left side direction indicators change from the unlit state to the blinking state. The left side direction indicator sensor 13L is configured to output to the DSECU 10 a signal representing that a pair of the left side direction indicators are in the unlit state when a pair of the left side direction indicators change from the blinking state to the unlit state. Hereinafter, these signals may be also referred to as "turning-left signals". The turning-left signals are examples of "own vehicle information". The DSECU 10 acquires a state of a pair of the left side direction indicators based on the turning-left signals received from the left side direction indicator sensor 13L every time the predetermined calculation interval Tcal elapses.

The right side direction indicator sensor 13R is configured to output to the DSECU 10 a signal representing that a pair of the right side direction indicators are in the blinking state when a pair of the right side direction indicators change from the unlit state to the blinking state. The right side direction indicator sensor 13R is configured to output to the DSECU 10 a signal representing that a pair of the right side direction indicators are in the unlit state when a pair of the right side direction indicators change from the blinking state to the unlit state. Hereinafter, these signals may be also referred to as "turning-right signals". The turning-right signals are examples of "own vehicle information". The DSECU 10 acquires a state of a pair of the right side direction indicators based on the turning-right signals received from the right side direction indicator sensor 13R every time the predetermined calculation interval Tcal elapses.

The steering angle sensor 14 is configured to detect a rotation angle $\theta sw$ [°] of a steering wheel 14a from a reference position, regarding a rotational position of the steering wheel 14a of when the vehicle 100 travels straight as the reference position, and output to the DSECU 10 a signal (one example of "own vehicle information") representing the steering angle $\theta sw$. The DSECU 10 acquires the steering angle $\theta sw$ based and the signal received from the steering angle sensor 14 every time the predetermined calculation interval Tcal elapses. The steering angle $\theta sw$ acquired has a value greater than zero when the steering wheel 14a is being rotated in a direction of turning the vehicle 100 left, and has a value smaller than zero when the steering wheel 14a is being rotated in a direction of turning the vehicle 100 right.

The vehicle speed sensor 15 is configured to detect a speed V [km/h] of the vehicle 100 and output to the DSECU 10 a signal (one example of "own vehicle information") representing the speed (hereinafter, referred to as a "vehicle speed") V. The DSECU 10 acquires the vehicle speed V based on the signal received from the vehicle speed sensor 15 every time the predetermined calculation interval Tcal elapses.

Figure 2:
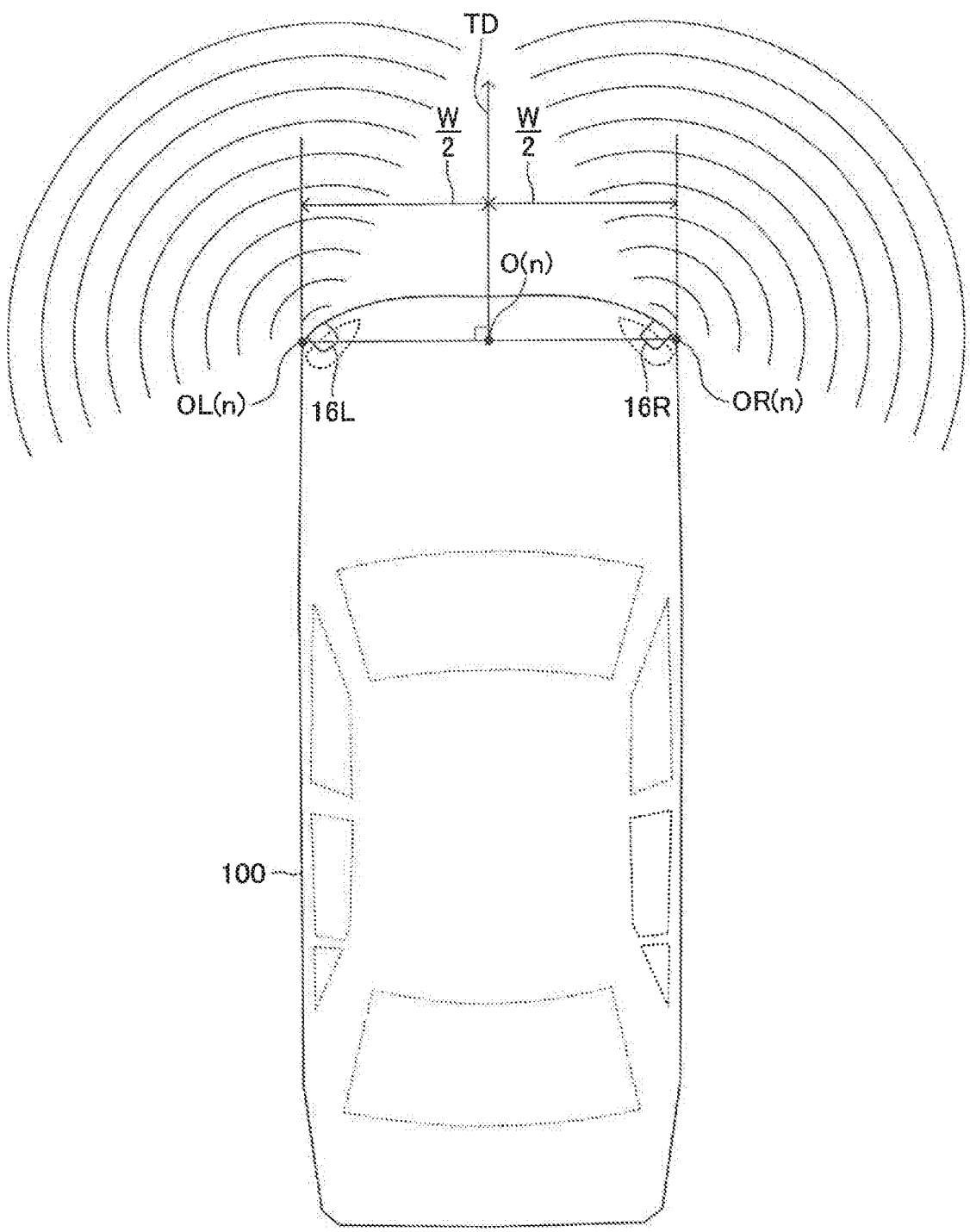
FIG. 2 is a diagram showing a position of the vehicle shown in FIG. 1, a position of a left end of the vehicle, and a position of a right end of the vehicle.

As shown in FIG. 2, the front left side radar sensor 16L is provided at a left end part of a front end part of the vehicle 100. The front left side radar sensor 16L is configured to transmit a radio wave toward a diagonally front left direction of the vehicle 100. When an object such as a pedestrian or other vehicle exists in a region which the radio wave (hereinafter, referred to as a "transmitted wave") reaches, the transmitted wave is reflected by the object. The front left side radar sensor 16L is configured to receive the reflected transmitted wave (hereinafter, referred to as a "reflected wave"). The front left side radar sensor 16L is configured to output to the DSECU 10 a signal representing the transmitted wave and a signal representing the reflected wave.

The DSECU 10 determines whether or not an object exists around the vehicle 100 based on the signal received from the front left radar sensor 16L every time the predetermined calculation interval Tcal elapses. When the DSECU 10 determines that an object exists, the DSECU 10 calculates a distance from the vehicle 100 to the object and a direction/orientation of the object with respect to the vehicle 100, and acquires, based on the distance and the direction, object information including an object position, an object moving direction, and an object moving speed with respect to the vehicle 100.

As shown in FIG. 2, the front right side radar sensor 16R is provided at a right end part of a front end part of the vehicle 100. The front right side radar sensor 16R is configured to transmit a radio wave toward a diagonally front right direction of the vehicle 100. When an object such as a pedestrian or other vehicle exists in a region which the radio wave (hereinafter, referred to as a "transmitted wave") reaches, the transmitted wave is reflected by the object. The front right side radar sensor 16R is configured to receive the reflected transmitted wave (hereinafter, referred to as a "reflected wave"). The front right side radar sensor 16R is configured to output to the DSECU 10 a signal representing the transmitted wave and a signal representing the reflected wave.

The DSECU 10 determines whether or not an object exists around the vehicle 100 based on the signal received from the front right radar sensor 16R every time the predetermined calculation interval Tcal elapses. When the DSECU 10 determines that an object exists, the DSECU 10 calculates a distance from the vehicle 100 to the object and a direction/orientation of the object with respect to the vehicle 100, and acquires, based on the distance and the direction, object information including an object position, an object moving direction, and an object moving speed with respect to the vehicle 100.

It should be noted that when each of the front left radar sensor 16L and the front right radar sensor 16R outputs a signal reflected by one common object to the DSECU 10, the DSECU 10 acquires the object information regarding this common object based on these signals.

Referring again to FIG. 1, the yaw rate sensor 17 is configured to detect an angular speed (a yaw rate) Y [°/sec] of the vehicle 100, and output a signal (one example of "own vehicle information") representing the angular speed Y to the DSECU 10. The DSECU 10 acquires the yaw rate Y based on the signal received from the yaw rate sensor 17 every time the predetermined calculation interval Tcal elapses. The yaw rate Y acquired has a value greater than zero when the vehicle 100 is turning in a left direction, has a value smaller than zero when the vehicle 100 is turning in a right direction, and has a value of zero when the vehicle 100 is traveling straight.

The front-rear acceleration sensor 18 is configured to detect an acceleration Gx [m/s$^2$] in a front-rear direction of the vehicle 100, and output to the DSECU 10 a signal (one example of "own vehicle information") representing the acceleration (front-rear acceleration) Gx. The DSECU 10 acquires the front-rear acceleration Gx based on the signal received from the front-rear acceleration sensor 18 every time the predetermined calculation interval Tcal elapses. The front-rear acceleration Gx acquired has a value greater than zero when the vehicle 100 is being accelerated, has a value smaller than zero when the vehicle 100 is being decelerated, and has a value of zero when the vehicle 100 is neither being accelerated nor decelerated.

The lateral acceleration sensor 19 is configured to detect an acceleration Gy [m/s$^2$] in a lateral direction of the vehicle 100, and output to the DSECU 10 a signal (one example of "own vehicle information") representing the acceleration (lateral acceleration) Gy. The DSECU 10 acquires the lateral acceleration Gy based on the signal received from the lateral acceleration sensor 19 every time the predetermined calculation interval Tcal elapses. The lateral acceleration Gy acquired has a value greater than zero when the vehicle 100 is turning in the left direction, has a value smaller than zero when the vehicle 100 is turning in the right direction, and has a value of zero when the vehicle 100 is traveling straight.

It should be noted that own vehicle information is information showing driving states of the vehicle 100 acquired by the aforementioned sensors (11, 12, 13L, 13R, 14, 15, and 17 to 19) mounted on the vehicle 100. The DSECU 10 stores the own vehicle information and the object information acquired in the RAM thereof.

The DSECU 10 generates a request signal for alerting the driver of the vehicle 100 in a case when there is a possibility that an object crosses an expected route of the vehicle 100 (described later), and transmits the request signal to the display ECU 20 and the warning ECU 30.

A display apparatus 21 is provided at a visually recognizable position (for example, in a meter cluster panel) from a driver's seat of the vehicle 100. As shown in FIG. 1, the display apparatus 21 is connected to the display ECU 20. The display ECU 20 transmits an instruction signal to the display apparatus 21 when receiving the aforementioned request signal from the DSECU 10. The display ECU 20 displays a message to alert the driver when receiving the instruction signal from the display ECU 20. It should be noted that the display apparatus 21 may be a head up display, a center display, and the like.

As shown in FIG. 1, a buzzer 31 is connected to the warning ECU 30. The warning ECU 30 transmits an instruction signal to the buzzer 31 when receiving the aforementioned request signal from the DSECU 10. The buzzer 31 raises a warning to alert the driver when receiving the instruction signal from the warning ECU 30. It should be noted that the alerting may be performed using either one of the display apparatus 21 or the buzzer 31.

Summary of Operation of First Embodiment Apparatus

Next, a summary of an operation of the first embodiment apparatus will be described. Hereinafter, the operation of the first embodiment apparatus of when the vehicle 100 turns left or right at the turning place will be described. It should be noted that the "turning place" is an intersection, a road adjacent to an entrance of a parking area, a parking area, and the like. Hereinafter, a description will be made, taking an intersection for example. In a case when the vehicle 100 turns left or right at the intersection, first, the vehicle 100 tries to start turning left or right at the intersection, then, actually turns left or right, and finally, finishes turning left or right. During a series of the actions mentioned above, an object such as a pedestrian or other vehicle may cross the expected route of the vehicle 100. In a case when the vehicle 100 turns left or right, the first embodiment apparatus assumes that a shape of the expected route of the vehicle 100 in the intersection becomes a circular arc, and estimates this expected route. Specifically, the first embodiment apparatus calculates a turning angle θtotal (mentioned later) of the vehicle 100 in the intersection to calculate a remaining turning angle based on the turning angle θtotal, and calculates an effective length of the expected route based on the remaining turning angle. Thereafter, when there is a possibility that an object crosses a part of the expected route within the effective length, the first embodiment apparatus alerts the driver using the display apparatus 21 and the buzzer 31.

More specifically, the first embodiment apparatus determines whether or not the vehicle 100 is trying to start turning left or right every time the predetermined calculation interval Tcal elapses. The first embodiment apparatus determines that the vehicle 100 is trying to start turning left when a following condition to start turning left is satisfied, and determines that the vehicle 100 is trying to start turning right when a following condition to start turning right is satisfied.

<Condition to Start Turning Left>

The condition to start turning left is satisfied when either one of following conditions Ls1, Ls2, or Ls3 is satisfied.

(Condition Ls1)

A pair of the left side direction indicators change from the unlit state to the blinking state when the vehicle speed V is more than or equal to a first vehicle speed threshold V1th and is less than or equal to a second vehicle speed threshold V2th (V1th≤V≤V2th).

It should be noted that the first vehicle speed threshold V1th and the second vehicle speed threshold V2th are set in advance to a lower limit and an upper limit of a general speed range of when the vehicle 100 is trying to start turning left, respectively. This also applies to a case when the vehicle 100 tries to start turning right. For example, the first vehicle speed threshold V1th and the second vehicle speed threshold V2th are 0 km/h and 20 km/h, respectively.

(Condition Ls2)

The vehicle speed V changes to a speed more than or equal to the first vehicle speed threshold V1th and less than or equal to the second vehicle speed threshold V2th when a pair of the left side direction indicators are in the blinking state.

(Condition Ls3)

A pair of the left side direction indicators change from the unlit state to the blinking state at a same time of the vehicle speed V changing to a speed more than or equal to the first vehicle speed threshold V1th and less than or equal to the second vehicle speed threshold V2th.

<Condition to Start Turning Right>

The condition to start turning right is satisfied when either one of following conditions Rs1, Rs2, or Rs3 is satisfied.

(Condition Rs1)

A pair of the right side direction indicators change from the unlit state to the blinking state when the vehicle speed V is more than or equal to the first vehicle speed threshold V1th and is less than or equal to the second vehicle speed threshold V2th (V1th≤V≤V2th).

(Condition Rs2)

The vehicle speed V changes to a speed more than or equal to the first vehicle speed threshold V1th and less than or equal to the second vehicle speed threshold V2th when a pair of the right side direction indicators are in the blinking state.

(Condition Ls3)

A pair of the right side direction indicators change from the unlit state to the blinking state at a same time of the vehicle speed V changing to a speed more than or equal to the first vehicle speed threshold V1th and less than or equal to the second vehicle speed threshold V2th.

Hereinafter, regarding any arbitrary element e, the element e of an nth calculation period will be represented as e(n), and a point in time at which the condition to start turning left or the condition to start turning right has been satisfied (that is, a point in time at which the vehicle 100 has been determined to be trying to start turning left or right) will be defined as n=0. In the present specification, as shown in FIG. 2, a position O(n) of the vehicle 100 of an nth period will be defined as a central position in a vehicle width direction in a vicinity of a front end part of the vehicle 100. In addition, the first embodiment apparatus determines that the vehicle 100 has finished turning left or right when either one of following conditions 1 or 2 is satisfied.

(Condition 1)

The turning angle θtotal(n) which is an "angle by which the vehicle 100 turns from a position O(0) of the vehicle 100 of a 0th period (shown by a dashed line in FIG. 4) to a position O(n) of the vehicle 100 of the nth period (shown by a solid line in FIG. 4)" has exceeded a predetermined angle (a turning angle generally required to turn left or right, which is 90° in the present example).

(Condition 2)

A pair of the left side direction indicators or a pair of the right side direction indicators have changed from the blinking state to the unlit state before the turning angle θtotal(n) exceeds 90°.

In general, while the vehicle 100 is turning left or right (that is, a period during which the vehicle 100 tries to start turning left or right and thereafter actually turns left or right to finish turning left or right), the vehicle speed V of the vehicle 100 satisfies V1th≤V≤V2th, and a pair of the left side direction indicators or a pair of the right side direction indicators are maintained in the blinking state. Therefore, once the condition to start turning left or the condition to start turning right is satisfied, the aforementioned conditions Ls1 to Ls3 or Rs1 to Rs3 become all unsatisfied until the vehicle 100 finishes turning left or right, and thus it will not happen that the condition to start turning left or the condition to start turning right is satisfied again. After the condition to start turning left or the condition to start turning right is once satisfied, as long as a pair of the left side direction indicators or a pair of the right side direction indicators are in the blinking state, the first embodiment apparatus determines that "the vehicle 100 is trying to start turning left or right" until a condition to start a turning-left-state or a condition to start a turning-right-state (mentioned later) becomes satisfied. As is obvious from the above description, the condition to start turning left or the condition to start turning right is satisfied only once per one turning left or right at an intersection.

In addition, after the vehicle 100 is determined to be trying to start turning left (that is, after the condition to start turning left is satisfied), the first embodiment apparatus determines whether or not a turning-left-state in which the vehicle 100 is actually turning left occurs every time the predetermined calculation interval Tcal elapses as long as a pair of the left side direction indicators are in the blinking state (in other words, as long as an intention to turn left is shown by the driver). The first embodiment apparatus determines that an occurrence of the turning-left-state has started when "the condition to start a turning-left-state mentioned below is satisfied for the first time in a case when a pair of the left side direction indicators are in the blinking state after the condition to start turning left is satisfied". Thereafter, the first embodiment apparatus determines that the turning-left-state is occurring (continuing) in a case when the condition to start a turning-left-state is satisfied (Hereinafter, the turning-left-state being occurring may be also referred to as "the vehicle 100 is in the turning-left-state".).

<Condition to Start the Turning-Left-State>

The condition to start a turning-left-state is satisfied when following conditions Lt1 to Lt6 are all satisfied.

(Condition Lt1)

The vehicle speed V is more than or equal to a lower limit vehicle speed threshold VLth and is less than or equal to an upper limit vehicle speed threshold VUth (VLth≤V≤VUth).

It should be noted that the lower limit vehicle speed threshold VLth and the upper limit vehicle speed threshold VUth are set in advance to a lower limit and an upper limit of a general speed range of when the vehicle 100 actually turns left, respectively. This also applies to a case when the vehicle 100 actually turns right. In addition, the lower limit vehicle speed threshold VLth is set in advance to a value more than the first vehicle speed threshold V1th, and the upper limit vehicle speed threshold VUth is set in advance to a value less than or equal to the second vehicle speed threshold V2th (VLthe>V1th, VUth V2th). For example, the lower limit vehicle speed threshold VLth and the upper limit vehicle speed threshold VUth are 5 km/h and 20 km/h, respectively.

(Condition Lt2)

The front-rear acceleration Gx is more than or equal to zero and is less than an acceleration threshold Gxa, or the front-rear acceleration Gx is less than zero and an absolute value thereof is less than a deceleration threshold Gxd.

For example, the acceleration threshold Gxa and the deceleration threshold Gxd are 4 m/s² and 4 m/s², respectively.

(Condition Lt3)

The accelerator pedal operation amount AP is less than an operation amount threshold APth.

For example, the operation amount threshold APth is 2%.

(Condition Lt4)

The yaw rate Y is greater than zero and is greater than a turning-right-or-left determination threshold Yth (an index threshold to start turning).

For example, the turning-right-or-left determination threshold Yth is 8°/sec.

(Condition Lt5)

The lateral acceleration Gy is greater than zero and is greater than a turning-right-or-left determination threshold Gyth.

For example, the turning-right-or-left determination threshold Gyth is 3 m/s².

(Condition Lt6)

The steering angle θsw is greater than zero and is greater than a turning-right-or-left determination threshold θswth.

For example, the turning-right-or-left determination threshold θswth is 45°.

On the other hand, after the vehicle 100 is determined to be trying to start turning right (that is, after the condition to start turning right is satisfied), the first embodiment apparatus determines whether or not a turning-right-state in which the vehicle 100 is actually turning right occurs every time the predetermined calculation interval Tcal elapses as long as a pair of the right side direction indicators are in the blinking state (in other words, as long as an intention to turn right is shown by the driver). The first embodiment apparatus determines that an occurrence of the turning-right-state has started when "the condition to start a turning-right-state mentioned below is satisfied for the first time in a case when a pair of the right side direction indicators are in the blinking state after the condition to start turning right is satisfied". Thereafter, the first embodiment apparatus determines that the turning-right-state is occurring (continuing) in a case when the condition to start a turning-right-state is satisfied (Hereinafter, the turning-right-state being occurring may be also referred to as "the vehicle 100 is in the turning-right-state".).

<Condition to Start the Turning-Right-State>

The condition to start a turning-right-state is satisfied when following conditions Rt1 to Rt6 are all satisfied.

(Condition Rt1)

The vehicle speed V is more than or equal to the lower limit vehicle speed threshold VLth and is less than or equal to the upper limit vehicle speed threshold VUth (VLth≤V≤VUth).

(Condition Rt2)

The front-rear acceleration Gx is more than or equal to zero and is less than the aforementioned acceleration threshold Gxa, or the front-rear acceleration Gx is less than zero and the absolute value thereof is less than the aforementioned deceleration threshold Gxd.

(Condition Rt3)

The accelerator pedal operation amount AP is less than the aforementioned operation amount threshold APth.

(Condition Rt4)

The yaw rate Y is less than zero and an absolute value thereof is greater than the aforementioned turning-right-or-left determination threshold Yth.

(Condition Rt5)

The lateral acceleration Gy is less than zero and an absolute value thereof is greater than the aforementioned turning-right-or-left determination threshold Gyth.

(Condition Rt6)

The steering angle θsw is less than zero and an absolute value thereof is greater than the aforementioned turning-right-or-left determination threshold θswth.

After the condition to start turning left is satisfied, the first embodiment apparatus determines that the vehicle 100 is trying to start turning left at the intersection, but has not yet actually turned left (has not been in the turning-left-state) until the condition to start a turning-left-state is satisfied. On the other hand, when the condition to start a turning-left-state is satisfied, the first embodiment apparatus determines that the vehicle 100 is actually turning left at the intersection (that is, the vehicle 100 is in the turning-left-state). In addition, after the condition to start a turning-left-state is satisfied, the first embodiment apparatus determines that the vehicle 100 is actually turning left at the intersection (that is, the vehicle 100 is in the turning-left-state) even though the condition to start a turning-left-state becomes unsatisfied as long as a pair of the left side direction indicators are in the blinking state. Therefore, for example, when the vehicle 100 is temporarily stopping around a center of the intersection in order to wait for an oncoming vehicle and a pedestrian to pass through after actually starting to turn left, the first embodiment apparatus determines that the vehicle 100 is in the turning-left-state. In contrast, the first embodiment apparatus determines that the vehicle 100 has finished turning left when a pair of the left side direction indicators have become in the unlit state after the vehicle 100 is determined to be in the turning-left-state, or when the turning angle θtotal has exceeded the predetermined angle (90° in the present example) after the vehicle 100 is determined to be in the turning-left-state (mentioned later).

Hereinafter, a case where the vehicle 100 is determined to be trying to start turning left but have not yet actually turned left may be also referred to as a "case L1". In addition, a case where the vehicle 100 is determined to be actually turning left at an intersection may be also referred to as a "case L2".

On the other hand, after the condition to start turning right is satisfied, the first embodiment apparatus determines that the vehicle 100 is trying to start turning right at the intersection, but has not yet actually turned right (has not been in the turning-right-state) until the condition to start a turning-right-state is satisfied. On the other hand, when the condition to start a turning-right-state is satisfied, the first embodiment apparatus determines that the vehicle 100 is actually turning right at the intersection (that is, the vehicle 100 is in the turning-right-state). In addition, after the condition to start a turning-right-state is satisfied, the first embodiment apparatus determines that the vehicle 100 is actually turning right at the intersection (that is, the vehicle 100 is in the turning-right-state) even though the condition to start a turning-right-state becomes unsatisfied as long as a pair of the right side direction indicators are in the blinking state. Therefore, for example, when the vehicle 100 is temporarily stopping around a center of the intersection in order to wait for an oncoming vehicle and a pedestrian to pass through after actually starting to turn right, the first embodiment apparatus determines that the vehicle 100 is in the turning-right-state. In contrast, the first embodiment apparatus determines that the vehicle 100 has finished turning right when a pair of the right side direction indicators have become in the unlit state after the vehicle 100 is determined to be in the turning-right-state, or when the turning angle θtotal has exceeded the predetermined angle (90° in the present example) after the vehicle 100 is determined to be in the turning-right-state (mentioned later).

Hereinafter, a case where the vehicle 100 is determined to be trying to start turning right but have not yet actually turned right may be also referred to as a "case R1". In addition, a case where the vehicle 100 is determined to be actually turning right at an intersection may be also referred to as a "case R2".

<Calculation of a Smoothed Yaw Rate Ys>

As will be described later, the first embodiment apparatus uses the yaw rate Y of the vehicle 100 in order to estimate the expected route. However, the yaw rate Y detected by the yaw rate sensor 17 is unstable. Therefore, when the vehicle 100 is determined to be trying to start turning left or right, the first embodiment apparatus smoothes the yaw rate Y every time the predetermined calculation interval Tcal elapses until it is determined that the vehicle 100 has finished turning left or right, and calculates a smoothed value as a smoothed yaw rate Ys.

However, a sign of the yaw rate Y (positive) of when the vehicle 100 is turning in the left direction is different from a sign of the yaw rate Y (negative) of when the vehicle 100 is turning in the right direction. Therefore, the first embodiment apparatus calculates the smoothed yaw rate Ys in accordance with a following formula (1L) or (2L) when the vehicle 100 turning left, and calculates the smoothed yaw rate Ys in accordance with a following formula (1R) or (2R) when the vehicle 100 turning right. It should be noted that an M is a predetermined positive integer.

(When turning left)

When $n \geq m$, $Ys(n) = \{Y(n-(M-1)) + \ldots + Y(n-1) + Y(n)\}/M$ (1L)

When $n < M$, $Ys(n) = \{Y(0) + \ldots + Y(n-1) + Y(n)\}/(n+1)$ (2L)

(When turning right)

When $n \geq M$, $Ys(n) = \{(-Y(n-(M-1))) + \ldots + (-Y(n-1)) + (-Y(n))\}/M$ (1R)

When $n < M$, $Ys(n) = \{(-Y(0)) + \ldots + (-Y(n-1)) + (-Y(n))\}/(n+1)$ (2R)

That is, in a case when the vehicle 100 is determined to be trying to start turning left, when $n \geq M$, the first embodiment apparatus calculates a smoothed yaw rate Ys(n) of the nth period as an average of M yaw rate Y's including a latest yaw rate Y(n) which are recently acquired. When $n < M$, the first embodiment apparatus calculates the smoothed yaw rate Ys(n) of the nth period as an average of n+1 yaw rate Y's from Y(0) to Y(n).

On the other hand, in a case when the vehicle 100 is determined to be trying to start turning right, when $n \geq M$, the first embodiment apparatus calculates the smoothed yaw rate Ys(n) of the nth period as an average of M values, each of which is a recently acquired yaw rate Y multiplied by −1 (that is, a value inverting a sign of Y), including a latest yaw rate Y(n) multiplied by −1. When $n < M$, the first embodiment apparatus calculates the smoothed yaw rate Ys(n) of the nth period as an average of n+1 values, each of which is a yaw rate Y from Y(0) to Y(n) multiplied by −1.

As stated earlier, a yaw rate of when the vehicle 100 is turning in the right direction has a negative value. Therefore, in a case when the vehicle 100 is determined to be trying to start turning right, a smoothed yaw rate Ys of when the vehicle 100 is turning in the right direction can be equally treated to a smoothed yaw rate Ys of when the vehicle 100 is turning in the left direction by inverting a sign of the yaw rate, multiplying by −1 and then smoothing the inverted values.

It should be noted that a smoothed yaw rate Ys of when the vehicle 100 turns left or right does not always have a positive value. That is, for example, in a case when the vehicle 100 has temporarily turned in the right direction while the vehicle 100 is turning left (for example, in a case when the steering wheel 14a has been temporarily rotated in a direction of turning the vehicle 100 right), a yaw rate Y at that period has a negative value. In such a case, a smoothed yaw rate Ys calculated in accordance with the formula (1L) or (2L) may have a negative value. Similarly, in a case when the vehicle 100 has temporarily turned in the left direction while the vehicle 100 is turning right (for example, in a case when the steering wheel 14a has been temporarily rotated in a direction of turning the vehicle 100 left), a yaw rate Y at that period has a positive value, and therefore a value acquired by multiplying this yaw rate Y by −1 has a negative value. In such a case, a smoothed yaw rate Ys calculated in accordance with the formula (1L) or (2L) may have a negative value.

In some cases, the vehicle 100 temporarily stops after being determined to have actually started turning left or right. In this case, the yaw rate Y changes from a nonzero value to a zero value. Therefore, when the yaw rate Y is smoothed in accordance with the aforementioned formulae (1L) to (2R), there is a case that the smoothed yaw rate Ys is calculated as a nonzero value deviated from a zero value in spite of an actual yaw rate Y being a zero value, resulting in an inaccurate value being calculated. Thus, in a case when a yaw rate Y changes from a nonzero value to a zero value after the vehicle 100 is determined to have actually started turning left or right, the first embodiment apparatus sets a smoothed yaw rate Ys to zero in accordance with a following formula (3) or (4) instead of the above formulae (1L) to (2R).

When $Y(i)(i:a \text{ to } b-1) \neq 0$ and $Y(b) = 0$, $Ys(b) = 0$ (3)

When $Y(j)(j:b+1 \text{ to } d) = 0$, $Ys(j) = 0$ (4)

That is, the first embodiment apparatus sets a smoothed yaw rate Ys(b) of a bth period to zero in a case when the vehicle 100 is determined to have actually started turning left or right at an ath (1≤a) period (Y(a)≠0 according to the aforementioned condition Lt4 or Rt4.) and the vehicle 100 temporarily stops at the bth period (a<b<n), causing a yaw rate Y(b) to become to zero for the first time. In addition, the first embodiment apparatus sets a smoothed yaw rate Ys from a b+1th period to a dth period (b<d<n) to zero while a stopped state of the vehicle 100 has continued from the b+1th period to the dth period (that is, while a state where the yaw rate Y=0 has continued).

Further, when the vehicle 100 resumes turning from a temporarily stopped state, the yaw rate Y changes from a zero value to a nonzero value. Therefore, when the yaw rate Y is smoothed in accordance with the aforementioned formulae (1L) to (2R), there is a case that the smoothed yaw rate Ys has a substantially zero value in spite of an actual yaw rate Y being a nonzero value, resulting in an inaccurate value being calculated. Thus, in a case when a yaw rate Y changes from a zero value to a nonzero value after the vehicle 100 is determined to have actually started turning left, the first embodiment apparatus sets a smoothed yaw rate Ys of when turning left in accordance with a following formula (5L) or (6L) instead of the above formula (1L) or (2L). In addition, in a case when a yaw rate Y changes from a zero value to a nonzero value after the vehicle 100 is determined to have actually started turning right, the first embodiment apparatus sets a smoothed yaw rate Ys of when turning right in accordance with a following formula (5R) or (6R) instead of the above formula (1R) or (2R).

(When turning left)

When $Y(k)(k:d+1 \text{ to } n)\neq 0$,

When $n-d \geq M, Ys(n)=\{Y(n-(M-1))+ \ldots +Y(n-1)+Y(n)\}/M$ (5L)

When $n-d<M, Ys(n)=\{Y(d+1)+ \ldots +Y(n-1)+Y(n)\}/(n-d)$ (6L)

(When turning right)

When $Y(k)(k:d+1 \text{ to } n)\neq 0$,

When $n-d \geq M, Ys(n)=\{(-Y(n-(M-1)))+ \ldots +(-Y(n-1))+(-Y(n))\}/M$ (5R)

When $n-d<M, Ys(n)=\{(-Y(d+1))+ \ldots +(-Y(n-1))+(-Y(n))\}/(n-d)$ (6R)

That is, under a situation where the vehicle 100 has been temporarily stopping to the dth period, has resumed turning left from the d+1th period, and has continued turning left without stopping to the nth period (namely, a situation where a state of the yaw rate Y≠0 has continued from the d+1th period to the nth period) in a case when the vehicle 100 is determined to be trying to start turning left, when a number of the yaw rate Y's with nonzero values is more than or equal to M in succession, the first embodiment apparatus calculates a smoothed yaw rate Ys(n) of the nth period as an average of M yaw rate Y's including a latest yaw rate Y(n) which are recently acquired. When the number of the yaw rate Y's with nonzero values is less than M in succession, the first embodiment apparatus calculates the smoothed yaw rate Ys(n) of the nth period as an average of all of the nonzero yaw rate Y's after the d+1th period (in other words, calculates as an average of n-d yaw rate Y's from Y(d+1) to Y(n).).

On the other hand, under a same situation as above in a case when the vehicle 100 is determined to be trying to start turning right, when the number of the yaw rate Y's with nonzero values is more than or equal to M in succession, the first embodiment apparatus calculates the smoothed yaw rate Ys(n) of the nth period as an average of M values, each of which is a recently acquired yaw rate Y multiplied by −1. When the number of the yaw rate Y's with nonzero values is less than M in succession, the first embodiment apparatus calculates the smoothed yaw rate Ys(n) of the nth period as an average of all values, each of which is a nonzero yaw rate Y after the d+1th period multiplied by −1.

<Calculation of the Turning Angle θtotal>

<<Calculation of an Instant Turning Angle θ>>

As will be described later, the first embodiment apparatus uses a turning angle θtotal(n) which is an angle by which the vehicle 100 turns from the 0th period to the nth period in order to calculate an effective length of the expected route. The first embodiment apparatus uses an instant turning angle θ which is an angle by which the vehicle 100 turns for the predetermined calculation interval Tcal in order to calculate this turning angle θtotal(n). The first embodiment apparatus calculates this instant turning angle θ in accordance with following formulae (7) and (8).

When $n=0, \theta(0)=0°$ (7)

When $n \geq 1, \theta(n)=Ys(n) \cdot Tcal$ (8)

That is, the first embodiment apparatus sets an instant turning angle θ(0) to zero at a period of when the vehicle 100 is determined to be trying to start turning left or right, which is n=0. And thereafter (n≥1), the first embodiment apparatus calculates an instant turning angle θ(n) of the nth period as a product of the smoothed yaw rate Ys(n) and the predetermined calculation interval Tcal until the vehicle 100 is determined to have finished turning left or right.

<<Initialization of the Turning Angle θtotal and Integration of the Instant Turning Angle θ's>>

The first embodiment apparatus calculates the turning angle θtotal(n) by which the vehicle 100 turns during an interval from the 0th period to the nth period in accordance with following formulae (9) and (10).

When $n=0, \theta total(0)=0°$ (9)

When $n \geq 1, \theta total(n)=\theta total(n-1)+\theta(n)$ (10)

That is, the first embodiment apparatus sets (initializes) the turning angle θtotal(0) to 0° at a period of when the vehicle 100 is determined to be trying to start turning left or right, which is n=0. And thereafter (n≥1), the first embodiment apparatus calculates the turning angle θtotal(n) by adding the instant turning angle θ(n) to an immediately preceding turning angle θtotal(n−1). Thereby, a turning angle of when the vehicle 100 turns left or right at an intersection can be properly calculated.

<Calculation of a Turning Radius R>

The first embodiment apparatus estimates two expected routes as will be described later. These two expected routes are expressed by two formulae of circles with different radii. Each of the radii of these two circles is calculated based on a turning radius R which is a radius of a circle on which the position O (refer to FIG. 2) of the vehicle 100 is expected to pass through. The first embodiment apparatus calculates this turning radius R after the vehicle 100 is determined to be trying to start turning left or right and until the vehicle 100 is determined to have finished turning left or right in accordance with following formulae (11) to (14) every time the predetermined calculation interval Tcal elapses.

(Case L1, Case R1)

When $Ys(n) \leq Y0, R(n) = 12700m$ (11)

When $Ys(n) > Y0, R(n) = V(n)/Ys(n)$ (12)

(Case L2, Case R2)

When $Ys(n) \leq Y0, R(n) = R(c)$ (13)

When $Ys(n) > Y0, R(n) = V(n)/Ys(n)$ (14)

That is, when the smoothed yaw rate Ys(n) is greater than Y0 (Y0=$10^{-6}$ in the present example, which will be described later.), the first embodiment apparatus calculates a turning radius R(n) of the nth period by dividing the vehicle speed V(n) by the smoothed yaw rate Ys(n) for both cases (refer to the formulae (12) and (14)). In other words, when Ys(n)>Y0, the turning radius R(n) is defined as a curvature radius at the position O(n) of the vehicle 100 (refer to FIG. 4). It should be noted that Y0 is a threshold for avoiding the turning radius R(n) from becoming too large owing to the vehicle speed V(n) being divided by a smoothed yaw rate Ys(n) close to "0", and Y0 is $10^{-6}$ for example. Note that a case of Ys(n)>Y0 is a case where the vehicle 100 is turning in a same direction as a direction in which the vehicle 100 is trying to turn left or right.

In contrast, when Ys(n)≤Y0, the first embodiment apparatus changes a calculation method for the turning radius R(n) between when the cases L1 or R1 and the cases L2 or R2. Note that cases of Ys(n)≤Y0 are typically as follows.

A case where the vehicle 100 is temporarily stopping.
A case where the vehicle 100 is traveling straight.
A case where the smoothed yaw rate Ys is calculated as a negative value as a result of the vehicle 100 having (at least temporarily) turned in a direction opposite to a direction in which the vehicle 100 is trying to turn left or right.

Specifically, in the case L1 or the case R1, the vehicle 100 has not yet actually turned left or right although the vehicle 100 is trying to start turning left or right, and therefore the vehicle 100 is highly likely to be positioned in a vicinity of an entrance of the intersection. Inventors of the present invention acquired knowledge that when Ys(n)≤Y0 in such a case, the expected route with a substantially linear shape is more appropriate as an expected route in the intersection and thus it becomes possible to alert the driver more properly. Therefore, when Ys(n)≤Y0 in the case of L1 or R1, the first embodiment apparatus sets the turning radius R(n) to a predetermined value (12700m in the present example) which is a much larger value than a turning radius of the vehicle 100 at a general intersection (refer to the formula (11)). Thereby, a shape of the expected route in the intersection can be made to be substantially linear (described later).

On the other hand, in the case L2 or the case R2, the vehicle 100 is actually turning left or right. When Ys(n)≤Y0 in such a case, it is highly likely that the vehicle 100 is temporarily stopping in the intersection, or the vehicle 100 has temporarily turned in a direction opposite to a direction in which the vehicle 100 is turning left or right. Therefore, when Ys(n)≤Y0 in the case of L2 or R2, the first embodiment apparatus keeps a turning radius R(c) of an immediately preceding period c in which Ys>Y0 is satisfied (refer to the formula (13)).

It should be noted that the value of the turning radius R(n) of when Ys(n)≤Y0 in the cases of L1 and R1 is not limited to 12700m. This turning radius R(n) may be any value much larger than a turning radius of the vehicle 100 at a general intersection.

<Calculation of a Turning Center>

The first embodiment apparatus calculates a turning center coordinate (Cx(n), Cy(n)) of the vehicle 100 at the nth period in the cases L1, L2 and a turning center coordinate (Cx(n), Cy(n)) of the vehicle 100 at the nth period in the cases R1, R2 as stated below.

That is, the first embodiment apparatus calculates the turning center coordinate (Cx(n), Cy(n)) in the cases L1, L2 as a position moved from an origin O(n) in a direction perpendicular to a traveling direction of the vehicle 100 at the nth period by a length of the turning radius R(n) to a left side with respect to this traveling direction. It should be noted that "a traveling direction of the vehicle 100 at the nth period" can be calculated from the smoothed yaw rate Ys(n) at the nth period.

On the other hand, the first embodiment apparatus calculates the turning center coordinate (Cx(n), Cy(n)) in the cases R1, R2 as a position moved from the origin O(n) in the direction perpendicular to the traveling direction TD (refer to FIG. 4) of the vehicle 100 at the nth period by the length of the turning radius R(n) to a right side with respect to this traveling direction TD.

Figure 4:
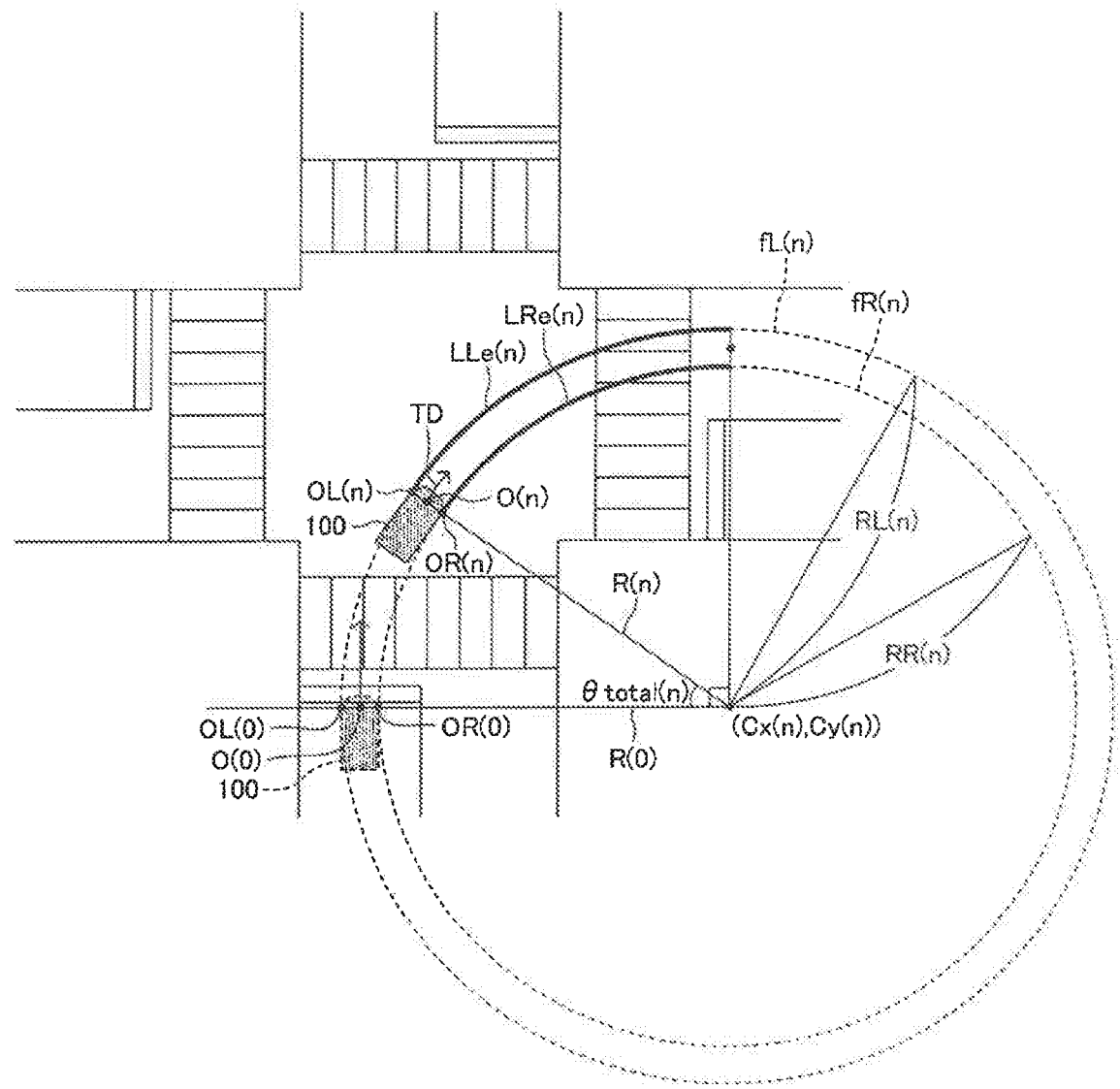
FIG. 4 is a diagram showing the left side and the right side expected route formulae and effective lengths thereof in a case when the first embodiment apparatus determines that the vehicle is actually turning right at the intersection.

It should be noted that in an example of FIG. 4, the vehicle 100 is turning right at a constant vehicle speed V and with a constant smoothed yaw rate Ys. Therefore, while the vehicle 100 is turning right, the turning radius R(n) is constant and the turning center coordinate (Cx(n), Cy(n)) remains at one point as well. However, when the vehicle speed V and the smoothed yaw rate Ys are varying while the vehicle 100 is turning right, the turning radius R(n) has different values depending on periods, and as a result, the turning center coordinate (Cx(n), Cy(n)) comes not to remain at one point. In this case also, it is possible to properly calculate an effective length LLe of a left side expected route and a right side expected route LRe which will be described later by calculating the turning angle θtotal(n) as described above.

<Calculation of a Left Side Turning Radius RL and a Right Side Turning Radius RR>

The first embodiment apparatus calculates, based on the turning radius R(n), a left side turning radius RL(n) and a right side turning radius RR(n) in accordance with following formulae (15) to (18).

(Cases L1, L2)

$RL(n) = R(n) - w/2$ (15)

$RR(n) = R(n) + w/2$ (16)

(Cases R1, R2)

$RL(n) = R(n) + w/2$ (17)

$RR(n) = R(n) - w/2$ (18)

That is, when the vehicle 100 is turning left (the cases L1, L2), the first embodiment apparatus calculates the left side turning radius RL(n) of the nth period by subtracting a half length w/2 of a vehicle width w of the vehicle 100 (a half vehicle width length w/2) from the turning radius R(n), and calculates the right side turning radius RR(n) of the nth period by adding the half vehicle width length w/2 to the turning radius R(n). When the vehicle 100 is turning right (the cases R1, R2), the first embodiment apparatus calculates the left side turning radius RL(n) of the nth period by adding the half vehicle width length w/2 to the turning radius R(n), and calculates the right side turning radius RR(n) of the nth period by subtracting the half vehicle width length w/2 from the turning radius R(n).

Now, as shown in FIG. 2, a left end OL(n) of a front end part of the vehicle 100 at the nth period (hereinafter, may be simply referred to as a "left end OL(n) of the vehicle 100") is a position moved from the position O(n) of the vehicle 100 in the direction perpendicular to the traveling direction TD of the vehicle 100 by the half vehicle width length w/2 to the left side with respect to the traveling direction TD, and a right end OR(n) of a front end part of the vehicle 100 at the nth period (hereinafter, may be simply referred to as a "right end OR(n) of the vehicle 100") is a position moved from the position O(n) of the vehicle 100 in the direction perpendicular to the traveling direction TD of the vehicle 100 by the half vehicle width length w/2 to the right side with respect to the traveling direction TD. Therefore, the left side turning radius RL(n) coincides with a radius of a circle expressing an expected route through which the left end OL(n) is expected to pass, and the right side turning radius RR(n) coincides with a radius of a circle expressing an expected route through which the right end OR(n) is expected to pass.

It should be noted that a value of w is set in advance for each vehicle in which the first embodiment apparatus is to be mounted. However, the value of w may be larger than the vehicle width, or may be smaller than the vehicle width.

<Estimation of a Left Side Expected Route and a Right Side Expected Route>

When the vehicle 100 is determined to be trying to start turning left or right, the first embodiment apparatus estimates an expected route (a left side expected route) through which the left end OL of the vehicle 100 is expected to pass and an expected route (a right side expected route) through which the right end OR of the vehicle 100 is expected to pass, respectively every time the predetermined calculation interval Tcal elapses until the vehicle 100 is determined to have finished turning left or right. The first embodiment apparatus calculates a left side expected route formula fL(n) representing a left side expected route of the nth period and a right side expected route formula fR(n) representing a right side expected route of the nth period in accordance with following formulae (19) and (20) (refer to FIG. 4).

(Left side expected route formula $fL(n)$)

$$(x-Cx(n))^2+(y-Cy(n))^2=RL(n)^2 \quad (19)$$

(Right side expected route formula $fR(n)$)

$$(x-Cx(n))^2+(y-Cy(n))^2=RR(n)^2 \quad (20)$$

That is, the first embodiment apparatus calculates the left side expected route formula fL(n) as a formula of a circle, a center thereof is the turning center coordinate (Cx(n), Cy(n)) and a radius thereof is the left side turning radius RL(n). Similarly, the first embodiment apparatus calculates the right side expected route formula fR(n) as a formula of a circle, a center thereof is the turning center coordinate (Cx(n), Cy(n)) and a radius thereof is the right side turning radius RR(n).

Figure 3:
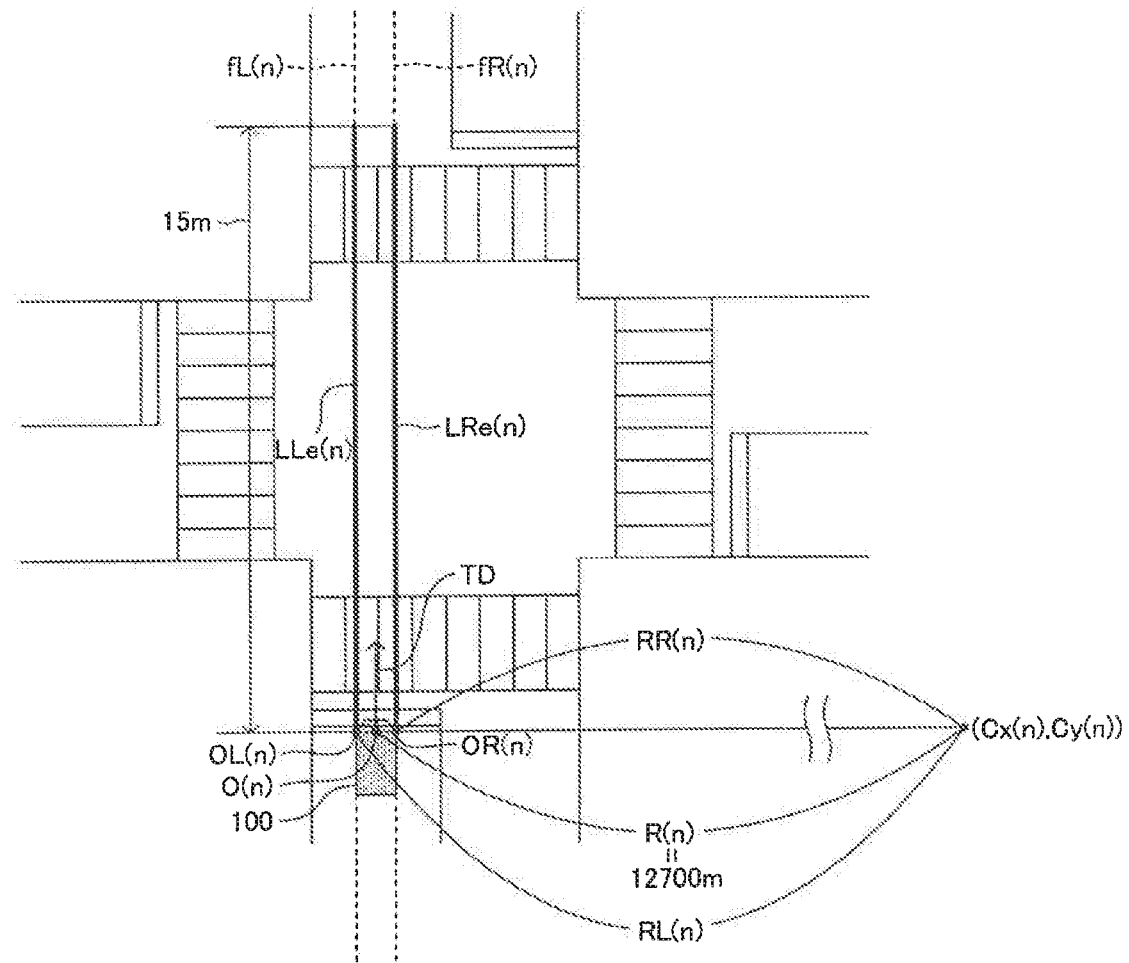
FIG. 3 is a diagram showing a left side and a right side expected route formulae and effective lengths thereof when a smoothed yaw rate is less than or equal to a threshold Y0 in a case when the first embodiment apparatus determines that the vehicle is trying to start turning left or right at an intersection but has not yet actually turned left or right.

It should be noted that as described earlier, when $Ys(n) \leq Y0$ ($=10^{-6}$) in the case of L1 or R1, R(n) is set to 12700m (refer to the formula (11)). Therefore, in this case, each of the left side expected route formula fL(n) and the right side expected route formula fR(n) is approximated to a formula of a line extending in the traveling direction TD of the vehicle 100 of the nth period as shown in FIG. 3.

<Calculation of an Effective Length LLe of the Left Side Expected Route and an Effective Length LRe of the Right Side Expected Route>

The first embodiment apparatus alerts the driver in a case when there exists an object which crosses at least one of a part within an effective length LLe of the left side expected route and a part within an effective length LRe of the right side expected route within a predetermined time. When the vehicle 100 is determined to be trying to start turning left or right, the first embodiment apparatus calculates the effective length LLe of the left side expected route and the effective length LRe of the right side expected route in accordance with following formulae (21) to (23) every time the predetermined calculation interval Tcal elapses until the vehicle 100 is determined to have finished turning left or right. hereinafter, the effective length LLe of the left side expected route may be also simply referred to as a "left side effective length LLe", and the effective length LRe of the right side expected route may be also simply referred to as a "right side effective length LRe".

(When $Ys(n) \leq Y0$ in the cases of $L1, R1$)

$$LLe(n)=LRe(n)=15m \quad (21)$$

(When $Ys(n) > Y0$ in the cases of $L1, R1$, or in the cases of $L2, R2$)

$$LLe(n)=RL(n) \cdot (90°-\theta total(n)) \cdot \pi/180° \quad (22)$$

$$LRe(n)=RR(n) \cdot (90°-\theta total(n)) \cdot \pi/180° \quad (23)$$

As mentioned earlier, when $Ys(n) \leq Y0$ in the cases L1, R1, each of the expected route formulae fL(n), fR(n) is approximated to a formula of a line. In this case, the first embodiment apparatus sets the left side effective length LLe(n) of the nth period and the right side effective length LRe(n) of the nth period on a basis of a width length (15m in the present example) of a road which the vehicle 100 is expected to enter after turning left or right at a general intersection (refer to a thick line in FIG. 3). The length can be set to an arbitrary value between 15 to 20m, for example.

On the other hand, when Ys(n)>Y0 in the cases L1, R1, or in the cases L2, R2, the first embodiment apparatus calculates the effective length LLe of the left side expected route and the effective length LRe of the right side expected route as a length of the left side expected route and a length of the right side expected route by which the vehicle 100 is to turn until the turning angle θtotal of the vehicle 100 becomes from the current turning angle θtotal to 90° (the predetermined angle), respectively. Specifically, the first embodiment apparatus calculates a remaining angle (hereinafter, referred to as a "remaining turning angle") by which the vehicle 100 is to turn until the turning angle θtotal becomes 90° by subtracting the turning angle θtotal from 90°, and then convers a unit thereof to radian. The first embodiment apparatus calculates the left side effective length LLe(n) (shown by a thick line in FIG. 4) by multiplying this converted remaining turning angle by the left side turning radius RL(n), and calculates the right side effective length LRe(n) (shown by a thick line in FIG. 4) by multiplying this converted remaining turning angle by the right side turning radius RR(n).

When the vehicle 100 is determined to be trying to start turning left or right, the first embodiment apparatus determines whether or not there exists an object (hereinafter, may be also referred to as a "target object") crossing at least one of a part within the left side effective length LLe and a part within the right side effective length LRe within the predetermined time every time the predetermined calculation interval Tcal elapses until the vehicle 100 is determined to have finished turning left or right. When the first embodiment apparatus determines that there exists such an object, the first embodiment apparatus determines that there is a possibility that the object crosses a part within the effective length of the expected route. Therefore, the first embodiment apparatus performs processes described below. When the first embodiment apparatus determines that the target object exists, the first embodiment apparatus generates a request signal for alerting the driver of the vehicle 100, and conducts an operation to alert the driver in response to this request signal.

<Acquisition of Object Information>

When the vehicle 100 is determined to be trying to start turning left or right, the first embodiment apparatus acquire object information (the object position, the object moving direction, and the object moving speed with respect to the vehicle 100) of an object which exists around the vehicle 100 every time the predetermined calculation interval Tcal elapses until the vehicle 100 is determined to have finished turning left or right. In an example of FIG. 5, the first embodiment apparatus acquires the object information of the nth period regarding objects A, B, C, and D which exist around the vehicle 100 of the nth period.

<Calculation of a Formula g of an Object>

Figure 5:
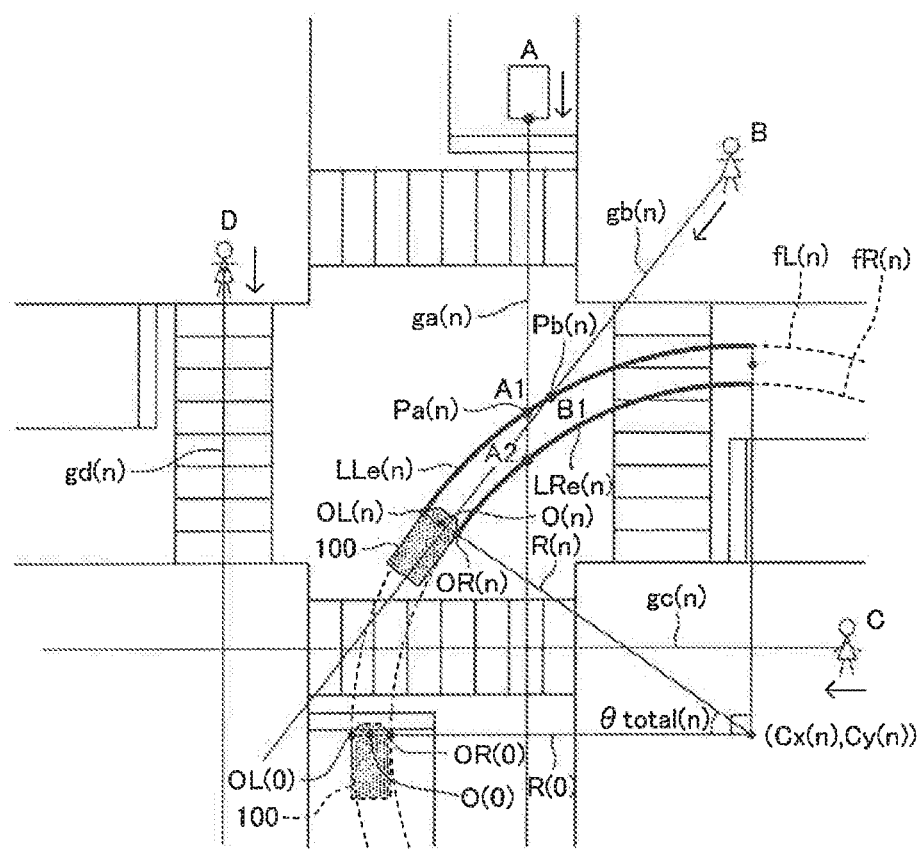
FIG. 5 is a diagram used to describe an alerting in a case when the first embodiment apparatus determines that the vehicle is actually turning right at the intersection.

The first embodiment apparatus calculates an expected route formula g which is a half line extending from the object position toward the moving direction thereof based on the object information. In the example of FIG. 5, the first embodiment apparatus calculates each of the expected route formulae ga(n), gb(n), gc(n), and gd(n) of the nth period, each of which is extending from each of the objects A to D toward the moving direction thereof (refer to each arrow in FIG. 5) based on the object information of the nth period regarding the objects A to D. Hereinafter, the expected route formula g(n) may be also simply referred to as a "formula g(n)". In this case, the formula g(n) is either one of the formulae ga(n), gb(n), gc(n), and gd(n).

<First Crossing Condition>

The first embodiment apparatus determines whether or not a condition (hereinafter, may be also referred to as a "first crossing condition") that a straight line expressed by the formula g(n) crosses at least one of a part within the left side effective length LLe(n) of the left side expected route and a part within the right side effective length LRe(n) of the right side expected route is satisfied. It should be noted that in the present specification, "two lines are crossing" means a situation where one line intersects an other line, and a situation where two lines contact with each other is not included.

In the example of FIG. 5, a straight line expressed by the formula ga(n) crosses the part within the left side effective length LLe(n) shown by a thick solid line at a point A1 and crosses the part within the right side effective length LRe(n) shown by a thick solid line at a point A2. Therefore, the formula ga(n) satisfies the first crossing condition. A straight line expressed by the formula gb(n) crosses the part within the left side effective length LLe(n) at a point B1 and therefore the formula gb(n) satisfies the first crossing condition. In contrast, straight lines expressed by the formula gc(n) and the formula gd(n) do not cross either of the part within the left side effective length LLe(n) and the part within the right side effective length LRe(n), and therefore the formula gc(n) and the formula gd(n) do not satisfy the first crossing condition.

<Calculation of a Coordinate of an Intersection Point P>

When the formula g(n) satisfies the first crossing condition, the first embodiment apparatus calculates a number of intersection points (first intersection points) at which the straight line expressed by the formula g(n) crosses the part within the left side effective length LLe(n) and/or the part within the right side effective length LRe(n).

When a number of the intersection points is two, the first embodiment apparatus calculates a coordinate of an intersection point at which the straight line expressed by the formula g(n) first crosses in the object moving direction as a coordinate of an intersection point P(n).

On the other hand, when a number of the intersection points is one, the first embodiment apparatus calculates a coordinate of this intersection point as the coordinate of the intersection point P(n).

In the example of FIG. 5, regarding the formula ga(n), a number of the intersection points is two (the points A1, A2) as described earlier. Therefore, the first embodiment apparatus calculates a coordinate of the intersection point A1 at which the straight line expressed by the formula ga(n) first crosses in the moving direction of the object A (a downward direction in FIG. 5) as a coordinate of an intersection point Pa(n). On the other hand, regarding the formula gb(n), a number of the intersection points is one (the point B1). Therefore, the first embodiment apparatus calculates a coordinate of the intersection point B1 as a coordinate of an intersection point Pb(n).

<Calculation of a Time t1>

The first embodiment apparatus calculates a time t1 expected to be required for an object to reach the expected route in order to determine whether or not a time condition (described later) is satisfied. Specifically, the first embodiment apparatus calculates, regarding an object whose straight line expressed by the formula g(n) crosses the part within the left side effective length LLe(n) or the part within the right side effective length LRe(n) at an intersection point P(n), a time t1(n) (a first time) required for this object to reach this intersection point P(n). The time t1(n) is calculated by dividing a length of the straight line from the position of the nth period of the object to the intersection point P(n) by the moving speed v(n) of the nth period of the object.

In the example of FIG. 5, the first embodiment apparatus calculates a time t1a(n) required for the object A to reach the intersection point Pa(n) and a time t1b(n) required for the object B to reach the intersection point Pb(n).

<Time Condition>

The first embodiment apparatus determines whether or not a time condition that the time t1(n) is less than or equal to a first predetermined time (4 s in the present example) is satisfied. When this time condition is satisfied for any of the formulae g(n)'s, the first embodiment apparatus determines that there exists a target object. On the other hand, when this time condition is not satisfied for any of the formulae g(n)'s, the first embodiment apparatus determines that there does not exist a target object.

In the example of FIG. 5, when t1a(n)=3 s and t1b(n)=10 s for example, the time t1a(n) is less than or equal to the first predetermined time, and so the time condition is satisfied for the formula ga(n). Therefore, the first embodiment apparatus determines that there exists a target object (that is, the object A). On the other hand, when t1a(n)=5 s and t1b(n)=10 s for example, both exceed the first predetermined time, and so the time condition is not satisfied for either of the formulae ga(n) or gb(n). Therefore, the first embodiment apparatus determines that there does not exist a target object.

<Alerting>

The first embodiment apparatus conducts an operation to alert the driver by generating the request signal when a target object is determined to exist, whereas when a target object is determined not to exist, the first embodiment apparatus does not generate the request signal and thus does not conduct the operation to alert the driver.

Specific Operation of the First Embodiment Apparatus

Next, a specific operation of the first embodiment apparatus will be described. CPU of the DSECU 10 of the first embodiment apparatus is configured to perform routines shown by flowcharts in FIG. 6 to FIG. 9 every time the predetermined calculation interval Tcal elapses. Hereinafter, the CPU of the DSECU 10 is simply referred to as a "CPU", CPU of the display ECU 20 is referred to as a "display CPU", and CPU of the warning ECU 30 is referred to as a "warning CPU".

Figure 6:
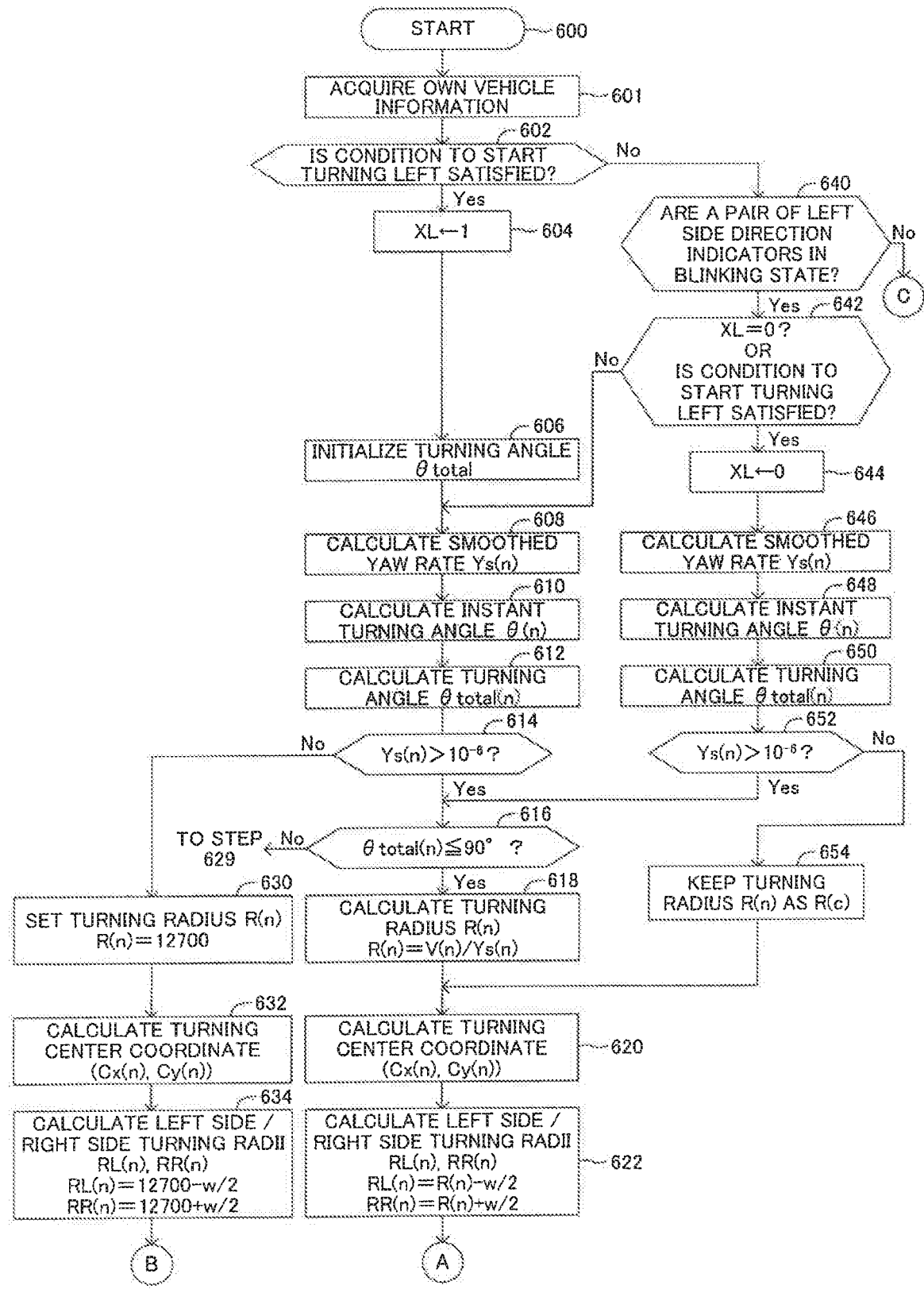
FIG. 6 is a flowchart (part 1) showing a routine which CPU (hereinafter, referred to as a "CPU of the first embodiment apparatus") of a driving support ECU of the first embodiment apparatus performs.

When a predetermined timing arrives, the CPU starts processing with a step 600 in FIG. 6, and proceeds to a step 601 to acquire the aforementioned own vehicle information. Thereafter, the CPU proceeds to a step 602 to determine whether or not the condition to start turning left mentioned above is satisfied based on the own vehicle information acquired at the step 601. When the condition to start turning left is satisfied, the CPU makes an "Yes" determination at the step 602, and performs processes from a step 604 to a step 612 stated below in order. As described earlier, the condition to start turning left is satisfied only once per one intersection. That is, the CPU makes an "Yes" determination at the step 602 only once per one intersection.

Step 604: The CPU sets a value of a turning-left-start-flag XL to "1". The value of the turning-left-start-flag XL is configured to be set to "1" from when the vehicle 100 tries to start turning left to when the vehicle 100 actually starts turning left, and to be set to "0" at a point in time at which the vehicle 100 actually starts turning left (refer to a step 644 described later).

Step 606: The CPU initializes the turning angle θtotal to 0° (θtotal(0)=0°. Refer to the formula (9).) A process of the step 606 is performed when the CPU makes an "Yes" determination at the step 602. Therefore, the initialization of the turning angle θtotal is performed only once when the condition to start turning left is satisfied, and thereafter, the initialization of the turning angle θtotal will not be performed until the vehicle 100 finishes turning left.

Step 608: The CPU calculates the smoothed yaw rate Ys(n) of the nth period as described above based on the yaw rate Y(n) stored in the RAM of the DSECU 10, and stores it in the RAM of the DSECU 10 (refer to the formulae (1L), (2L), (3), (4), (5L), and (6L)).

Step 610: The CPU calculates the instant turning angle θ(n) of the nth period as described above, and stores it in the RAM of the DSECU 10 (refer to the formulae (7) and (8)).

Step 612: The CPU calculates the turning angle θtotal(n) by which the vehicle 100 has turned from the 0th period to the nth period as described above and stores it in the RAM of the DSECU 10 (refer to the formulae (9) and (10)).

Next, the CPU proceeds to a step 614 to determine whether or not the smoothed yaw rate Ys(n) calculated at the step 608 satisfies Ys(n)>Y0 (=$10^{-6}$). When Ys(n)>Y0 is satisfied, the CPU makes an "Yes" determination at the step 614 to proceed to a following step 616. It should be noted that a case where the CPU makes an "Yes" determination at the step 614 is typically a case where the vehicle 100 has temporarily turned in the left direction when the vehicle 100 is traveling straight to a point where the turning is allowed after trying to start turning left.

The CPU determines, at a step 616, whether or not the turning angle θtotal(n) calculated at the step 612 and a step 650 described later satisfies θtotal(n)≤90° (a predetermined angle, a turning expected angle of when turning left or right). when θtotal(n)≤90° is satisfied, the CPU makes an "Yes" determination at the step 616 (that is, determines that the vehicle 100 is still turning left), and performs processes from a step 618 to a step 628 stated below in order. In contrast, when the turning angle θtotal(n) calculated at the step 612 and the step 650 exceeds 90°, the CPU makes a "No" determination at the step 616 (that is, determines that the vehicle 100 has finished turning left), and proceeds to a step 629 to tentatively terminate the present routine.

Step 618: The CPU calculates the turning radius R(n) of the nth period by dividing the "vehicle speed V(n)" by the "smoothed yaw rate Ys(n) calculated at the step 608", and stores it in the RAM of the DSECU 10 (refer to the formulae (12) and (14)).

Step 620: The CPU calculates the turning center coordinate (Cx(n), Cy(n)) of the nth period as described above based on the turning radius R(n) calculated at the step 618, and stores it in the RAM of the DSECU 10.

Step 622: The CPU calculates the left side turning radius RL(n) of the nth period by subtracting the half vehicle width length w/2 of the vehicle 100 from the turning radius R(n) calculated at the step 618 (refer to the formula (15)). In addition, the CPU calculates the right side turning radius RR(n) of the nth period by adding the half vehicle width length w/2 of the vehicle 100 to the turning radius R(n) calculated at the step 618 (refer to the formula (16)). The CPU stores the left side turning radius RL(n) and the right side turning radius RR(n) in the RAM of the DSECU 10.

Step 624 (refer to FIG. 7): The CPU calculates the left side expected route formula fL(n) of the nth period based on the turning center coordinate (Cx(n), Cy(n)) calculated at the step 620 and the left side turning radius RL(n) calculated at the step 622 (fL(n): $(x-Cx(n))^2+(y-Cy(n))^2=RL(n)^2$. Refer to the formula (19).) In addition, the CPU calculates the right side expected route formula fR(n) of the nth period based on the turning center coordinate (Cx(n), Cy(n)) calculated at the step 620 and the right side turning radius RR(n) calculated at the step 622 (fR(n): $(x-Cx(n))^2+(y-Cy(n))^2=RR(n)^2$. Refer to the formula (20).) The CPU stores these formulae fL(n) and fR(n) in the RAM of the DSECU 10.

Step 626: The CPU calculates the effective length LLe(n) of the left side expected route of the nth period based on the turning angle θtotal(n) calculated at the step 612 and the left side turning radius RL(n) calculated at the step 622 (LLe(n)=RL(n)·(90°−θtotal(n))·π/180°. Refer to the formula (22).). In addition, the CPU calculates the effective length LRe(n) of the right side expected route of the nth period based on the turning angle θtotal(n) calculated at the step 612 and the right side turning radius RR(n) calculated at the step 622 (LRe(n)=RR(n)·(90°−θtotal(n))·π/180°. Refer to the formula (23).). The CPU stores these effective lengths LLe(n) and LRe(n) in the RAM of the DSECU 10. The CPU proceeds to the step 628 after finishing the process of the step 626.

Figure 7:
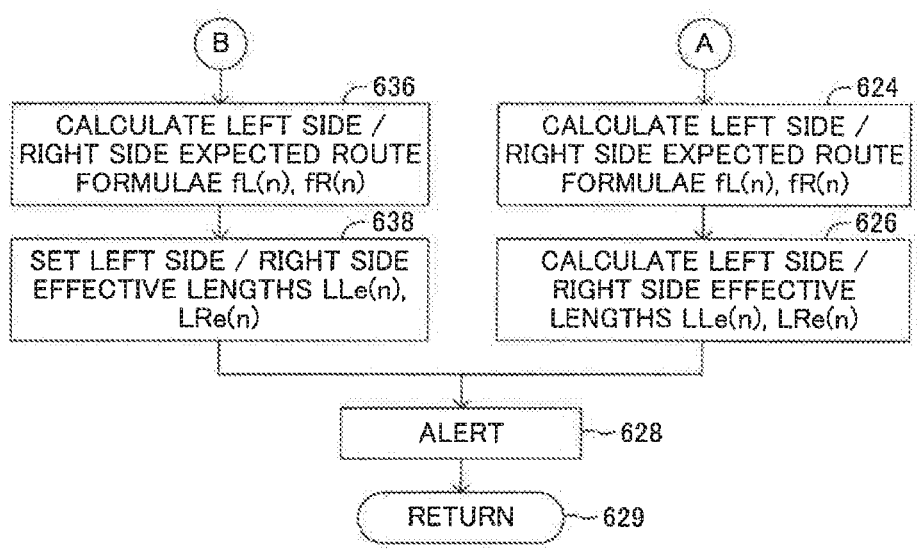
FIG. 7 is a flowchart (part 2) showing a routine which the CPU of the first embodiment apparatus performs.
Figure 10:
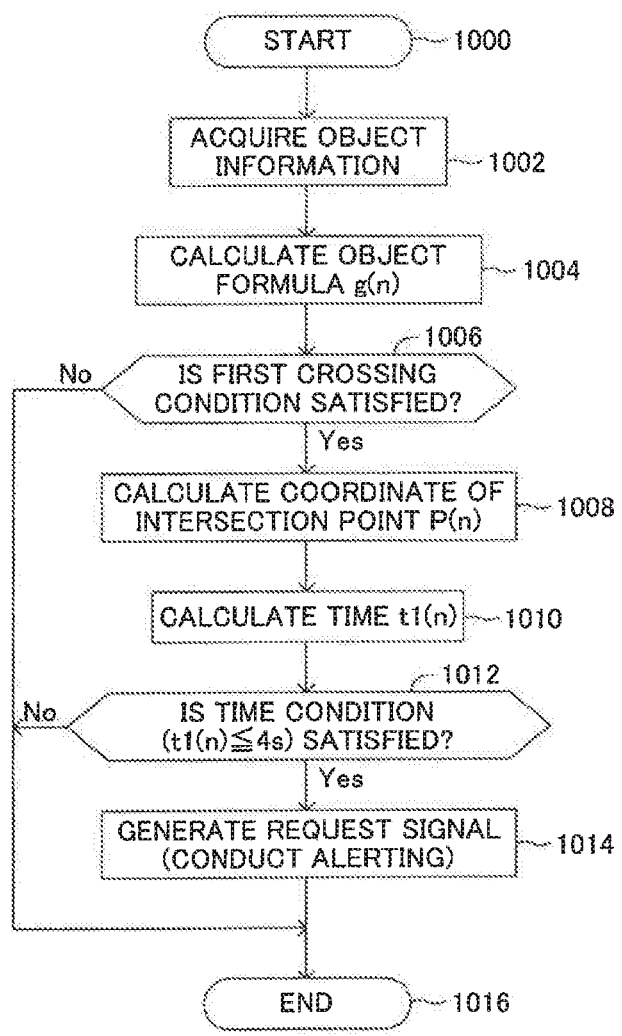
FIG. 10 is a flowchart showing a routine which the CPU of the first embodiment apparatus performs.

In the routines in FIG. 6 and FIG. 7, the CPU is configured to perform a routine shown by a flowchart in FIG. 10 at the step 628. It should be noted that in this routine, a case where object information regarding one object is acquired will be described, however, in a case where object information regarding a plurality of objects is acquired, the routine will be repeated for the object information of each object. At the step 628, the CPU starts processing from a step 1000 in FIG. 10, and performs processes of a step 1002 and a step 1004 stated below in order.

Step 1002: The CPU acquires the object information of the nth period of the object which exists around the vehicle 100 as described above, and stores it in the RAM of the DSECU 10.

Step 1004: The CPU calculates the expected route formula g(n) of the nth period of the object based on the object information acquired at the step 1002, and stores it in the RAM of the DSECU 10.

Next, the CPU proceeds to a step 1006 to determine whether or not the expected route formula g(n) of the object calculated at the step 1004 satisfies the first crossing condition. When the first crossing condition is satisfied, the CPU makes an "Yes" determination at the step 1006, and performs processes of a step 1008 and a step 1010 stated below in order.

Step 1008: The CPU calculates the coordinate of the intersection point P(n) at which the straight line expressed by the formula g(n) crosses the part within the left side effective length LLe(n) or the part within the right side effective length LRe(n) as described above, and stores it in the RAM of the DSECU 10.

Step 1010: The CPU calculates the time t1(n) required for the object to reach the intersection point P(n) as described above, and stores it in the RAM of the DSECU 10.

Subsequently, the CPU proceeds to a step 1012 to determine whether or not the time t1(n) calculated at the step 1010 satisfies the time condition (t1(n)≤4 s (=the first predetermined time)). When the time condition is satisfied, the CPU makes an "Yes" determination at the step 1012 (that is, determines that there exists a target object), and performs a process of a following step 1014.

Step 1014: The CPU generates the request signal to alert the driver of the vehicle 100 to transmit this request signal to the display CPU and the warning CPU. Thereby, the alerting is performed by the display apparatus 21 and the buzzer 31. After finishing the process of the step 1014, the CPU proceeds to the step 629 in FIG. 7 via a step 1016 to tentatively terminate the present routine.

In contrast, when the formula g(n) calculated at the step 1004 does not satisfy the first crossing condition, the CPU makes a "No" determination at the step 1006 (that is, determines that there does not exist a target object). Thereafter, the CPU proceeds to the step 629 in FIG. 7 via the step 1016 to tentatively terminate the present routine. Similarly, when the time t1(n) calculated at the step 1010 does not satisfy the above time condition, the CPU makes a "No" determination at the step 1012 (that is, determines that there does not exist a target object), and proceeds to the step 629 in FIG. 7 via the step 1016 to tentatively terminate the present routine.

In contrast, when the smoothed yaw rate Ys(n) calculated at the step 608 is less than or equal to Y0 (Ys(n)≤Y0) at a point in time when the CPU performs the process of the step 614 in FIG. 6, the CPU makes a "No" determination at the step 614, and performs processes from a step 630 to a step 638 stated below in order. It should be noted that cases where the CPU makes a "No" determination at the step 614 are typically as follows.

A case where the vehicle 100 is stopping in order to turn left, waiting for a light to change.

A case where the vehicle 100 is traveling straight to a point where the turning is allowed after trying to start turning left.

A case where the smoothed yaw rate Ys is calculated as a negative value as a result of the vehicle 100 having temporarily turned in the right direction when the vehicle 100 is traveling straight to a point where the turning is allowed after trying to start turning left.

Step 630: The CPU sets the turning radius R(n) of the nth period to 12700m, and stores it in the RAM of the DSECU 10 (refer to the formula (11)).

Step 632: The CPU calculates the turning center coordinate (Cx(n), Cy(n)) of the nth period as described above based on the turning radius R(n) set at the step 630, and stores it in the RAM of the DSECU 10.

Step 634: The CPU calculates the left side turning radius RL(n) of the nth period by subtracting the half vehicle width w/2 of the vehicle 100 from the turning radius R(n) (=12700m) set at the step 630 (RL(n)=12700−w/2. Refer to the formula (15).). In addition, the CPU calculates the right side turning radius RR(n) of the nth period by adding the half vehicle width w/2 of the vehicle 100 to the turning radius R(n) set at the step 630 (RR(n)=12700+w/2. Refer to the formula (16).). The CPU stores the left side turning radius RL(n) and the right side turning radius RR(n) in the RAM of the DSECU 10.

Step 636 (refer to FIG. 7): The CPU calculates the left side expected route formula fL(n) of the nth period as described above based on the turning center coordinate (Cx(n), Cy(n)) calculated at the step 632 and the left side turning radius RL(n) calculated at the step 634 (refer to the formula (19)). In addition, the CPU calculates the right side expected route formula fR(n) of the nth period as described above based on the turning center coordinate (Cx(n), Cy(n)) calculated at the step 632 and the right side turning radius RR(n) calculated at the step 634 (refer to the formula (20)). Each of the expected route formulae fL(n) and fR(n) calculated at the step 636 is approximated to a formula of a line. The CPU stores these formulae fL(n) and fR(n) in the RAM of the DSECU 10.

Step 638: The CPU sets a part of the left side expected route formula fL(n) calculated at the step 636 which is extending to the traveling direction of the vehicle 100 from the left end OL(n), having a length of 15m as the effective length LLe(n) of the left side expected route of the nth period (refer to the formula (21)). In addition, the CPU sets a part of the right side expected route formula fR(n) calculated at the step 636 which is extending to the traveling direction of the vehicle 100 from the right end OR(n), having a length of 15m as the effective length LRe(n) of the right side expected route of the nth period (refer to the formula (21)). After finishing the process of the step 638, the CPU performs the process of the step 628 (that is, performs the routine shown in FIG. 10), and thereafter, proceeds to the step 629 to tentatively terminate the present routine.

In contrast, when the condition to start turning left has not been satisfied at a point in time when the CPU performs the process of the step 602 in FIG. 6, the CPU makes a "No" determination at the step 602, and proceeds to a step 640 to determine whether or not a pair of the left side direction indicators are in the blinking state. It should be noted that cases where the CPU makes a "No" determination at the step 602 are as follows.

A case where the CPU makes a determination of the step 602 after determining for the first time that the condition to start turning left has been satisfied after determining that an immediately previous turning left or right finished.

A case where the condition to start turning left has not been satisfied even once after the CPU determines that the immediately previous turning left or right finished.

Now, assume that the CPU makes a determination of the step 602 after determining for the first time that the condition to start turning left has been satisfied after determining that the immediately previous turning left or right finished, and as a result, the CPU makes a "No" determination at the step 602. Further, assume that the driver has an intention to start turning left and therefore maintains a pair of the left side direction indicators in the blinking state. In this case, the CPU makes an "Yes" determination at the step 640, and proceeds to the step 642.

At the step 642, the CPU determines whether or not at least one of a condition that the value of the turning-left-start-flag XL is "0" and the condition to start a turning-left-state is satisfied. The CPU determines whether or not the condition to start a turning-left-state is satisfied based on the own vehicle information acquired at the step 601. The CPU proceeds to the step 644 when the determination condition at the step 642 is satisfied whereas proceeds to the step 608 when the determination condition at the step 642 is not satisfied.

According to the aforementioned assumption, the condition to start turning left has been satisfied after the CPU determines that the immediately previous turning left or right finished, and therefore the value of the turning-left-start-flag XL has been set to "1" at the step 604. Thus, in this case, the CPU makes an "Yes" determination at the step 642 (that is, determines that the vehicle 100 is in the turning-left-state) only when the condition to start a turning-left-state is satisfied, and performs processes from the step 644 to a step 650 in order.

Step 644: The CPU sets the value of the turning-left-start-flag XL to "0". Thereby, the value of the turning-left-start-flag XL is set to "0" from when the vehicle 100 actually starts turning left (from when the condition to start a turning-left-state is satisfied) to when the condition to start turning left is satisfied at a next intersection, and is set to "1" at a point in time when the vehicle 100 tries to start turning left at the next intersection (refer to the steps 602 and 604). Therefore, after the condition to start a turning-left-state is satisfied for the first time ("Yes" at the step 642), even when the condition to start a turning-left-state comes not to be satisfied, the value of the turning-left-start-flag XL is maintained "0" until the condition to start turning left is satisfied at the next intersection. Hence, in such a case, the CPU makes an "Yes" determination at the step 642 (that is, determines that the turning-left-state is satisfied).

Step 646: The CPU performs a same process as the process at the step 608, and calculates the smoothed yaw rate Ys(n) of the nth period (refer to the formulae (1L), (2L), (3), (4), (5L), and (6L)).

Step 648: The CPU performs a same process as the process at the step 610, and calculates the instant turning angle θ(n) of the nth period (refer to the formula (8)).

Step 650: The CPU performs a same process as the process at the step 612, and calculates the turning angle θtotal(n) (refer to the formula (10)).

Next, the CPU proceeds to a step 652 to determine whether or not the smoothed yaw rate Ys(n) calculated at the step 646 satisfies Ys(n)>Y0. When Ys(n)>Y0 is satisfied, the CPU makes an "Yes" determination at the step 652 to proceed to the aforementioned step 616. When the CPU makes an "Yes" determination at the step 616, the CPU performs the aforementioned processes from the step 618 to the step 628 in order, and thereafter proceeds to the step 629 to tentatively terminate the present routine. It should be noted that a case where the CPU makes an "Yes" determination at the step 652 is typically a case where the vehicle 100 turns in the left direction after actually starting to turn left.

On the other hand, when the smoothed yaw rate Ys(n) calculated at the step 646 is less than or equal to Y0 Ys(n)≤Y0, the CPU makes a "No" determination at the step 652, and performs a process of a following step 654. It should be noted that cases where the CPU makes a "No" determination at the step 652 are typically as follows.

A case where the vehicle 100 is temporarily stopping around a center of the intersection in order to wait for an oncoming vehicle and a pedestrian to pass through after actually starting to turn left.

A case where the smoothed yaw rate Ys is calculated as a negative value as a result of the vehicle 100 temporarily turning in the right direction after actually starting to turn left.

Step 654: The CPU keeps the turning radius R(n) as the turning radius R(c) of the cth period (refer to the formula (13)). After finishing the process of the step 654, the CPU performs the aforementioned processes from the step 620 to the step 628 in order, and thereafter proceeds to the step 629 to tentatively terminate the present routine.

In contrast, when the value of the turning-left-start-flag XL is "1" and the condition to start a turning-left-state is not satisfied at a point in time when the CPU performs the process of the step 642, the CPU makes a "No" determination at the step 642, and proceeds to the step 608. The processes after the step 608 are as described above. It should be noted that a case where the CPU makes a "No" determination at the step 642 is typically a case where the vehicle 100 has not yet actually turned left although the vehicle 100 tried to start turning left.

Figure 8:
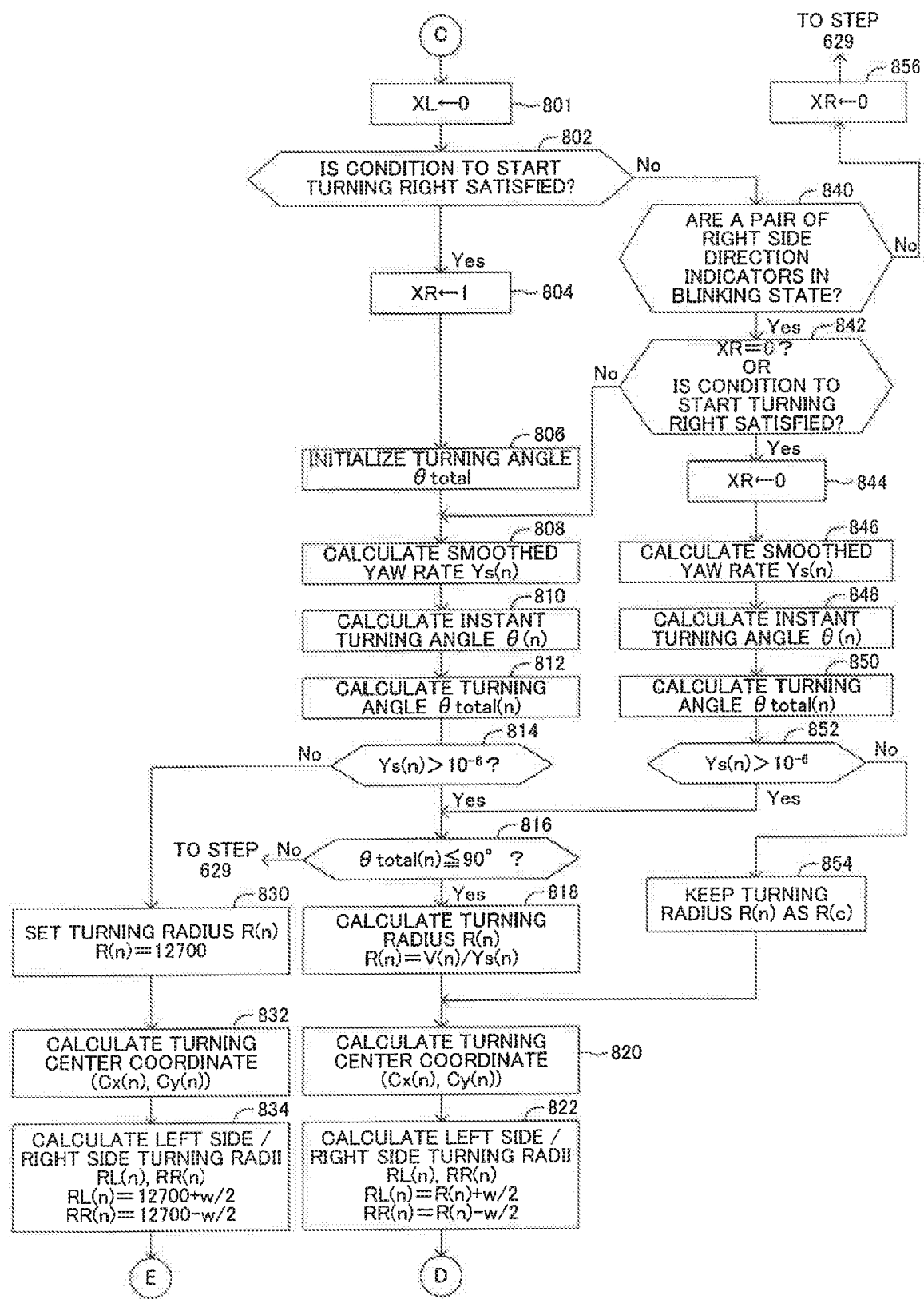
FIG. 8 is a flowchart (part 3) showing a routine which the CPU of the first embodiment apparatus performs.
Figure 9:
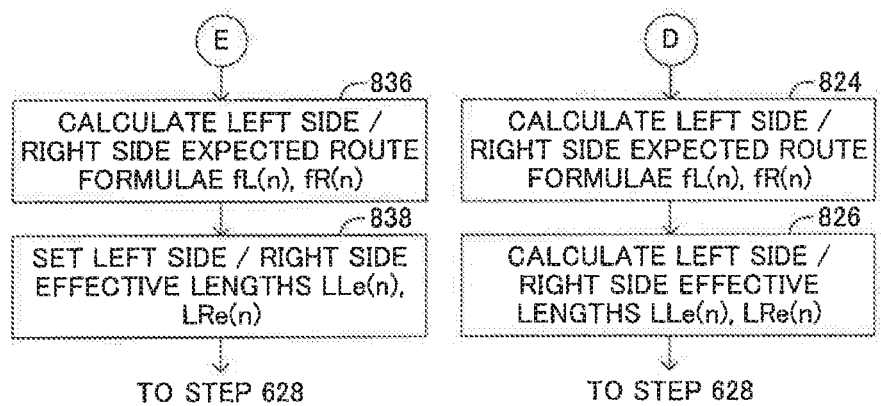
FIG. 9 is a flowchart (part 4) showing a routine which the CPU of the first embodiment apparatus performs.

On the other hand, in following cases, the CPU makes a "No" determination at the step 640, and proceeds to a step 801 in FIG. 8.

A case where the condition to start turning left has not been satisfied even once after the CPU determines that the immediately previous turning left or right finished (step 602: No) and a pair of the left side direction indicators are not in the blinking state.

A case where the CPU makes a determination of the step 602 after determining for the first time that the condition to start turning left has been satisfied after determining that the immediately previous turning left or right finished, and as a result, the CPU makes a "No" determination at the step 602, but a pair of the left side direction indicators come not to be in the blinking state.

Step 801: The CPU sets the value of the turning-left-start-flag XL to "0". Thereby, it is prevented that processes after a step 802 are performed with the value of the turning-left-start-flag XL maintained "1". After finishing the process of the step 801, the CPU proceeds to the step 802.

At the step 802, the CPU determines whether or not the condition to start turning right mentioned above is satisfied based on the own vehicle information acquired at the step 601. When the condition to start turning right is satisfied, the CPU makes an "Yes" determination at the step 802, and performs processes from a step 804 to a step 812 stated below in order. As described earlier, the CPU makes an "Yes" determination at the step 802 only once per one intersection.

Step 804: The CPU sets a value of a turning-right-start-flag XR to "1". The value of the turning-right-start-flag XR is configured to be set to "1" from when the vehicle 100 tries to start turning right to when the vehicle 100 actually starts turning right, and to be set to "0" at a point in time at which the vehicle 100 actually starts turning right (refer to a step 844 described later).

Step 806: The CPU initializes the turning angle θtotal to 0° (refer to the formula (9)). The initialization of the turning angle θtotal is performed only once when the condition to start turning right is satisfied, and thereafter, the initialization of the turning angle θtotal will not be performed until the vehicle 100 finishes turning right.

Step 808: The CPU calculates the smoothed yaw rate Ys(n) of the nth period as described above based on a value calculated by multiplying the yaw rate Y(n) stored in the RAM of the DSECU 10 by −1 (refer to the formulae (1R), (2R), (3), (4), (5R), and (6R)).

Step 810: The CPU performs a same process as the process of the step 610 to calculate the instant turning angle θ(n) of the nth period (refer to the formulae (7) and (8)).

Step 812: The CPU performs a same process as the process of the step 612 to calculate the turning angle θtotal(n) (refer to the formulae (9) and (10)).

Next, the CPU proceeds to a step 814, and performs a same process as the process of the step 614. That is, when the smoothed yaw rate Ys(n) calculated at the step 808 satisfies Ys(n)>Y0, the CPU makes an "Yes" determination at the step 814 to proceed to a following step 816. It should be noted that a case where the CPU makes an "Yes" determination at the step 814 is typically a case where the vehicle 100 has temporarily turned in the right direction when the vehicle 100 is traveling straight to a point where the turning is allowed after trying to start turning right.

At the step 816, the CPU performs a same process as the process of the step 616. That is, when the turning angle θtotal(n) calculated at the step 812 satisfies θtotal(n)≤90° (the predetermined angle, the turning expected angle of when turning left or right), the CPU makes an "Yes" determination at the step 816 (that is, determines that the vehicle 100 is still turning right), and performs processes from a step 818 to a step 826 and the step 628 stated below in order. In contrast, when the turning angle θtotal(n) calculated at the step 812 exceeds 90°, the CPU makes a "No" determination at the step 816 (that is, determines that the vehicle 100 has finished turning right), and proceeds to the step 629 to tentatively terminate the present routine.

Step 818: The CPU performs a same process as the process of the step 618 to calculate the turning radius R(n) of the nth period (refer to the formulae (12) and (14)). It should be noted that the step 608 in the process of the step 618 is substituted with the step 808 in this step.

Step 820: The CPU performs a same process as the process of the step 620 to calculate the turning center coordinate (Cx(n), Cy(n)) of the nth period. It should be noted that the step 618 in the process of the step 620 is substituted with the step 818 in this step.

Step 822: The CPU calculates the left side turning radius RL(n) of the nth period by adding the half vehicle width length w/2 of the vehicle 100 to the turning radius R(n) calculated at the step 818 (refer to the formula (17)). In addition, the CPU calculates the right side turning radius RR(n) of the nth period by subtracting the half vehicle width length w/2 of the vehicle 100 from the turning radius R(n) calculated at the step 818 (refer to the formula (18)). The CPU stores the left side turning radius RL(n) and the right side turning radius RR(n) in the RAM of the DSECU 10.

Step 824 (refer to FIG. 9): The CPU performs a same process as the process of the step 624 to calculate the left side expected route formula fL(n) and the right side expected route formula fR(n) of the nth period (refer to the formulae (19) and (20)). It should be noted that the step 620 and the step 622 in the process of the step 624 are substituted with the step 820 and the step 822 in this step, respectively.

Step 826: The CPU performs a same process as the process of the step 626 to calculate the effective length LLe(n) of the left side expected route of the nth period and the effective length LRe(n) of the right side expected route of the nth period (refer to the formulae (22) and (23)). It should be noted that the step 612 and the step 622 in the process of the step 626 are substituted with the step 812 and the step 822 in this step, respectively. After finishing the process of the step 826, the CPU proceeds to the step 628 shown in FIG. 6.

As described earlier, the CPU performs the routine shown by the flowchart in FIG. 10 at the step 628. This routine is as described above, and thus a description thereof will be omitted.

In contrast, when the smoothed yaw rate Ys(n) calculated at the step 808 is less than or equal to Y0 (Ys(n)≤Y0) at a point in time when the CPU performs the process of the step 814 in FIG. 8, the CPU makes a "No" determination at the step 814, and performs processes from a step 830 to a step 838 stated below in order. It should be noted that cases where the CPU makes a "No" determination at the step 814 are typically as follows.

- A case where the vehicle 100 is stopping in order to turn right, waiting for a light to change.
- A case where the vehicle 100 is traveling straight to a point where the turning is allowed after trying to start turning right,
- A case where the smoothed yaw rate Ys is calculated as a negative value as a result of the vehicle 100 having temporarily turned in the left direction when the vehicle 100 is traveling straight to a point where the turning is allowed after trying to start turning right.

Step 830: The CPU performs a same process as the process of the step 630 to set the turning radius R(n) of the nth period to 12700m (refer to the formula (11)).

Step 832: The CPU performs a same process as the process of the step 632 to calculate the turning center coordinate (Cx(n), Cy(n)) of the nth period. It should be noted that the step 630 in the process of the step 632 is substituted with the step 830 in this step.

Step 834: The CPU calculates the left side turning radius RL(n) of the nth period by adding the half vehicle width w/2 of the vehicle 100 to the turning radius R(n) set at the step 830 (RL(n)=12700+w/2. Refer to the formula (17).). In addition, the CPU calculates the right side turning radius RR(n) of the nth period by subtracting the half vehicle width w/2 of the vehicle 100 from the turning radius R(n) set at the step 830 (RR(n)=12700−w/2. Refer to the formula (18).). The CPU stores the left side turning radius RL(n) and the right side turning radius RR(n) in the RAM of the DSECU 10.

Step 836 (refer to FIG. 9): The CPU performs a same process as the process of the step 636 to calculate the left side expected route formula fL(n) and the right side expected route formula fR(n) of the nth period (refer to the formulae (19) and (20)). It should be noted that the step 632 and the step 634 in the process of the step 636 are substituted with the step 832 and the step 834 in this step, respectively.

Step 838: The CPU performs a same process as the process of the step 638 to calculate the effective length LLe(n) of the left side expected route of the nth period and the effective length LRe(n) of the right side expected route of the nth period (refer to the formula (21)). It should be noted that the step 636 in the process of the step 638 is substituted with the step 836 in this step. After finishing the process of the step 838, the CPU performs the step 628 shown in FIG. 7, and thereafter the CPU proceeds to the step 629 to tentatively terminate the present routine.

In contrast, when the condition to start turning right has not been satisfied at a point in time when the CPU performs the process of the step 802 in FIG. 8, the CPU makes a "No" determination at the step 802, and proceeds to a step 840 to determine whether or not a pair of the right side direction indicators are in the blinking state. It should be noted that cases where the CPU makes a "No" determination at the step 802 are cases where the CPU makes a "No" determination at the aforementioned step 640 and besides, either of following cases is satisfied.

A case where the CPU makes a determination of the step 802 after determining for the first time that the condition to start turning right has been satisfied after determining that the immediately previous turning left or right finished.

A case where the condition to start turning right has not been satisfied even once after the CPU determines that the immediately previous turning left or right finished.

Now, assume that the CPU makes a determination of the step 802 after determining for the first time that the condition to start turning right has been satisfied after determining that the immediately previous turning left or right finished, and as a result, the CPU makes a "No" determination at the step 802. Further, assume that the driver has an intention to start turning right and therefore maintains a pair of the right side direction indicators in the blinking state. In this case, the CPU makes an "Yes" determination at the step 840, and proceeds to the step 842.

At the step 842, the CPU determines whether or not at least one of a condition that the value of the turning-right-start-flag XR is "0" and the condition to start a turning-right-state is satisfied. The CPU determines whether or not the condition to start a turning-right-state is satisfied based on the own vehicle information acquired at the step 601. The CPU proceeds to the step 844 when the determination condition at the step 842 is satisfied whereas proceeds to the step 808 when the determination condition at the step 842 is not satisfied.

According to the aforementioned assumption, the condition to start turning right has been satisfied after the CPU determines that the immediately previous turning left or right finished, and therefore the value of the turning-right-start-flag XR has been set to "1" at the step 804. Thus, in this case, the CPU makes an "Yes" determination at the step 842 (that is, determines that the vehicle 100 is in the turning-right-state) only when the condition to start a turning-right-state is satisfied, and performs processes from the step 844 to a step 850 in order.

Step 844: The CPU sets the value of the turning-right-start-flag XR to "0". Thereby, the value of the turning-right-start-flag XR is set to "0" from when the vehicle 100 actually starts turning right (from when the condition to start a turning-right-state is satisfied) to when the condition to start turning right is satisfied at a next intersection, and is set to "1" at a point in time when the vehicle 100 tries to start turning right at the next intersection (refer to the steps 802 and 804). Therefore, after the condition to start a turning-right-state is satisfied for the first time ("Yes" at the step 842), even when the condition to start a turning-right-state comes not to be satisfied, the value of the turning-right-start-flag XR is maintained "0" until the condition to start turning right is satisfied at the next intersection. Hence, in such a case, the CPU makes an "Yes" determination at the step 842 (that is, determines that the turning-right-state is satisfied).

Step 846: The CPU performs a same process as the process at the step 808, and calculates the smoothed yaw rate Ys(n) of the nth period (refer to the formulae (1R), (2R), (3), (4), (5R), and (6R)).

Step 848: The CPU performs a same process as the process at the step 810, and calculates the instant turning angle θ(n) of the nth period (refer to the formula (8)).

Step 850: The CPU performs a same process as the process at the step 812, and calculates the turning angle θtotal(n) (refer to the formula (10)).

Next, the CPU proceeds to a step 852, and performs a same process as the process at the step 652. That is, when the smoothed yaw rate Ys(n) calculated at the step 846 satisfies Ys(n)>Y0, the CPU makes an "Yes" determination at the step 852 to proceed to the aforementioned step 816. When the CPU makes an "Yes" determination at the step 816, the CPU performs the aforementioned processes from the step 818 to the step 826 and the step 628 in order, and thereafter proceeds to the step 629 to tentatively terminate the present routine. It should be noted that a case where the CPU makes an "Yes" determination at the step 852 is typically a case where the vehicle 100 turns in the right direction after actually starting to turn right.

On the other hand, when the smoothed yaw rate Ys(n) calculated at the step 846 is less than or equal to Y0 (Ys(n)≤Y0), the CPU makes a "No" determination at the step 852, and performs a process of a following step 854. It should be noted that cases where the CPU makes a "No" determination at the step 852 are typically as follows.

A case where the vehicle 100 is temporarily stopping around a center of the intersection in order to wait for an oncoming vehicle and a pedestrian to pass through after actually starting to turn right.

A case where the smoothed yaw rate Ys is calculated as a negative value as a result of the vehicle 100 temporarily turning in the left direction after actually starting to turn right.

Step 854: The CPU performs a same process as the process at the step 654 to keep the turning radius R(n) as the turning radius R(c) of the cth period (refer to the formula (13)). After finishing the process of the step 854, the CPU performs the aforementioned processes from the step 820 to the step 826 and the step 628 in order, and thereafter proceeds to the step 629 to tentatively terminate the present routine.

In contrast, when the value of the turning-right-start-flag XR is "1" and the condition to start a turning-right-state is not satisfied at a point in time when the CPU performs the process of the step 842, the CPU makes a "No" determination at the step 842, and proceeds to the step 808. The processes after the step 808 are as described above. It should be noted that a case where the CPU makes a "No" determination at the step 842 is typically a case where the vehicle 100 has not yet actually turned right although the vehicle 100 tried to start turning right.

On the other hand, when a pair of the right side direction indicators are in the unlit state, the CPU makes a "No" determination at the step 840 to proceed to a step 856. It should be noted that a case where the CPU makes a "No" determination at the step 840 is typically a case where a pair of the left side direction indicators and a pair of the right side direction indicators are both in the unlit state (step 640: No, step 840: No), and besides the vehicle 100 is traveling straight.

Step 856: The CPU sets the value of the turning-right-start-flag XR to "0". After finishing the process of the step 856, the CPU proceeds to the step 629 to tentatively terminate the present routine.

Effects of the first embodiment apparatus of the present invention will be described. The first embodiment apparatus determines whether or not the condition to start turning left/right and the condition to start a turning-left/right-state are satisfied based on the own vehicle information acquired by the sensors 11, 12, 13L, 13R, 14, 15, and 17 to 19 mounted in the vehicle 100. Therefore, even when a self position estimation by GNSS and/or wireless communication cannot be performed, it is possible to properly determine whether or not the vehicle 100 is turning left or right at the intersection based on the aforementioned own vehicle information.

In addition, the first embodiment apparatus calculates the left side effective length LLe of the left side expected route using a value based on a product of the remaining turning angle (90°−turning angle θtotal) and the left side turning radius RL, and calculates the right side effective length LRe of the right side expected route using a value based on a product of the remaining turning angle and the right side turning radius RR. In other words, the left side effective length LLe is a length of a circular arc corresponding to the remaining turning angle (90°−turning angle θtotal) out of the circle expressed by the left side expected route formula fL, and the right side effective length LRe is a length of a circular arc corresponding to the remaining turning angle out of the circle expressed by the right side expected route formula fR.

That is, according to the first embodiment apparatus, the left side effective length LLe(n) and the right side effective length LRe(n) are calculated based on the turning angle θtotal of the vehicle 100, and these effective lengths LLe and LRe becomes shorter as the turning angle θtotal becomes larger (that is, as an action of the turning left or right progresses in the intersection). Therefore, a possibility that parts of the effective lengths LLe and LRe of the expected routes exceed a traffic lane which the vehicle 100 is supposed to enter and intrudes into an opposite lane to this traffic lane or a pavement/sidewalk adjacent to this opposite lane can be greatly reduced. Thus, a possibility that the driver is unnecessarily alerted when the vehicle 100 is in the turning-left-state or in the turning-right-state at the intersection even in a case where a self position estimation by GNSS and/or wireless communication cannot be performed and therefore a more proper alerting of the driver can be conducted.

Especially, in the first embodiment apparatus, the left side expected route which is an expected route of the left end OL of the vehicle 100 and the right side expected route which is an expected route of the right end OR of the vehicle 100 are estimated individually. The left side expected route and the right side expected route constitute edges of a region through which a body of the vehicle 100 is expected to pass. Therefore, for example, in comparison to a configuration where an expected route through which a position O of the vehicle 100 (that is, a center of the vehicle 100 in the vehicle width direction) is expected to pass is estimated, it becomes possible to estimate expected routes closer to an actual traveling route of the vehicle 100. As a result, a determination of whether or not the alerting is necessary can be made with a higher accuracy. In addition, the first embodiment apparatus uses, as the estimated turning radius, the left side turning radius RL for the left side expected route and the right side turning radius RR for the right side expected route when calculating the effective lengths LLe and LRe of the expected routes. Therefore, each of the effective lengths LLe and LRe can be properly calculated. According to this configuration as well, a determination of whether or not the alerting is necessary can be made with a higher accuracy.

Further, in general, when the driver tries to start turning the vehicle 100 left or right, the driver performs any one of following operations, that is, an operation to operate the winker lever after decelerating the vehicle 100 until the vehicle speed V of the vehicle 100 becomes a speed suitable for trying to start turning left or right (that is, $V1th \leq V \leq V2th$), an operation to decelerate the vehicle 100 to the aforementioned speed after operating the winker lever, or an operation to perform the operation of the winker lever and the deceleration of the vehicle 100 to the aforementioned speed at a same time. Therefore, by making a determination of whether or not the vehicle 100 is trying to start turning left or right based on the condition to start turning left Ls1 to Ls3 or the condition to start turning right Rs1 to Rs3 mentioned above, it becomes possible to properly determine whether or not the vehicle 100 is trying to start turning left or right (that is, whether or not the driver is trying to start turning the vehicle 100 left or right).

Further, the first embodiment apparatus determines that the vehicle 100 has actually started turning left (that is, the turning-left-state has occurred) when it is determined that, in a case when a pair of the left side direction indicators are in the blinking state, all of the aforementioned condition to start a turning-left-state Lt1 to Lt6 is satisfied for the first time after being determined that the vehicle 100 is trying to start turning left (that is, after the condition to start turning left is satisfied). Similarly, the first embodiment apparatus determines that the vehicle 100 has actually started turning right (that is, the turning-right-state has occurred) when it is determined that, in a case when a pair of the right side direction indicators are in the blinking state, all of the aforementioned condition to start a turning-right-state Rt1 to Rt6 is satisfied for the first time after being determined that the vehicle 100 is trying to start turning right (that is, after the condition to start turning right is satisfied). Therefore, even when the first embodiment apparatus does not have a function to estimate a self position by GNSS and/or wireless communication or when the first embodiment apparatus cannot make use of this function in spite of having it, it becomes possible to properly determine when the vehicle 100 has actually started turning left or right.

In addition, the first embodiment apparatus calculates the first time t1 only when the straight line expressed by the formula g crosses a part within the effective length of the expected route, and does not calculate the first time t1 when the straight line expressed by the formula g crosses a part other than the effective length of the expected route. Therefore, a processing time can be shortened. Further, in the aforementioned configuration, when a number of the first intersection points is two, the first embodiment apparatus calculates the first time t1 only regarding a first intersection point at which the straight line expressed by the formula g first crosses a part within the effective length of the expected route in the moving direction of the object at a current point in time. Therefore, in comparison to a configuration where the first embodiment apparatus calculates the first time regarding a first intersection point at which this straight line crosses a part within the effective length of the expected route second time in the moving direction of the object at a current point in time, a determination of whether or not the object crosses a part within the effective length of the expected route can be made faster. Therefore, a more proper alerting of the driver can be conducted.

Further, in the first embodiment apparatus, the left side turning radius RL is R−w/2 when turning left and R+w/2 when turning right. On the other hand, the right side turning radius RR is R+w/2 when turning left and R−w/2 when turning right. Therefore, the left side turning radius RL and the right side turning radius RR can be calculated properly in either case of turning left or right.

In addition, in a general intersection, an angle formed by a central axis of the vehicle 100 in a front-rear direction before starting turning left or right and the central axis of the vehicle 100 after finishing turning left or right is approximately 90°. Therefore, by setting a predetermined angle which is to be a basis to calculate the remaining turning angle to 90°, the effective lengths LLe and LRe become substantially equal to lengths of expected routes from a current position of the vehicle 100 to a position at which the vehicle 100 finishes turning left or right. Therefore, a more proper alerting of the driver can be conducted.

In addition, in the first embodiment apparatus, the turning angle θtotal is configured to be initialized only when it is determined that the vehicle 100 is trying to start turning left or right and thereafter not to be initialized until the vehicle 100 finishes turning left or right. Therefore, the turning angle θtotal can be prevented from being initialized while the vehicle 100 is turning left or right at an intersection. Hence, the turning angle ° total used for calculating the remaining turning angle can be properly calculated.

Modification Example

Summary of Operation of First Modification Apparatus

Next, a driving support apparatus (hereinafter, referred to as a "first modification apparatus") of a vehicle according to a modification example of the first embodiment will be described. In the first modification apparatus, when the smoothed yaw rate Ys(n) of the nth period is more than the threshold Y0 (=$10^{-6}$), the expected route of the nth period is calculated based on the turning radius R(n) of the nth period calculated from this smoothed yaw rate Ys(n) (that is, R(n)=V(n)/Ys(n). Refer to the formulae (12) and (14).). Therefore, for example, even at a point in time when the vehicle 100 tries to start turning left, if a smoothed yaw rate Vs at that point in time is greater than the threshold Y0, the first embodiment apparatus estimates the expected route based on a turning radius R calculated from the smoothed yaw rate Ys at that point in time.

A. Before a Steering Angle Increasing Period Finishes

However, in general, when the driver turns the vehicle 100 left, once the driver starts a rotating operation of the steering wheel 14a, the steering angle θsw gradually becomes large to reach a maximum steering angle, which is maintained for a while and thereafter gradually becomes small, and the turning left is finished.

Therefore, a smoothed yaw rate Ys during a period from "a point in time when the driver tries to start the rotating operation of the steering wheel 14a (that is, a point in time when the vehicle 100 tries to start turning left)" to "a point in time immediately before the steering angle θsw reaches the maximum steering angle" is smaller than a smoothed yaw rate Ys of when the steering angle θsw is the maximum steering angle. Hereinafter, the period mentioned above is also referred to as a "steering angle increasing period". In the steering angle increasing period, a turning radius R calculated from the current smoothed yaw rate Ys is larger than a turning radius R calculated from the smoothed yaw rate Ys of when the steering angle θsw is the maximum steering angle. Therefore, there is a possibility that the expected route calculated based on such a turning radius R is deviated from an actual traveling route, resulting in an improper alerting.

As a result of an investigation from this perspective, the inventors of the present invention acquired knowledge that in the steering angle increasing period, an expected route estimated based on a turning radius calculated from an "estimated yaw rate Yest" stated below is closer to the actual traveling route than the expected route estimated based on the turning radius calculated from the current smoothed yaw rate Ys, resulting in improving an accuracy of the alerting. It should be noted that the inventors of the present invention defined the steering angle increasing period mentioned above as a period during which the current turning angle θtotal of the vehicle 100 reaches a "turning angle θtotal (45° in the present example) of when the steering angle θsw becomes the maximum steering angle". Hereinafter, the turning angle θtotal of when the steering angle θsw becomes the maximum steering angle is referred to as an "angle threshold θth". It should be noted that the angle threshold θth may be set to an appropriate value between 0° and 90° based on an examination.

1. A Case where a Current Smoothed Yaw Rate Change Amount ΔYs in the Steering Angle Increasing Period is Greater than Zero In this case, the estimated yaw rate Yest is calculated as follows.

Assume that the smoothed yaw rate Ys continues to increase with a change amount ΔYs of the current smoothed yaw rate Ys (strictly, a time differential value of the smoothed yaw rate Ys). The change amount ΔYs is also referred to as a "smoothed yaw rate change amount ΔYs".

The first modification apparatus calculates, under the above assumption, a required time Treq required for the vehicle 100 to turn by a temporary remaining turning angle Δθ(=θth−θtotal) which is an angle calculated by subtracting the current turning angle θtotal from the angle threshold θth.

The first modification apparatus calculates the estimated yaw rate Yest by dividing this temporary remaining turning angle Δθ by this required time Treq (Yest=Δθ/Treq).

In other words, the estimated yaw rate Yest is an average of the yaw rate Y of when the vehicle 100 turns by the temporary remaining turning angle Δθ, taking the required time Treq.

As described above, the estimated yaw rate Vest is a value calculated based on an assumption that the smoothed yaw rate Vs continues to increase with the current smoothed yaw rate change amount ΔYs, and therefore the estimated yaw rate Yest becomes larger than the current smoothed yaw rate Ys. Thus, the turning radius calculated from the estimated yaw rate Vest becomes smaller than the turning radius R calculated from the current smoothed yaw rate Ys. As a result, the first modification apparatus can estimate the expected route closer to the actual traveling route, and hence a more proper alerting can be realized. However, as mentioned later, when the estimated yaw rate Yest is less than or equal to the threshold Y0 ($10^{-6}$ in the present example), the first modification apparatus estimates the expected route from a turning radius set to a predetermined value (12700m in the present example), not from the turning radius calculated from the estimated yaw rate Yest.

2. A Case where the Current Smoothed Yaw Rate Change Amount ΔYs in the Steering Angle Increasing Period is Less than or Equal to Zero The assumption above is on a premise that the current smoothed yaw rate change amount ΔVs in the steering angle increasing period is greater than zero. That is, when the current smoothed yaw rate change amount ΔYs in the steering angle increasing period is less than or equal to zero (in other words, when the current smoothed yaw rate Ys is decreasing or is not changing), the estimated yaw rate Yest calculated in accordance with the above calculation method becomes less than or equal to the current smoothed yaw rate Vs. Therefore, the expected route estimated based on a turning radius calculated from this estimated yaw rate Yest deviates more from the actual traveling route.

Hence, when the current smoothed yaw rate change amount ΔYs in the steering angle increasing period is less than or equal to zero, the first modification apparatus calculates the estimated yaw rate Vest in accordance with a method described below in place of the method above.

2-1. When there Exists a Change Amount ΔYs Greater than Zero Among Periods Before the Current Point in Time In a case where the current smoothed yaw rate change amount ΔYs in the steering angle increasing period is less than or equal to zero, when there exists a change amount ΔYs greater than zero among periods before the current point in time, the first modification apparatus assumes that the smoothed yaw rate Ys continues to increase with a "smoothed yaw rate change amount ΔYs of a period closest to the current point in time among those change amount ΔYs greater than zero", and calculates the estimated yaw rate Yest in a same method as the method mentioned above.

In this case as well, the estimated yaw rate Yest becomes larger than the current smoothed yaw rate Ys, and therefore the first modification apparatus can estimate the expected route closer to the actual traveling route. It should be noted that, as is a case with the above 1, when the estimated yaw rate Yest is less than or equal to the threshold Y0 ($10^{-6}$ in the present example), the first modification apparatus estimates the expected route from the turning radius set to the predetermined value (12700m in the present example), not from the turning radius calculated from the estimated yaw rate Yest (described later). Hereinafter, the turning radius calculated from the estimated yaw rate Yest is referred to as a "first estimated turning radius Rest1".

2-2. When there does not Exist a Change Amount ΔYs Greater than Zero Among Periods Before the Current Point in Time On the other hand, in a case where the current smoothed yaw rate change amount ΔYs in the steering angle increasing period is less than or equal to zero, when there does not exist a change amount ΔYs greater than zero among periods before the current point in time, the first modification apparatus estimates the expected route based on the turning radius R calculated from the current smoothed yaw rate Ys. However, when the current smoothed yaw rate Ys is less than or equal to the threshold Y0, the first modification apparatus estimates the expected route from the turning radius R set to the predetermined value (12700m in the present example), not from the turning radius R calculated from the current smoothed yaw rate Ys (described later).

B. After the Steering Angle Increasing Period Finishes

In contrast, after the steering angle increasing period finishes (that is, when the turning angle θtotal of the vehicle 100 becomes more than or equal to the angle threshold θth), the steering angle θsw gradually becomes small, and thus the smoothed yaw rate Ys gradually becomes small as well. Therefore, if a turning radius R is calculated based on the current smoothed yaw rate Ys, and the expected route is estimated based on this turning radius R, this expected route deviates from the actual expected route.

As a result of an investigation from this perspective, the inventors of the present invention acquired knowledge that after the steering angle increasing period finishes, an expected route closer to the actual traveling route can be estimated by estimating the expected route based on a turning radius (a second estimated turning radius Rest2) calculated from an estimated yaw rate Yest immediately before the steering angle increasing period finishes on an assumption that the vehicle 100 continues to turn with this estimated yaw rate Yest (that is, the estimated yaw rate Yest immediately before the steering angle increasing period finishes). However, as is the case with the above 1 of A, when this estimated yaw rate Yest is less than or equal to the threshold Y0, the first modification apparatus estimates the expected route from the turning radius set to the predetermined value (12700m in the present example), not from the turning radius R calculated from this estimated yaw rate Yost (described later). It should be noted that when a period immediately before the turning angle θtotal reaches the angle threshold θth is defined as a period m, the "estimated yaw rate Yest immediately before the steering angle increasing period finishes" is an estimated yaw rate Yest of the mth period.

However, as is obvious from the description of the above A, when there does not exist a smoothed yaw rate change amount ΔYs greater than zero in the steering angle increasing period, the estimated yaw rate Yest is not calculated. Therefore, in this case, the first modification apparatus estimates the expected route based on a turning radius calculated from the smoothed yaw rate Ys(m) of the mth period instead of the estimated yaw rate Yest. The steering angle θsw after the steering angle increasing period finishes gradually becomes small and therefore the smoothed yaw rate Ys(m) of the mth period is greater than a smoothed yaw rate Ys of each point in time after the steering angle increasing period finishes. Thus, in this case, the first modification apparatus can estimate the expected route closer to the actual traveling route by estimating the expected route based on the smoothed yaw rate Ys(m) of the mth period instead of estimating the expected route based on the current smoothed yaw rate Ys. However, when the smoothed yaw rate Ys(m) of the mth period is less than or equal to the threshold Y0, the first modification apparatus estimates the expected route from the turning radius R set to the predetermined value (12700m in the present example), not from the turning radius R calculated from this smoothed yaw rate Ys(m) (described later). Hereinafter, the turning radius calculated after the steering angle increasing period finishes is referred to as a "second estimated turning radius Rest2".

In a case when the vehicle 100 turns right, the first modification apparatus calculates the first estimated turning radius Rest1, the turning radius R, and the second estimated turning radius Rest2 in same methods as the methods mentioned above, and estimates the expected route based on these values.

Further, the first modification apparatus calculates each of the radii Rest1, R, and Rest2 in the methods mentioned above, and estimates the expected route based on them from when the vehicle 100 is determined to be trying to start turning left to when the vehicle 100 is determined to have finished turning left. That is, once the condition to start turning left is satisfied, the first modification apparatus estimates the expected route with the methods mentioned above until a pair of the left side direction indicators change from the blinking state to the unfit state or until the turning angle θtotal exceeds 90°. Therefore, the first modification apparatus does not perform a determination of whether or not the turning-left-state in which the vehicle 100 is actually turning left is occurring (that is, a determination of whether or not the condition to start a turning-left-state is satisfied). This can be also applied to a case when the vehicle 100 turns right.

The above is the summary of the operation of the first modification apparatus. Hereinafter, a more detailed operation of the first modification apparatus will be described, especially focusing on differences from the first embodiment apparatus.

<Calculation of the Smoothed Yaw Rate Change Amount ΔYs>

During the steering angle increasing period (that is, until the turning angle θtotal reaches the angle threshold θth (45°)), the first modification apparatus calculates a current smoothed yaw rate change amount ΔYs in accordance with following formulae (24) and (25) in order to calculate a turning radius (the first estimated turning radius Rest1, the turning radius R. and the second estimated turning radius Rest2) necessary for estimating the expected route closer to the actual traveling route. It should be noted that the first modification apparatus does not calculate the smoothed yaw rate change amount ΔYs after the steering angle increasing period finishes.

When $n=0, \Delta Ys(0)=0$ (24)

When $n \geq 1, \Delta Ys(n)=Ys(n)-Ys(n-1)$ (25)

That is, the first modification apparatus sets a smoothed yaw rate change amount ΔYs(0) of the 0th period to zero. Further, the first modification apparatus calculates a change amount of the smoothed yaw rate Ys(n) of the nth period from a smoothed yaw rate Ys(n−1) of the n−1th period as a smoothed yaw rate change amount ΔYs(n) after the first period. It should be noted that the predetermined calculation interval Tcal is an extremely small value, and thus this smoothed yaw rate change amount ΔYs(n) can be substantially treated as a time differential value of the smoothed yaw rate Ys(n) of the nth period, that is, dYs(n)/dt.

<Calculation of a Converted Value ΔYsc of the Smoothed Yaw Rate Change Amount ΔYs>

As mentioned earlier, the first modification apparatus changes a calculation method for a turning radius depending on a value of the change amount ΔYs, and thus it is likely that a description will be complicated. Therefore, hereinafter, introduce a converted value ΔYsc which is a value obtained by converting the change amount ΔYs for a purpose of simplifying the description. The converted value ΔYsc is calculated in accordance with following formulae (26) to (28).

When $\Delta Ys(n)>0, \Delta Ysc(n)=\Delta Ys(n)$ (26)

When $\Delta Ys(n) \leq 0$, if there exists i which satisfies ΔYs(i)>0 (i is an integer which is more than or equal to 0 and less than or equal to n−1) and an i closest to n among them is defined as "e", $\Delta Ysc(n)=\Delta Ys(e)$ (27)

if there does not exist i which satisfies ΔYs(i)>0,
$\Delta Ysc(n)=0$ (28)

That is, when the smoothed yaw rate change amount ΔYs(n) is greater than zero, the first modification apparatus calculates the converted value ΔYsc(n) as a value equal to the smoothed yaw rate change amount ΔYs(n) (refer to the formula (26)). In contrast, when the smoothed yaw rate change amount ΔYs(n) is less than or equal to zero and there exists a smoothed yaw rate change amount ΔYs which satisfies ΔYs>0 in periods before the nth period, the first modification apparatus calculates the converted value ΔYsc (n) as a value equal to a smoothed yaw rate change amount ΔYs(e) of the eth period where a period e is defined as a closest period to n among periods before the period n where ΔYs>0 is satisfied (refer to the formula (27)). On the other hand, when the smoothed yaw rate change amount ΔYs(n) is less than or equal to zero and there does not exist the smoothed yaw rate change amount ΔYs which satisfies ΔYs>0 in periods before the nth period, the first modification apparatus sets the converted value ΔYsc(n) to zero (refer to the formula (28)).

The first modification apparatus calculates the first estimated turning radius Rest1, the turning radius R, and the second estimated turning radius Rest2, depending on each case stated below.

<<When θtotal<θth and ΔYsc(n)>0>>
[Calculation of a Required Time Treq]

As mentioned earlier, in a case when the turning angle θtotal of the vehicle 100 has not yet reached the angle threshold θth (=45°) (that is, during the steering angle increasing period) and the converted value ΔYsc(n) is greater than zero, the first modification apparatus assumes that the smoothed yaw rate Ys continues to increase at a rate of the converted value ΔYsc(n), and calculates a required time Treq(n) required for the vehicle 100 to turn by the temporary remaining turning angle Δθ(n) (=45°−θtotal(n)) in accordance with a formula (32).

This formula (32) can be obtained as follows. That is, a formula (29) is satisfied under the above assumption. A formula (30) can be obtained by expanding the formula (29). A formula (31) can be obtained by rearranging the formula (30). Further, the formula (32) can be obtained by solving the formula (31) for the required time Treq(n). It should be noted that the converted value ΔYsc(n) of the formula (29) is a converted value corresponding to the smoothed yaw rate change amount ΔYs(n) of the nth period (that is, the time differential value dYs(n)/dt).

$$\theta th = \theta total(n) + \int_0^{Treq(n)} (Ys(n) + \Delta Ysc(n) \times t) dt \quad (29)$$

$$\Delta Ysc(n) \times Treq(n)^2/2 + Ys(n) \times Treq(n) - (\theta th - \theta total(n)) = 0 \quad (30)$$

$$\Delta Ysc(n) \times Treq(n)^2 + 2 \times Ys(n) \times Treq(n) - 2 \times (\theta th - \theta total(n)) = 0 \quad (31)$$

$$Treq(n) = \left(-Ys(n) + \sqrt{(Ys(n)^2 + 2 \times \Delta Ysc(n) \times (\theta th - \theta total(n)))}\right) / Ysc(n) \quad (32)$$

The first modification apparatus calculates the required time Treq(n) of the nth period by substituting the angle threshold θth)(=45°, the turning angle θtotal(n), the smoothed yaw rate Ys(n), and the converted value ΔYsc(n) in the above formula (32).

[Calculation of the Estimated Yaw Rate Yest]

In addition, the first modification apparatus calculates the estimated yaw rate Yest(n) until the turning angle θtotal(n) reaches the angle threshold θth (=45°) by calculating the temporary remaining turning angle Δθ(n) of the nth period (=θth−θtotal(n)) and substituting in a following formula (33) this temporary remaining turning angle Δθ(n) and the required time Treq(n) of the nth period obtained as described above.

$$Yest(n)=\Delta\theta(n)Treq(n) \qquad (33)$$

That is, the first modification apparatus calculates an average of the yaw rate of when the vehicle 100 turns by the temporary remaining turning angle Δθ(n), taking the required time Treq(n) as the estimated yaw rate Yest(n) of the nth period.

[Calculation of the First Estimated Turning Radius Rest1]

Further, the first modification apparatus calculates the first estimated turning radius Rest1(n) in accordance with following formulae (34) and (35). In these formulae, Y0 is a threshold for avoiding the first estimated turning radius Rest1(n) from becoming too large owing to the vehicle speed V(n) being divided by an estimated smoothed yaw rate Yest(n) close to "0" and Y0 is $10^{-6}$ for example.

$$\text{When } Yest(n)>Y0, Rest1(n)=V(n)/Yest(n) \qquad (34)$$

$$\text{When } Yest(n)\leq Y0, Rest1(n)=12700m \qquad (35)$$

That is, as shown in the formula (34), the first modification apparatus calculates the first estimated turning radius Rest1(n) by dividing the vehicle speed V(n) by the estimated yaw rate Yest(n) of the nth period, not by the smoothed yaw rate Ys(n) of the nth period.

On the other hand, when the vehicle 100 is traveling straight at the intersection for example, the smoothed yaw rate Ys and the converted value ΔYsc become extremely small and therefore the required time Treq calculated by the formula (32) becomes extremely large, and as a result, the estimated yaw rate Yest calculated by the formula (33) becomes substantially zero. In this case, if the first estimated turning radius Rest1 (n) is calculated in accordance with the formula (34), the first estimated turning radius Rest1(n) becomes too large and thus it is likely that a processing load of the CPU increases. Therefore, when the estimated yaw rate Yest is less than or equal to the threshold Y0 ($10^{-6}$ in the present example), the first modification apparatus sets the first estimated turning radius Rest1(n) to the predetermined value (12700m in the present example) by the formula (35) instead of the formula (34).

<<When θtotal(n)<θth and ΔYsc(n)=0>>

[Calculation of the Turning Radius R]

As mentioned earlier, in a case when the turning angle θtotal of the vehicle 100 has not yet reached the angle threshold θth)(=45° (that is, during the steering angle increasing period) and the converted value ΔYsc(n) is zero (that is, all of the smoothed yaw rate change amount ΔYs's of the periods before a current point in time are less than or equal to zero. Refer to the formula (28)), the first modification apparatus calculates the turning radius R(n) in accordance with following formulae (36) and (37).

$$\text{When } Ys(n)>Y0, R(n)=V(n)/Ys(n) \qquad (36)$$

$$\text{When } Ys(n)\leq Y0, R(n)=12700m \qquad (37)$$

That is, as shown in the formula (36), the first modification apparatus calculates the turning radius R(n) by dividing the vehicle speed V(n) by the smoothed yaw rate Ys(n) of the nth period.

On the other hand, the inventors of the present invention acquired knowledge that when Ys(n)≤Y0 (=$10^{-6}$), the expected route with a substantially linear shape is more appropriate as the expected route in the intersection and thus it becomes possible to more properly alert the driver. Therefore, when Ys(n)≤Y0, the first modification apparatus sets the turning radius R(n) to the predetermined value (12700m in the present example) (refer to the formula (37)). Thereby, a shape of the expected route in the intersection can be made to be substantially linear. It should be noted that cases where Ys(n)≤Y0 is satisfied are typically as follows.

A case where the vehicle 100 is temporarily stopping.

A case where the vehicle 100 is traveling straight.

A case where the smoothed yaw rate Ys is calculated as a negative value as a result of the vehicle 100 having turned in a direction opposite to a direction in which the vehicle 100 is trying to turn left or right.

When θtotal(n)≥θth>>

[Calculation of the Second Estimated Turning Radius Rest2]

As mentioned earlier, when the turning angle θtotal of the vehicle 100 becomes more than or equal to the angle threshold θth)(45° (that is, after the steering angle increasing period finishes), the first modification apparatus calculates the second estimated turning radius Rest2 in accordance with following formulae (38) to (41).

In a case where ΔYsc(m)>0, $$\text{when } Yest(m)>Y0, Rest2(n)=V(n)/Yest(m) \qquad (38)$$

$$\text{when } Yest(m)\leq Y0, Rest2(n)=12700m \qquad (39)$$

In a case where ΔYsc(m)=0, $$\text{when } Ys(m)>Y0, Rest2(n)=V(n)/Ys(m) \qquad (40)$$

$$\text{when } Ys(m)\leq Y0, Rest2(n)=12700m \qquad (41)$$

After the turning angle θtotal becomes more than or equal to 45°, the steering angle θsw gradually becomes small and therefore the smoothed yaw rate Ys becomes small as well. Therefore, in this case, the first modification apparatus assumes that the vehicle 100 continues to turn at the estimated yaw rate Yest(m) of the mth period which is a period immediately before the turning angle θtotal reaches 45°. On the other hand, as mentioned earlier, the estimated yaw rate Yest is calculated only when the converted value ΔYsc is greater than zero. Therefore, when the converted value ΔYsc is zero, the first modification apparatus assumes that the vehicle 100 continues to turn at the smoothed yaw rate Ys(m) of the mth period, not at the estimated yaw rate Yest(m) of the mth period.

That is, when the converted value ΔYsc(m) of the mth period is greater than zero, the first modification apparatus calculates the second estimated turning radius Rest2(n) by dividing the vehicle speed V(n) by the estimated yaw rate Yest(m) of the mth period (refer to the formula (38)). On the other hand, when the estimated yaw rate Yest(m) of the mth period is less than or equal to the threshold Y0 ($10^{-6}$ in the present example), the first modification apparatus sets the second estimated turning radius Rest2(n) to the predetermined value (12700m in the present example) by the formula (39) instead of the formula (38).

In contrast, when the converted value ΔYsc(m) of the mth period is zero (that is, when all of the smoothed yaw rate change amount ΔYs's during the steering angle increasing period are less than or equal to zero), the first modification apparatus calculates the second estimated turning radius Rest2(n) by dividing the vehicle speed V(n) by the smoothed yaw rate Ys(m) of the mth period (refer to the formula (40)). On the other hand, when the smoothed yaw rate Ys(m) of the mth period is less than or equal to the threshold Y0, the first modification apparatus sets the second estimated turning radius Rest2(n) to the predetermined value (12700m in the present example) by the formula (41) instead of the formula (40).

The first modification apparatus calculates the expected route formulae fL(n), fR(n) based on the first estimated turning radius Rest1(n), the turning radius R(n), and the second estimated turning radius Rest2(n) in a same manner as the first embodiment.

When the vehicle 100 is determined to be trying to start turning right, the first modification apparatus calculates the first estimated turning radius Rest1(n), the turning radius R(n), and the second estimated turning radius Rest2(n) with same methods as the methods mentioned above.

<Specific Operation of the First Modification Apparatus>

Next, a specific operation of the first modification apparatus will be described, referring to FIG. 11A and FIG. 11B. When a predetermined timing arrives, CPU which the DSECU 10 of the first modification apparatus comprises starts processing with a step 1100 in FIG. 11A, and proceeds to a step 1102 to acquire the own vehicle information by performing a same process as the process of the step 601 in FIG. 6.

Subsequently, the CPU proceeds to a step 1104, and performs a same process as the process of the step 602 in FIG. 6. That is, the CPU determines whether or not the aforementioned condition to start turning left is satisfied based on the own vehicle information acquired in the step 1102. When the condition to start turning left is satisfied (that is, when the vehicle 100 is determined to be trying to start turning left), the CPU makes an "Yes" determination at the step 1104, and performs processes from a step 1106 to a step 1112 stated below in order.

Step 1106: The CPU performs a same process as the process of the step 606 in FIG. 6 to initialize the turning angle θtotal to 0° (refer to the formula (9)).

Step 1108: The CPU performs a same process as the process of the step 608 in FIG. 6 to calculate the smoothed yaw rate Ys(n) of the nth period (refer to the formulae (1L) (2L), (3), (4), (5L), and (6L)).

Step 1110: The CPU performs a same process as the process of the step 610 in FIG. 6 to calculate the instant turning angle θ(n) of the nth period (refer to the formulae (7) and (8)).

Step 1112: The CPU performs a same process as the process of the step 612 in FIG. 6 to calculate the turning angle θtotal(n) of the nth period (refer to the formulae (9) and (10)).

Next, the CPU proceeds to a step 1114, and performs a same process as the process of the step 616 in FIG. 6. That is, when the turning angle θtotal(n) calculated at the step 1112 satisfies θtotal(n)≤90° (the predetermined angle, the turning expected angle of when turning left or right), the CPU makes an "Yes" determination at the step 1114 (that is, determines that the vehicle 100 is still turning left), and proceeds to a step 1116 in FIG. 11B. In contrast, when the turning angle θtotal(n) calculated at the step 1112 exceeds 90°, the CPU makes a "No" determination at the step 1114 (that is, determines that the vehicle 100 has finished turning left), and proceeds to the step 629 to tentatively terminate the present routine.

At the step 1116, the CPU determines whether or not the turning angle θtotal(n) calculated at the step 1112 satisfies θtotal(n)≤θth. When θtotal(n)≤θth is satisfied, the CPU makes an "Yes" determination at the step 1116 (that is, determines that the turning angle θtotal(n) has not reached the angle threshold θth), and performs processes of a step 1118 and a step 1120 stated below in order.

Step 1118: The CPU calculates the smoothed yaw rate change amount ΔYs(n) of the nth period as described above, and stores it in the RAM of the DSECU 10 (refer to the formulae (24) and (25)).

Step 1120: The CPU calculates the converted value ΔYsc(n) of the nth period by converting the smoothed yaw rate change amount ΔYs(n) calculated at the step 1118 as described above, and stores in the RAM of the DSECU 10 (refer to the formulae (26) to (28)).

Subsequently, the CPU proceeds to a step 1122 to determine whether or not the converted value ΔYsc(n) calculated at the step 1120 satisfies ΔYsc(n)>0. When ΔYsc(n)>0 is satisfied, the CPU makes an "Yes" determination at the step 1122, and performs processes of a step 1124 and a step 1126 stated below in order.

Step 1124: The CPU calculates the required time Treq(n) from the above formula (32) required for the vehicle 100 to turn by the temporary remaining turning angle Δθ(n) (=θth−θtotal(n)) of the nth period, assuming that the smoothed yaw rate Ys(n) calculated at the step 1108 in FIG. 11A continues to increase at a rate of the converted value ΔYsc(n) calculated at the step 1120, and stores it in the RAM of the DSECU 10.

Step 1126: The CPU calculates the estimated yaw rate Yest(n) of the nth period by dividing the temporary remaining turning angle Δθ(n) by the required time Treq(n) calculated at the step 1124 in accordance with the above formula (33), and stores it in the RAM of the DSECU 10.

Next, the CPU proceeds to a step 1128 to determine whether or not the estimated yaw rate Yest(n) calculated at the step 1126 satisfies Yest(n)>Y0(=$10^{-6}$). When Yest(n) >$10^{-6}$ is satisfied, the CPU makes an "Yes" determination at the step 1128, and performs a process of a step 1130.

Step 1130: The CPU calculates the first estimated turning radius Rest1(n) of the nth period by dividing the vehicle speed V(n) of the nth period by the estimated yaw rate Yest(n) calculated at the step 1126 in accordance with the above formula (34), and stores this first estimated turning radius Rest1(n) in the RAM of the DSECU 10 as a turning radius R. Thereafter, the CPU proceeds to the step 620 in FIG. 6 and performs the processes after the step 620 in order as described above.

On the other hand, when the estimated yaw rate Yest(n) calculated at the step 1126 satisfies Yest(n)≤$10^{-6}$, the CPU makes a "No" determination at the step 1128, and performs a process of a step 1132.

Step 1132: The CPU sets the first estimated turning radius Rest1(n) of the nth period to 12700m in accordance with the above formula (35), and stores this first estimated turning radius Rest1(n) in the RAM of the DSECU 10 as a turning radius R. Thereafter, the CPU proceeds to the step 632 in FIG. 6 and performs the processes after the step 632 in order as described above.

On the other hand, when the converted value ΔYsc(n) calculated at the step 1120 satisfies ΔYsc(n)=0, the CPU makes a "No" determination at the step 1122, and proceeds to a step 1134.

Figure 11A:
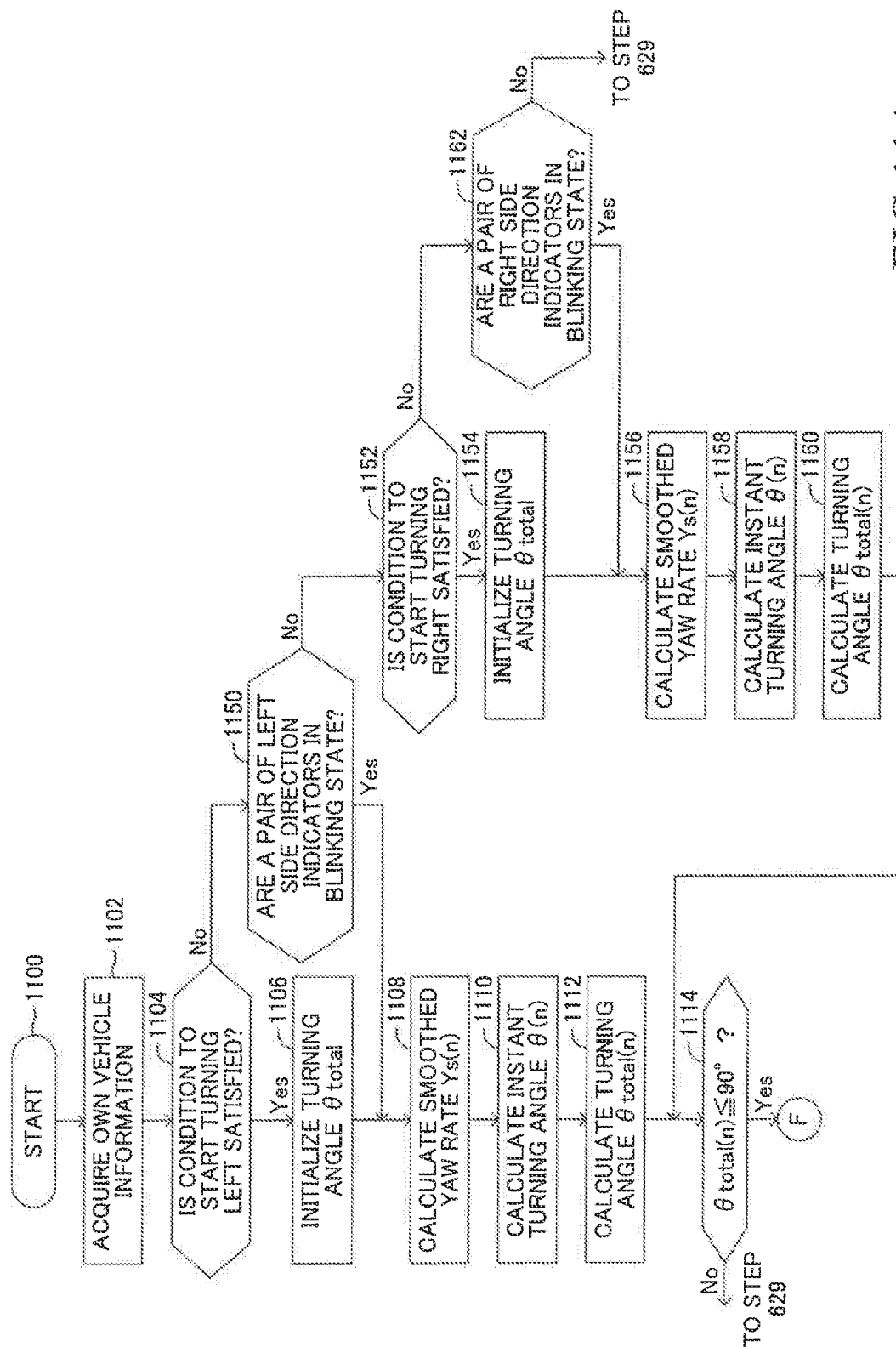
FIG. 11A is a flowchart (part 1) showing a routine which CPU of a driving support ECU of a driving support apparatus (hereinafter, referred to as a "first modification apparatus") according to a modification example of the first embodiment of the present invention performs.
Figure 11B:
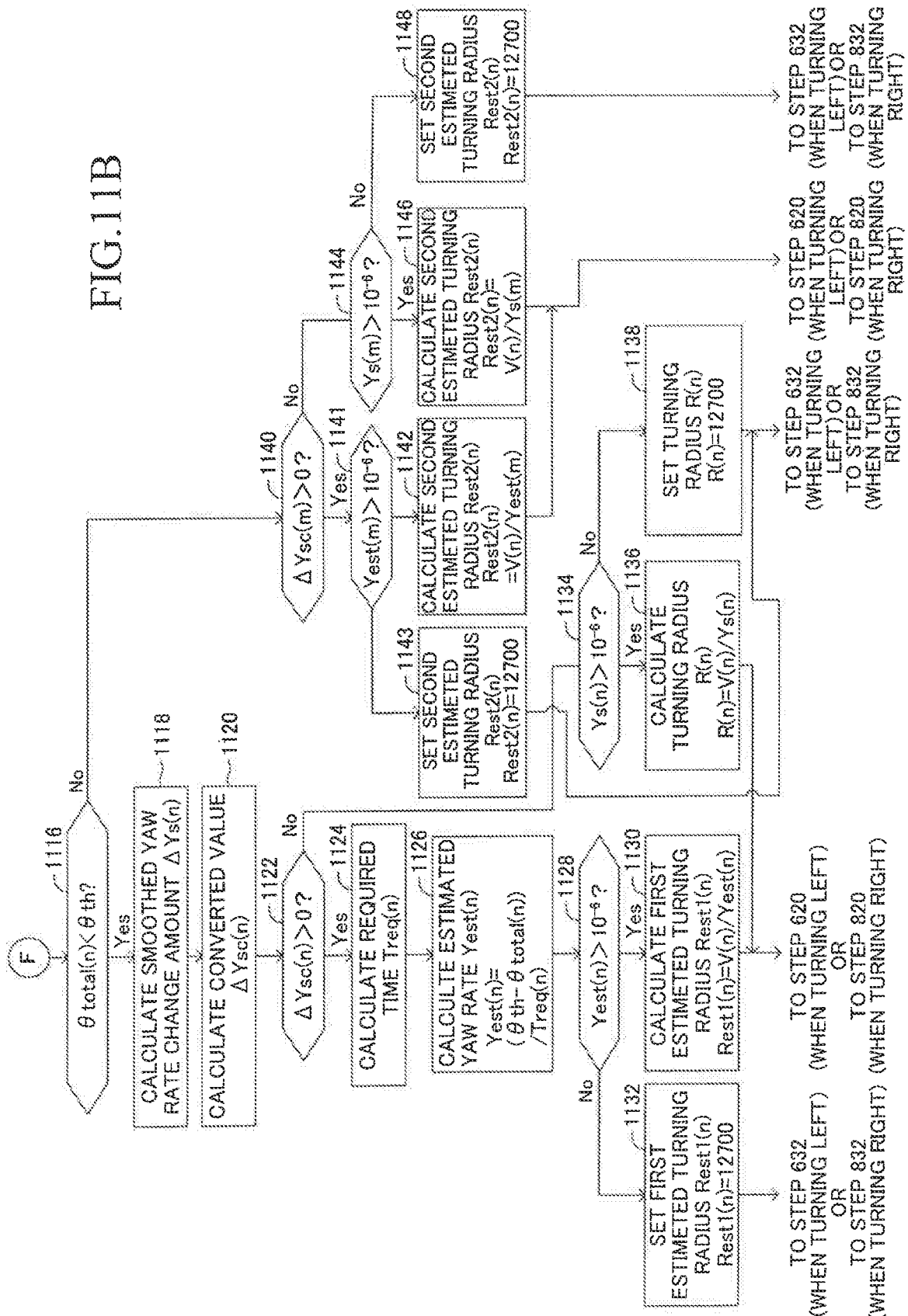
FIG. 11B is a flowchart (part 2) showing a routine which CPU of the driving support ECU of the first modification apparatus performs.

At the step 1134, the CPU determines whether or not the smoothed yaw rate Ys(n) calculated at the step 1108 in FIG. 11A satisfies Ys(n)>Y0. When Ys(n)>Y0 is satisfied, the CPU makes an "Yes" determination at the step 1134, and performs a process of a step 1136.

Step 1136: The CPU calculates the turning radius R(n) of the nth period by dividing the vehicle speed V(n) of the nth period by the smoothed yaw rate Ys(n) calculated at the step 1108 in FIG. 11A in accordance with the above formula (36), and stores the turning radius R(n) in the RAM of the DSECU 10. Thereafter, the CPU proceeds to the step 620 in FIG. 6, and performs the processes after the step 620 in order as described above.

On the other hand, when the smoothed yaw rate Ys(n) calculated at the step 1108 in FIG. 11A satisfies Ys(n)≤Y0, the CPU makes a "No" determination at the step 1134 and performs a process of a step 1138.

Step 1138: The CPU sets the turning radius R(n) of the nth period to 12700m in accordance with the above formula (37), and stores this turning radius R in the RAM of the DSECU 10. Thereafter, the CPU proceeds to the step 632 in FIG. 6, and performs the processes after the step 632 in order as described above.

In contrast, when the turning angle θtotal(n) calculated at the step 1112 in FIG. 11A satisfies θtotal(n)≥θth, the CPU makes a "No" determination at the step 1116 (that is, determines that the turning angle θtotal(n) has reached or exceeded the angle threshold θth), and proceeds to a step 1140.

At the step 1140, the CPU determines whether or not a latest (a most immediate) converted value ΔYsc(m) among the converted value ΔYsc's calculated at the step 1120 and stored in the RAM of the DSECU 10 satisfies ΔYsc(m)>0. When ΔYsc(m)>0, the CPU makes an "Yes" determination at the step 1140 and proceeds to a step 1141.

At the step 1141, the CPU determines whether or not a latest (a most immediate) estimated yaw rate Yest(m) among the estimated yaw rate Yest's calculated at the step 1126 and stored in the RAM of the DSECU 10 satisfies Yest(m)>Y0 (=$10^{-6}$). When Yest(m)>$10^{-6}$ is satisfied, the CPU makes an "Yes" determination at the step 1141 and performs a process of a step 1142.

Step 1142: The CPU calculates the second estimated turning radius Rest2(n) of the nth period by dividing the vehicle speed V(n) of the nth period by the estimated yaw rate Yest(m) of the mth period in accordance with the above formula (38), and stores this second estimated turning radius Rest2(n) in the RAM of the DSECU 10 as a turning radius R. Thereafter, the CPU proceeds to the step 620 in FIG. 6, and performs the processes after the step 620 in order as described above.

On the other hand, when the estimated yaw rate Yest(m) of the mth period satisfies Yest(m)≤Y0 (=$10^{-6}$), the CPU makes a "No" determination at the step 1141, and performs a process of a step 1143.

Step 1143: The CPU sets the second estimated turning radius Rest2(n) of the nth period to 12700m in accordance with the above formula (39), and stores this second estimated turning radius Rest2(n) in the RAM of the DSECU 10 as a turning radius R. Thereafter, the CPU proceeds to the step 632 in FIG. 6 and performs the processes after the step 632 in order as described above.

In contrast, when the converted value ΔYsc(m) of the mth period is zero (ΔYsc(m)=0), the CPU makes a "No" determination at the step 1140 and proceeds to a step 1144.

At the step 1144, the CPU determines whether or not the smoothed yaw rate Ys(m) of the mth period among the smoothed yaw rate Ys's stored in the RAM of the DSECU 10 satisfies Ys(m)>Y0. When Ys(m)>Y0 is satisfied, the CPU makes an "Yes" determination at the step 1144 and performs a process of a step 1146.

Step 1146: The CPU calculates the second estimated turning radius Rest2(n) of the nth period by dividing the vehicle speed V(n) of the nth period by the smoothed yaw rate Ys(m) of the mth period in accordance with the above formula (40), and stores this second estimated turning radius Rest2(n) in the RAM of the DSECU 10 as a turning radius R. Thereafter, the CPU proceeds to the step 620 in FIG. 6 and performs the processes after the step 620 in order as described above.

On the other hand, when the smoothed yaw rate Ys(m) of the mth period satisfies Ys(m)≤Y0, the CPU makes a "No" determination at the step 1144, and performs a process of a step 1148.

Step 1148: The CPU sets the second estimated turning radius Rest2(n) of the nth period to 12700m in accordance with the above formula (41), and stores this second estimated turning radius Rest2(n) in the RAM of the DSECU 10 as a turning radius R. Thereafter, the CPU proceeds to the step 632 in FIG. 6 and performs the processes after the step 632 in order as described above.

In contrast, when the condition to start turning left has not been satisfied at a point in time when performing the process of the step 1104 in FIG. 11A, the CPU makes a "No" determination at the step 1104, and proceeds to a step 1150 to determine whether or not a pair of the left side direction indicators are in the blinking state. It should be noted that cases where the CPU makes a "No" determination at the step 1104 are as follows.

- A case where the CPU makes a determination of the step 1104 after determining for the first time that the condition to start turning left has been satisfied after determining that the immediately previous turning left or right finished.
- A case where the condition to start turning left has not been satisfied even once after the CPU determines that the immediately previous turning left or right finished.

Now, assume that the CPU makes a determination of the step 1104 after determining for the first time that the condition to start turning left has been satisfied after determining that the immediately previous turning left or right finished, and as a result, the CPU makes a "No" determination at the step 1104. Further, assume that the driver has an intention to start turning left and therefore maintains a pair of the left side direction indicators in the blinking state. In this case, the CPU makes an "Yes" determination at the step 1150, and performs the aforementioned processes after the step 1108 in order.

On the other hand, in following cases, the CPU makes a "No" determination at the step 1150, and proceeds to a step 1152 in FIG. 11k.

- A case where the condition to start turning left has not been satisfied even once after the CPU determines that the immediately previous turning left or right finished (step 1104: No) and a pair of the left side direction indicators are not in the blinking state.
- A case where the CPU makes a determination of the step 1104 after determining for the first time that the condition to start turning left has been satisfied after determining that the immediately previous turning left or right finished, and as a result, the CPU makes a "No" determination at the step 1104, but a pair of the left side direction indicators come not to be in the blinking state.

At the step 1152, the CPU performs a same process as the process of the step 802 in FIG. 8. That is, the CPU determines whether or not the aforementioned condition to start turning right is satisfied based on the own vehicle information acquired in the step 1102. When the condition to start turning right is satisfied (that is, when the vehicle 100 is determined to be trying to start turning right), the CPU makes an "Yes" determination at the step 1152, and performs processes from a step 1154 to a step 1160 stated below in order.

Step 1154: The CPU performs a same process as the process of the step 806 in FIG. 8 to initialize the turning angle θtotal to 0° (refer to the formula (9)).

Step 1156: The CPU performs a same process as the process of the step 808 in FIG. 8 to calculate the smoothed yaw rate Ys(n) of the nth period (refer to the formulae (1R), (2R), (3), (4), (5R), and (6R)).

Step 1158: The CPU performs a same process as the process of the step 810 in FIG. 8 to calculate the instant turning angle θ(n) of the nth period (refer to the formulae (7) and (8)).

Step 1160: The CPU performs a same process as the process of the step 812 in FIG. 8 to calculate the turning angle θtotal(n) of the nth period (refer to the formulae (9) and (10)).

After finishing the process of the step 1160, the CPU performs the aforementioned processes after the step 1114 in order. Here, the step 1112, the step 1108, the step 620, and the step 632 in the description of the processes after the step 1114 are substituted with the step 1160 (FIG. 11A), the step 1156 (FIG. 11A), the step 820 (FIG. 8), and the step 832 (FIG. 8), respectively.

In contrast, when the condition to start turning right has not been satisfied at a point in time when performing the process of the step 1152 in FIG. 11A, the CPU makes a "No" determination at the step 1152, and proceeds to a step 1162 to determine whether or not a pair of the right side direction indicators are in the blinking state. It should be noted that cases where the CPU makes a "No" determination at the step 1152 are cases where the CPU makes a "No" determination at the aforementioned step 1104 and besides, either of following cases is satisfied.

A case where the CPU makes a determination of the step 1152 after determining for the first time that the condition to start turning right has been satisfied after determining that the immediately previous turning left or right finished.

A case where the condition to start turning right has not been satisfied even once after the CPU determines that the immediately previous turning left or right finished.

Now, assume that the CPU makes a determination of the step 1152 after determining for the first time that the condition to start turning right has been satisfied after determining that the immediately previous turning left or right finished, and as a result, the CPU makes a "No" determination at the step 1152. Further, assume that the driver has an intention to start turning right and therefore maintains a pair of the right side direction indicators in the blinking state. In this case, the CPU makes an "Yes" determination at the step 1162, and performs the aforementioned processes after the step 1156 in order.

On the other hand, when a pair of the right side direction indicators are in the unfit state, the CPU makes a "No" determination at the step 1162, and proceeds to the step 629 to tentatively terminate the present routine. It should be noted that a case where the CPU makes a "No" determination at the step 1162 is typically a case where a pair of the left side direction indicators and a pair of the right side direction indicators are both in the unfit state (step 1150: No, step 1162: No), and besides the vehicle 100 is traveling straight.

Effects of the first modification apparatus of the present invention will be described. The first modification apparatus has similar effects to the first embodiment apparatus. Further, in the first modification apparatus, a calculation method of the turning radius is changed depending on the current turning angle θtotal of the vehicle 100 and the current converted value θYsc, and the determination of whether or not the alerting of the driver is necessary is made based on the expected routes estimated based on this turning radius. Therefore, in comparison to a configuration where expected routes are always estimated based on the current smoothed yaw rate Ys, expected routes closer to an actual traveling route can be estimated and thus a more proper alerting of the driver can be conducted.

Especially, when θtotal(n)<θth(45°) and ΔYsc(n)>0, the first modification apparatus calculates the required time Treq required for the vehicle 100 to turn by the temporary remaining turning angle Δθ(=θth−θtotal) under a premise that the yaw rate continues to increase at a constant changing amount, and calculates the estimated routes based on the estimated yaw rate Yest calculated from this required time Treq. This estimated yaw rate Yest is greater than the smoothed yaw rate Ys during the steering angle increasing period, and therefore the first estimated turning radius Rest1 calculated from this estimated yaw rate Yest becomes smaller than the turning radius R calculated from the smoothed yaw rate Ys. Thus, the expected routes calculated based on the first estimated turning radius Rest1 are closer to the actual traveling route of the vehicle 100 compared to expected routes calculated based on the aforementioned turning radius R. Therefore, a more proper alerting of the driver can be conducted.

It should be noted that when Ys(n)≤Y0 (that is, in a case of "No" at the step 614 (refer to FIG. 6)), the CPU of the first embodiment apparatus performs the processes of the steps 630, 632, and 634 in order and thereafter proceeds to the step 636 until the vehicle 100 actually turns left after trying to start turning left. However, the CPU may omit the processes of the steps 630, 632, and 634. That is, when Ys(n)≤Y0, the CPU may proceed directly to the step 636, and at the step 636, calculate each of the expected route formulae fL(n) and fR(n) as a formula of a straight line extending toward a traveling direction of the vehicle 100 at the nth period.

Similarly, when Ys(n)≤Y0 (that is, in a case of "No" at the step 814 (refer to FIG. 8)), the CPU may omit the processes of the steps 830, 832, and 834, proceed directly to the step 836, and at the step 836, calculate each of the expected route formulae fL(n), fR(n) as a formula of a straight line extending toward the traveling direction of the vehicle 100 at the nth period until the vehicle 100 actually turns right after trying to start turning right.

Similarly, the CPU of the first modification apparatus may omit the processes of the steps 1132, 1138, 1143, 1148, the steps 632 and 634 in FIG. 6, and steps 832 and 834 in FIG. 8, and at the steps 636 and 836, calculate each of the expected route formulae fL(n), fR(n) as a formula of a straight line extending toward the traveling direction of the vehicle 100 at the nth period.

Second Embodiment

Next, a driving support apparatus (hereinafter, referred to as a "second embodiment apparatus") of a vehicle according to a second embodiment will be described below. In the second embodiment apparatus, an operating method for determining whether or not there exists an object to which the alerting should be performed is different from the first embodiment apparatus. Specifically, the first embodiment apparatus determines whether or not a straight line expressed by the expected route formula g(n) of an object crosses a "part within the effective length LLe and/or LRe of the expected route of the vehicle 100" at one or two intersection points. When the straight line crosses the part mentioned above, the first embodiment apparatus identifies an intersection point to be a target of determination, and performs the alerting when a time condition is satisfied regarding this intersection point.

In contrast, the second embodiment apparatus determines whether or not a straight line expressed by the expected route formula g(n) of an object crosses "a whole of the expected route of the vehicle 100 (that is, a circle)" where the effective lengths LLe and LRe are not set at two or four intersection points. When the straight line crosses the expected route mentioned above, the second embodiment apparatus identifies an intersection point to be a target of determination out of these intersection points, and performs the alerting when a time condition and a length condition are satisfied regarding this intersection point.

As stated above, the second embodiment apparatus is different from the first embodiment apparatus in that the second embodiment apparatus determines whether or not the straight line expressed by the formula g(n) of an object crosses the whole of the expected route of the vehicle 100, and that determines whether or not the length condition in addition to the time condition is satisfied. Therefore, hereinafter, differences from the first embodiment apparatus will be specifically described, referring to FIG. 12.

<Acquisition of the Object Information>

As is the case with the first embodiment apparatus, the second embodiment apparatus acquires the object information of an object which exists around the vehicle 100. In an example of FIG. 12, the second embodiment apparatus acquires the object information of the nth period regarding objects E, F, G, H, and I which exist around the vehicle 100 of the nth period.

<Calculation of the Formula g of an Object>

Figure 12:
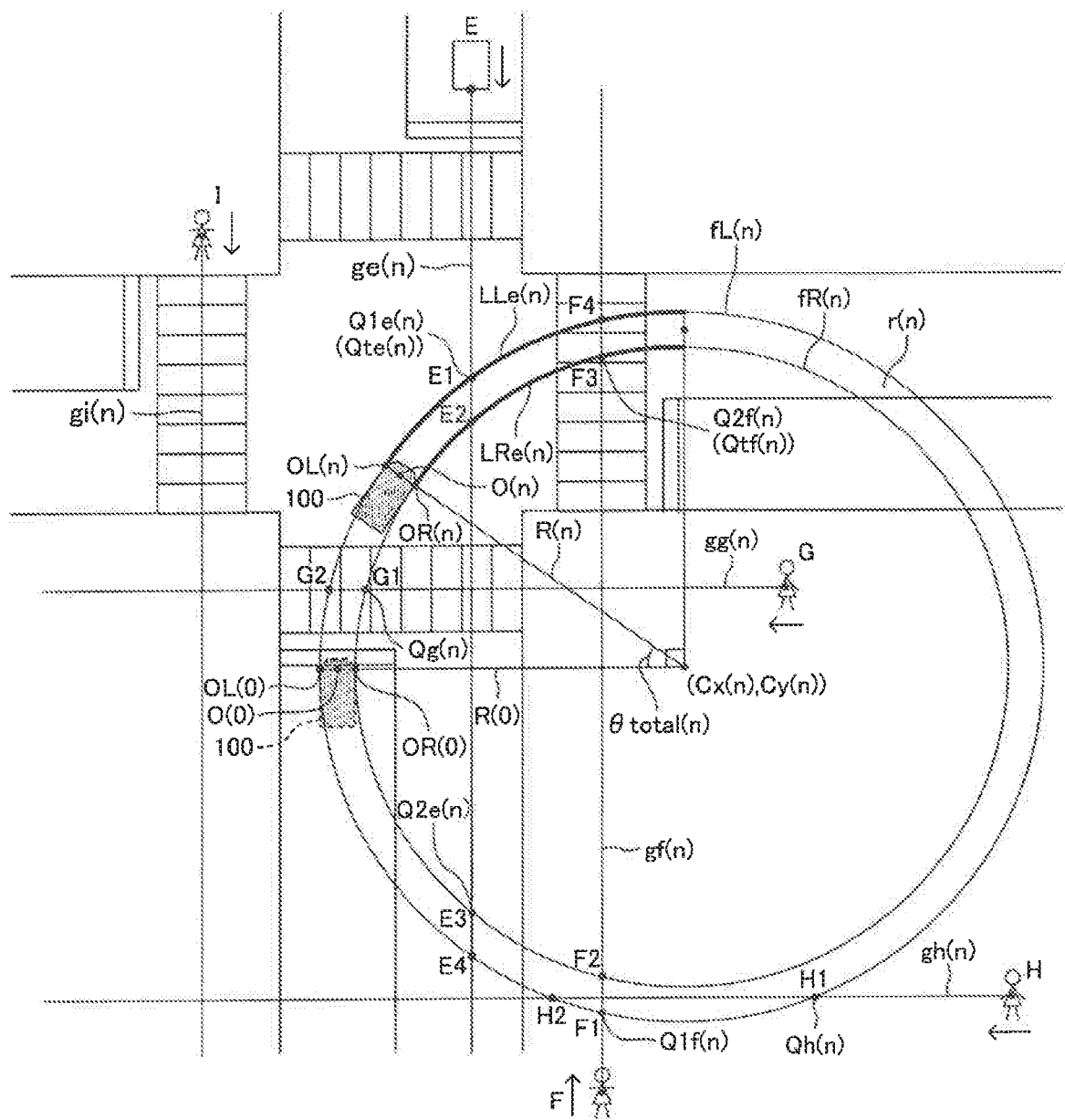
FIG. 12 is a diagram used to describe the alerting in a case when a driving support apparatus (hereinafter, referred to as a "second embodiment apparatus") according to a second embodiment of the present invention determines that the vehicle is actually turning right at the intersection.

As is the case with the first embodiment apparatus, the second embodiment apparatus calculates the expected route formula g of the object. In the example of FIG. 12, the second embodiment apparatus calculates each of the formulae ge(n), gf(n), gg(n), gh(n), and gi(n) of the objects E to I.

<Second Crossing Condition>

As is the case with the first embodiment apparatus (or the first modification apparatus), the second embodiment apparatus calculates the left side expected route formula fL(n) and the right side expected route formula fR(n). Further, in the second embodiment apparatus, a target region r(n) is provided between the left side expected route formula fL(n) and the right side expected route formula fR(n). The second embodiment apparatus determines whether or not a condition (hereinafter, referred to as a "second crossing condition") that the straight line expressed by the formula g(n) crosses at least one of a curved line expressed by the left side expected route formula fL(n) and a curved line expressed by the right side expected route formula fR(n) is satisfied.

In the example of FIG. 12, a straight line expressed by the formula ge(n) crosses the left side expected route at a point E1 and a point E4, and crosses the right side expected route at a point E2 and a point E3. Therefore, the formula ge(n) satisfies the second crossing condition. A straight line expressed by the formula gf(n) crosses the left side expected route at a point F1 and a point F4, and crosses the right side expected route at a point F2 and a point F3. Therefore, the formula gf(n) also satisfies the second crossing condition. A straight line expressed by the formula gg(n) crosses the left side expected route at a point G2, and crosses the right side expected route at a point G1. Therefore, the formula gg(n) also satisfies the second crossing condition. A straight line expressed by the formula gh(n) crosses the left side expected route at a point H1 and a point H2. Therefore, the formula gh(n) also satisfies the second crossing condition. In contrast, a straight line expressed by the formula gi(n) does not cross either of the left side expected route or the right side expected route. Therefore, the formula gi(n) does not satisfy the second crossing condition.

<Calculation of Coordinates of Intersection Points Q1 and Q2, or a Coordinate of an Intersection Point Q>

When the formula g(n) satisfies the second crossing condition, the second embodiment apparatus calculates a number of intersection points (second intersection points) at which the straight line expressed by the formula g(n) crosses the left side expected route and/or the right side expected route.

When a number of the second intersection points is four, the second embodiment apparatus calculates coordinates of two intersection points at which the straight line expressed by the formula g(n) crosses either the left side expected route or the right side expected route at a portion where the straight line enters the target region r(n) from outside the target region r(n) in the object moving direction as a coordinate of an intersection point Q1(n) and a coordinate of an intersection point Q2(n) in order. That is, the intersection point Q1(n) is a first intersection point in the object moving direction, and the intersection point Q2(n) is a third intersection point in the object moving direction.

In the example of FIG. 12, regarding the formula ge(n), a number of the intersection points is four (the points E1 to E4) as described earlier. Therefore, the second embodiment apparatus calculates coordinates of the point E1 and the point E3 at which the straight line expressed by the formula ge(n) crosses either the left side expected route or the right side expected route at the portion where the straight line enters the target region r(n) from outside the target region r(n) in the moving direction of the object E (a downward direction in FIG. 12) as a coordinate of an intersection point Q1e(n) and a coordinate of an intersection point Q2e(n) in order. Similarly, regarding the formula gf(n), a number of the intersection points is also four (the points F1 to F4). Therefore, the second embodiment apparatus calculates coordinates of the point F1 and the point F3 at which the straight line expressed by the formula gf(n) crosses either the left side expected route or the right side expected route at the portion where the straight line enters the target region r(n) from outside the target region r(n) in the moving direction of the object F (an upward direction in FIG. 12) as a coordinate of an intersection point Q1f(n) and a coordinate of an intersection point Q2f(n) in order.

On the other hand, when a number of the second intersection points is two, the second embodiment apparatus calculates a coordinate of an intersection point at which the straight line expressed by the formula g(n) crosses either the left side expected route or the right side expected route at the portion where the straight line enters the target region r(n) from outside the target region r(n) in the object moving direction as a coordinate of an intersection point Q(n). That is, the intersection point Q(n) is a first intersection point in the object moving direction.

In the example of FIG. 12, regarding the formula gg(n), a number of the second intersection points is two (the points G1, G2) as described earlier. Therefore, the second embodiment apparatus calculates a coordinate of a point G1 at which the straight line expressed by the formula gg(n) crosses the right side expected route at the portion where the straight line enters the target region r(n) from outside the target region r(n) in the moving direction of the object G (a leftward direction in FIG. 12) as a coordinate of an intersection point Qg(n). Similarly, regarding the formula gh(n), a number of the second intersection points is two (the points H1, H2). Therefore, the second embodiment apparatus calculates a coordinate of a point H1 at which the straight line expressed by the formula gh(n) crosses the left side expected route at the portion where the straight line enters the target region r(n) from outside the target region r(n) in the moving direction of the object H (a leftward direction in FIG. 12) as a coordinate of an intersection point Qh(n).

Hereinafter, when each of the intersection points Q1(n), Q2(n), and Q(n) is positioned on the left side expected route, lengths of the left side expected routes from the left end OL(n) of the vehicle 100 to the intersection points Q1(n), Q2(n), and Q(n) in a turning direction of the vehicle 100 (that is, lengths of arcs along with the routes) will be defined as LL1(n), LL2(n), and LL(n), respectively.

In addition, when each of the intersection points Q1(n), Q2(n), and Q(n) is positioned on the right side expected route, lengths of the right side expected routes from the right end OR(n) of the vehicle 100 to the intersection points Q1(n), Q2(n), and Q(n) in a turning direction of the vehicle 100 (that is, lengths of arcs along with the routes) will be defined as LR1(n), LR2(n), and LR(n), respectively.

It should be noted that, for example, the length of LL1(n) is calculated by multiplying an angle formed by a vector from the turning center coordinate (Cx(n), Cy(n)) toward the intersection point Q1(n) and a vector from the turning center coordinate (Cx(n), Cy(n)) toward the position O(n) of the vehicle 100 by the left side turning radius RL(n). Other lengths are calculated in a same manner.

<Identify a Target Intersection Point>

When a number of the second intersection points identified is two and thus the coordinates of the intersection point Q1(n) and the intersection point Q2(n) are calculated, the second embodiment apparatus compares a length of the right side or the left side expected route from the vehicle 100 to the intersection point Q1(n) in the turning direction of the vehicle 100 with a length of the right side or the left side expected route from the vehicle 100 to the intersection point Q2(n) in the turning direction of the vehicle 100, and identifies an intersection point with a shorter length as a target intersection point Qt(n). A specific description will be made below.

When the vehicle 100 turns right, the intersection point Q1(n) (the intersection point Q1e(n) in FIG. 12, for example) is positioned on the left side expected route, and the intersection point Q2(n) (the intersection point Q2e(n) in FIG. 12, for example) is positioned on the right side expected route. Therefore, the second embodiment apparatus calculates the length LL1(n) of the left side expected route from the left end OL(n) of the vehicle 100 to the intersection point Q1(n) (the intersection point Q1e(n) in FIG. 12, for example) in the turning direction of the vehicle 100 and the length LR2(n) of the right side expected route from the right end OR(n) of the vehicle 100 to the intersection point Q2(n) (the intersection point Q2e(n) in FIG. 12, for example) in the turning direction of the vehicle 100 to compare both lengths, and identifies an intersection point with a shorter length (the intersection point Q1e(n) in FIG. 12, for example) as a target intersection point Qt(n).

Similarly, when the vehicle 100 turns left, the intersection point Q1(n) is positioned on the right side expected route, and the intersection point Q2(n) is positioned on the left side expected route. Therefore, the second embodiment apparatus calculates the length LR1(n) of the right side expected route from the right end OR(n) of the vehicle 100 to the intersection point Q1(n) in the turning direction of the vehicle 100 and the length LL2(n) of the left side expected route from the left end OL(n) of the vehicle 100 to the intersection point Q2(n) in the turning direction of the vehicle 100 to compare both lengths, and identifies an intersection point with a shorter length as a target intersection point Qt(n).

In the example of FIG. 12, the vehicle 100 is turning right. Therefore, regarding the formula ge(n), the intersection point Q1e(n) is positioned on the left side expected route and the intersection point Q2e(n) is positioned on the right side expected route. Comparing the length LL1e(n) of the left side expected route from the left end OL(n) of the vehicle 100 to the intersection point Q1e(n) in the turning direction of the vehicle 100 with the length LR2e(n) of the right side expected route from the right end OR(n) of the vehicle 100 to the intersection point Q2e(n) in the turning direction of the vehicle 100, the length LL1e(n) is shorter than the length LR2e(n), and therefore the second embodiment apparatus identifies the intersection point Q1e(n) as the target intersection point Qt(n). Regarding the formula gf(n), the intersection point Q1f(n) is positioned on the left side expected route and the intersection point Q2f(n) is positioned on the right side expected route. Comparing the length LL1f(n) of the left side expected route from the left end OL(n) of the vehicle 100 to the intersection point Q1f(n) in the turning direction of the vehicle 100 with the length LR2f(n) of the right side expected route from the right end OR(n) of the vehicle 100 to the intersection point Q2f(n) in the turning direction of the vehicle 100, the length LR2f(n) is shorter than the length LL1f(n), and therefore the second embodiment apparatus identifies the intersection point Q2f(n) as the target intersection point Qt(n).

Hereinafter, when the target intersection point Qt(n) is positioned on the left side expected route, a length from the left end OL(n) of the vehicle 100 to the target intersection point Qt(n) in the turning direction of the vehicle 100 will be referred to as LLt(n), and when the target intersection point Qt(n) is positioned on the right side expected route, a length from the right end OR(n) of the vehicle 100 to the target intersection point Qt(n) in the turning direction of the vehicle 100 will be referred to as LRt(n).

<Calculation of a Time t2>

The second embodiment apparatus calculates a time t2 expected to be required for an object to reach the expected route in order to determine whether or not a time condition (described later) is satisfied. Specifically, the second embodiment apparatus calculates, regarding an object whose straight line expressed by the formula g(n) crosses the left side or the right side expected route at a target intersection point Qt(n) or an intersection point Q(n), a time t2(n) (a second time) required for this object to reach this target intersection point Qt(n) or this intersection point Q(n). The time t2(n) is calculated by dividing a length of the straight line from the position of the object to the target intersection point Qt(n) or the intersection point Q(n) by the moving speed v(n) of the object.

In the example of FIG. 12, the second embodiment apparatus calculates a time t2e(n) required for the object E to reach the target intersection point Qte(n), a time t2f(n) required for the object F to reach the target intersection point Qtf(n), a time t2g(n) required for the object G to reach the intersection point Qg(n), and a time t2h(n) required for the object H to reach the intersection point Qh(n).

<Time Condition, Length Condition>

The second embodiment apparatus determines whether or not a time condition that the time t2(n) is less than or equal to a second predetermined time (4 s in the present example) is satisfied. When this time condition is satisfied for any of the formulae g(n)'s, the second embodiment apparatus determines that there is a possibility that an object crosses the expected route of the vehicle 100 within the second predetermined time. In this case, the second embodiment apparatus determines whether or not a position at which the object crosses the expected route of the vehicle 100 is positioned on the part within the effective length of the expected route by determining whether or not a length condition shown by following formulae (42) to (45) is satisfied.

<<In a Case where a Coordinate of a Target Intersection Point Qt(n) is Calculated>>

When the target intersection point Qt(n) is positioned on the left side expected route $$LLt(n) \leq LLe(n) \tag{42}$$

When the target intersection point Qt(n) is positioned on the right side expected route $$LRt(n) \leq LRe(n) \tag{43}$$

<<In a Case where a Coordinate of an Intersection Point Q(n) is Calculated>>

When the intersection point Q(n) is positioned on the left side expected route $$LL(n) \leq LLe(n) \tag{44}$$

When the intersection point Q(n) is positioned on the right side expected route $$LR(n) \leq LRe(n) \tag{45}$$

When any of the above formulae is satisfied for any of the formulae g(n)'s, the second embodiment apparatus determines that the position at which the object crosses the expected route is positioned on the part within the effective length of the expected route, that is, there exists a target object. On the other hand, when none of the above formulae is satisfied for any of the formulae g(n)'s, the second embodiment apparatus determines that the position at which the object crosses the expected route is not positioned on the part within the effective length of the expected route, that is, there does not exists a target object.

In the example of FIG. 12, when t2e(n)=1 s, t2f(n)=4 s, t2g(n)=3 s, and t2h(n)=2 s, for example, the time condition is satisfied regarding the formulae ge(n), gf(n), gg(n), and gh(n). Therefore, the second embodiment apparatus determines whether or not the above length condition is satisfied regarding these formulae ge(n) to gh(n).

Regarding the formula ge(n), the intersection point calculated is the target intersection point Qte(n) and this target intersection point Qte(n) is positioned on the left side expected route. Therefore, the second embodiment apparatus determines whether or not the length condition of the formula (42) is satisfied. As is obvious from FIG. 12, a length LLte(n) is shorter than the left side effective length LLe(n) and thus the length condition of the formula (42) is satisfied.

Regarding the formula gf(n), the intersection point calculated is the target intersection point Qtf(n) and this target intersection point Qtf(n) is positioned on the right side expected route. Therefore, the second embodiment apparatus determines whether or not the length condition of the formula (43) is satisfied. As is obvious from FIG. 12, a length LRtf(n) is shorter than the right side effective length LRe(n) and thus the length condition of the formula (43) is satisfied.

Regarding the formula gg(n), the intersection point calculated is the intersection point Qg(n) and this intersection point Qg(n) is positioned on the right side expected route. Therefore, the second embodiment apparatus determines whether or not the length condition of the formula (45) is satisfied. As is obvious from FIG. 12, a length LRg(n) is longer than the right side effective length LRe(n) and thus the length condition of the formula (45) is not satisfied.

Regarding the formula gh(n), the intersection point calculated is the intersection point Qh(n) and this intersection point Qh(n) is positioned on the left side expected route. Therefore, the second embodiment apparatus determines whether or not the length condition of the formula (44) is satisfied. As is obvious from FIG. 12, a length LLh(n) is longer than the left side effective length LLe(n) and thus the length condition of the formula (44) is not satisfied.

From the above, since the time condition and the length condition are satisfied regarding the formulae ge(n) and gf(n), the second embodiment apparatus determines that there exist target objects (the objects E and F).

On the other hand, in the example of FIG. 12, when t2e(n)=5 s, t2f(n)=10 s, t2g(n)=3 s, and t2h(n)=2 s, the time condition is satisfied regarding the formulae gg(n) and gh(n). Therefore, the second embodiment apparatus determines whether or not the above length condition is satisfied regarding these two formulae. As stated earlier, the length condition is not satisfied regarding the formulae gg(n) and gh(n), and therefore the second embodiment apparatus determines that there does not exist any target object.

<Alerting>

As is the case with the first embodiment apparatus, the second embodiment apparatus conducts an operation to alert the driver by generating the request signal when a target object is determined to exist, whereas when a target object is determined not to exist, the first embodiment apparatus does not generate the request signal and thus does not conduct the operation to alert the driver.

Specific Operation of the Second Embodiment Apparatus

Figure 13:
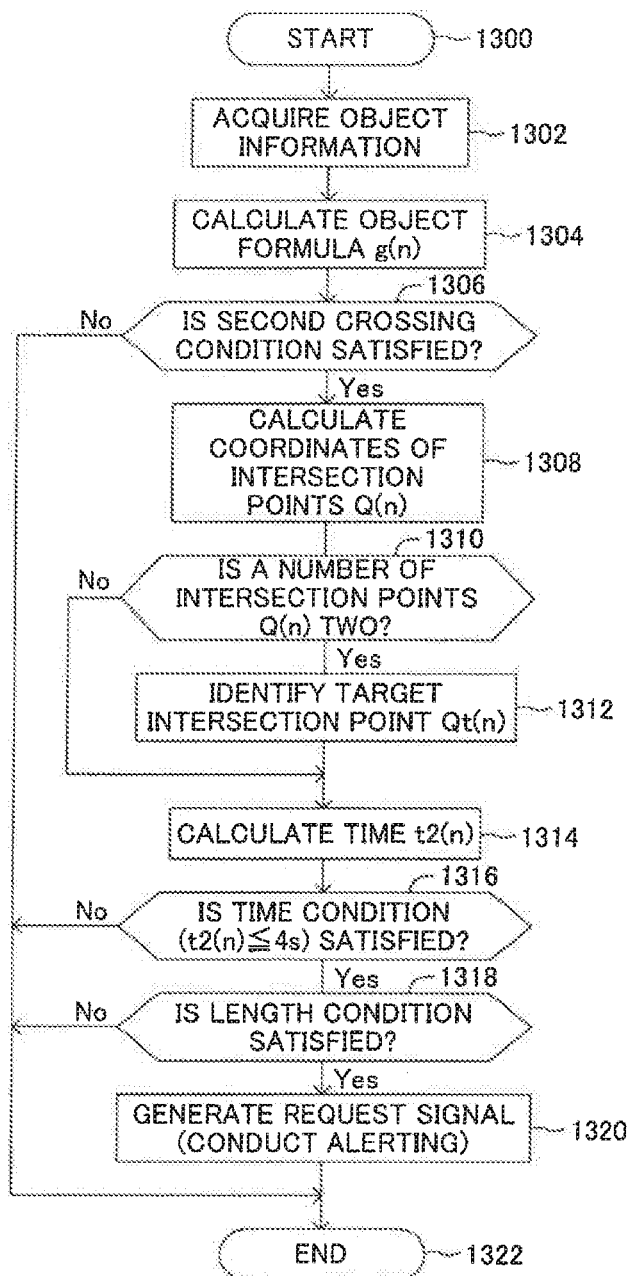
FIG. 13 is a flowchart showing a routine which CPU of a driving support ECU of the second embodiment apparatus performs.

Next, a specific operation of the second embodiment apparatus will be described. CPU of the DSECU 10 of the second embodiment apparatus is configured to perform a routine shown by a flowchart in FIG. 13 in the step 628 in FIG. 6. It should be noted that in this routine, a case where the object information is acquired regarding one object will be described, however, when the object information is acquired regarding a plurality of objects, this routine is repeated for each object information. When the CPU proceeds to the step 628, the CPU starts processing with a step 1300 in FIG. 13, and performs processes of a step 1302 and a step 1304 stated below in order.

Step 1302: The CPU acquires the object information of the nth period of the object which exists around the vehicle 100 as described above, and stores it in the RAM of the DSECU 10.

Step 1304: The CPU calculates the expected route formula g(n) of the nth period of the object based on the object information acquired at the step 1302, and stores it in the RAM of the DSECU 10.

Next, the CPU proceeds to a step 1306 to determine whether or not the expected route formula g(n) of the object calculated at the step 1304 satisfies the second crossing condition. When the second crossing condition is satisfied, the CPU makes an "Yes" determination at the step 1306, and performs a process of a following step 1308.

Step 1308: When a straight line expressed by the formula g(n) crosses the left side expected route and the right side expected route at four intersection points, the CPU calculates coordinates of the intersection points Q1(n) and Q2(n) out of those intersection points as described above. On the other hand, when a straight line expressed by the formula g(n) crosses the left side expected route and/or the right side expected route at two intersection points, the CPU calculates a coordinate of the intersection point Q(n) out of those intersection points. The CPU stores the coordinates of the intersection points Q1(n) and Q2(n) or the intersection point Q(n) in the RAM of the DSECU 10.

Next, the CPU proceeds to a step 1310 to determine whether or not a number of the intersection points calculated at the step 1308 is two. When the number of the intersection points is two (that is, when the coordinates of the intersection points Q1(n) and Q2(n) are calculated), the CPU makes an "Yes" determination at the step 1310, and perform processes of a step 1312 and a step 1314 stated below in order. On the other hand, when the number of the intersection points is one (that is, when the coordinate of the intersection point Q(n) is calculated), the CPU makes a "No" determination at the step 1310, and proceeds directly to the step 1314.

Step 1312: The CPU identifies the target intersection point Qt(n) out of two intersection points Q1(n) and Q2(n) calculated at the step 1308 as described above. The CPU updates the coordinate of "either the intersection point Q1(n) or Q2(n)" identified as the target intersection point Qt(n) to a coordinate of the target intersection point Qt(n), and stores it in the RAM.

Step 1314: The CPU calculates the time t2(n) required for the object to reach the intersection point Qt(n) or the intersection point Q(n) as described above, and stores it in the RAM of the DSECU 10.

Subsequently, the CPU proceeds to a step 1316 to determine whether or not the time t2(n) calculated at the step 1314 satisfies the time condition (t2(n)≤4 s (=the second predetermined time)). When the time condition is satisfied, the CPU makes an "Yes" determination at the step 1316, and proceeds to a step 1318.

At the step 1318, the CPU determines whether or not any one of the above formulae (42) to (45) (the length condition) is satisfied. When the length condition is satisfied, the CPU makes an "Yes" determination (that is, determines that there exists a target object), and performs a process of a following step 1320.

Step 1320: The CPU generates the request signal to alert the driver of the vehicle 100 to transmit this request signal to the display CPU and the warning CPU. Thereby, the alerting is performed by the display apparatus 21 and the buzzer 31. After finishing the process of the step 1320, the CPU proceeds to the step 629 in FIG. 7 via a step 1322 to tentatively terminate the present routine.

In contrast, when the formula g(n) calculated at the step 1304 does not satisfy the second crossing condition, the CPU makes a "No" determination at the step 1306 (that is, determines that there does not exist a target object). Thereafter, the CPU proceeds to the step 629 in FIG. 7 via the step 1322 to tentatively terminate the present routine. Similarly, when the time t2(n) calculated at the step 1314 does not satisfy the above time condition, the CPU makes a "No" determination at the step 1316 (that is, determines that there does not exist a target object), and proceeds to the step 629 in FIG. 7 via the step 1322 to tentatively terminate the present routine. Further, when the length condition is not satisfied at the step 1318, the CPU makes a "No" determination at the step 1318 (that is, determines that there does not exist a target object), and proceeds to the step 629 in FIG. 7 via the step 1322 to tentatively terminate the present routine.

The second embodiment apparatus has a similar effects to the first embodiment apparatus.

It should be noted that in the second embodiment apparatus, the calculation method of the turning radius R is the same as that of the first embodiment apparatus. However, the calculation method of the turning radius described in the modification example of the first embodiment apparatus can be applied to the second embodiment apparatus.

The driving support apparatuses according to the embodiments and the modification example have been described. However, the present invention is not limited to them and may adopt various modifications within a scope of the present invention.

For example, the driving support apparatus may be configured to estimate one or more than or equal to three expected routes instead of estimating two expected routes of the left side and the right side expected routes. Expected routes are not limited to routes through which the left end OL and the right end OR of the vehicle 100 are expected to pass (that is, the left side and the right side expected routes). For example, the expected route may be a route through which the position O of the vehicle 100 is expected to pass. In this case, the position O of the vehicle 100 is not limited to a center between the left end OL and the right end OR of the vehicle 100, but may be positioned at a center of the front end part of the vehicle 100 in the vehicle width direction.

The driving support apparatus can alert the driver when the vehicle 100 turns left or right at turning places other than an intersection (for example, a road adjacent to an entrance of a parking area, a parking area, and the like).

The driving support apparatus may comprise a GNSS receiver, and a map information may be stored in the memory. The driving support apparatus may determine whether or not the vehicle 100 is positioned at the turning place by a self position estimation by GNSS. When it is determined that the vehicle 100 is positioned at the turning place, the driving support apparatus may calculate a "predetermined angle for calculating the remaining turning angle" for each turning place based on a shape of the turning place described in the map information. In this case, at a place incapable of estimating a self position by GNSS, following configurations may be added, that is, a configuration where a determination of whether or not the vehicle 100 is positioned at the turning place is made by the methods described in the aforementioned embodiments and the modification example and a configuration where the predetermined angle is set to 90°.

The driving support apparatus may comprise an on-vehicle machine capable of communicating with a roadside machine provided at the turning place. The driving support apparatus may determine whether or not the vehicle 100 is positioned at the turning place by performing wireless communication with the roadside machine. When it is determined that the vehicle 100 is positioned at the turning place, the driving support apparatus may calculate a "predetermined angle for calculating the remaining turning angle" for each turning place. In this case as well, at a place incapable of estimating a self position by wireless communication, the following configurations may be added, that is, the configuration where a determination of whether or not the vehicle 100 is positioned at the turning place is made by the methods described in the aforementioned embodiments and the modification example and the configuration where the predetermined angle is set to 90°.

In the aforementioned embodiments and the modification example, the condition to start turning left comprises three conditions from the conditions Ls1 to Ls3, and is satisfied when any one of the three conditions is satisfied. However, the condition to start turning left may be configured to comprise one or two conditions among the conditions Ls1 to Ls3, and be satisfied when this one condition or either one of the two conditions is satisfied. That is, for example, the condition to start turning left may be configured to comprise the conditions Ls1 and Ls2, and be satisfied when either one of these two conditions is satisfied. The same configuration can be applied to the condition to start turning right.

In the aforementioned embodiments, the condition to start a turning-left-state is satisfied when all of the conditions Lt1 to Lt6 are satisfied. However, for example, the condition to start a turning-left-state may be satisfied when at least the conditions Lt1 and Lt4 are satisfied. The same manner can be applied to the condition to start a turning-right-state.

The driving support apparatus may use a value estimated from the lateral acceleration Gy and the vehicle speed V as the yaw rate Y instead of using the value detected by the yaw rate sensor 17 as the yaw rate Y, or may use a value estimated from the steering angle θsw and the vehicle speed V as the yaw rate Y.

The processes of the steps 616 and 816 may be omitted. That is, the driving support apparatus may be configured to determine that the vehicle 100 finishes turning left or right only when a state of a pair of the direction indicators has changed from the blinking state to the unlit state.

The driving support apparatus may acquire the object information using a camera or the roadside machine instead of the front radar sensors 16L, 16R.

The driving support apparatus may be mounted in a vehicle traveling on a right side of a road, not in a vehicle traveling on a left side of a road.

The invention claimed is:

1. A driving support apparatus comprising:
object information acquisition means for acquiring object information including a position of an object existing around an own vehicle with respect to said own vehicle, a moving direction of said object, and a moving speed of said object, using a first sensor apparatus mounted in said own vehicle;
own vehicle information acquisition means for acquiring own vehicle information including an own vehicle speed which is a vehicle speed of said own vehicle, a yaw rate of said own vehicle, and a direction indicator signal showing a state of a direction indicator of said own vehicle, using a second sensor apparatus mounted in said own vehicle;
turning-right-or-left-start-determination-means for determining whether or not said own vehicle is trying to start turning left or right based on said own vehicle information;
expected route estimation means for estimating an expected route of said own vehicle at a current point in time based on said own vehicle speed and said yaw rate upon determining that said own vehicle is trying to start turning left or right;
alert request means for generating a request signal to alert a driver of said own vehicle based on said object information and said expected route; and
alerting means for conducting an operation to alert said driver in response to said request signal, wherein:
said expected route estimation means is configured to use a formula of a circle as an expected route formula expressing said expected route,
a center of said circle is positioned at a position shifted from a current position of said own vehicle in a direction perpendicular to a traveling direction of said own vehicle at a current point in time by a length of an estimated turning radius estimated using at least said yaw rate at said current point in time to a left side with respect to said traveling direction when said own vehicle is turning left and to a right side with respect to said traveling direction when said own vehicle is turning right,
a radius of said circle is said estimated turning radius, and
said alert request means is configured to:
calculate a turning angle of said own vehicle from a point in time upon determining that said own vehicle is trying to start turning left or right by said turning-right-or-left-start-determination-means to said current point in time, using at least said yaw rate;
calculate a value based on a product of said estimated turning radius and a remaining turning angle, which is an angle obtained by subtracting said calculated turning angle from a predetermined angle, as an effective length of said expected route;
determine whether or not a target object of alerting exists, which is an object that crosses a part within said effective length of said expected route within a predetermined time, using said object information; and
generate said request signal upon determining that said target object of alerting exists.

2. The driving support apparatus according to claim 1, wherein:
said turning-right-or-left-start-determination-means is configured to determine that said own vehicle is trying to start turning left or right upon determining that any one of at least one of following three conditions is satisfied:
a first condition which is satisfied in a case when said direction indicator signal shows that said direction indicator has changed from a non-operating state to an operating state when own vehicle speed is more than or equal to a predetermined first vehicle speed threshold and is less than or equal to a predetermined second vehicle speed threshold greater than said first vehicle speed threshold,
a second condition which is satisfied in a case when said own vehicle speed has become more than or equal to said first vehicle speed threshold and less than or equal to said second vehicle speed threshold when said direction indicator signal shows that said direction indicator is in said operating state, and
a third condition which is satisfied in a case when said direction indicator signal shows that said direction indicator has changed from said non-operating state to said operating state at a same time of said own vehicle speed becoming more than or equal to said first vehicle speed threshold and less than or equal to said second vehicle speed threshold.

3. The driving support apparatus according to claim 2, wherein:
said expected route estimation means is configured to:
estimate a left side expected route through which a left end of said own vehicle at said current point in time is expected to pass and a right side expected route through which a right end of said own vehicle at said current point in time is expected to pass as said expected routes; and
use a formula of a circle as a left side expected route formula expressing said left side expected route and a right side expected route formula expressing said right side expected route,
a center of a circle of said left side expected route formula is positioned at a position shifted from said left end of said own vehicle in a direction perpendicular to a traveling direction of said own vehicle at said current point in time by a length of a left side turning radius which is a turning radius of said left end calculated as said estimated turning radius to a left side with respect to said traveling direction when said own vehicle is turning left and to a right side with respect to said traveling direction when said own vehicle is turning right, and a radius of said circle is said left side turning radius,
a center of a circle of said right side expected route formula is positioned at a position shifted from said right end of said own vehicle in a direction perpendicular to a traveling direction of said own vehicle at said current point in time by a length of a right side turning radius which is a turning radius of said right end calculated as said estimated turning radius to a left side with respect to said traveling direction when said own vehicle is turning left and to a right side with respect to said traveling direction when said own vehicle is turning right, and a radius of said circle is said right side turning radius, and
said alert request means is configured to:
calculate a value based on a product of said left side turning radius and said remaining turning angle as said effective length of said left side expected route; and
calculate a value based on a product of said right side turning radius and said remaining turning angle as said effective length of said right side expected route.

4. The driving support apparatus according to claim 3, wherein:
said alert request means is configured to:
calculate a formula of a straight line extending toward a moving direction of said object at said current point in time based on said object information acquired by said object information acquisition means;
in a case when a straight line expressed by said formula of said straight line crosses at least one of a part within said effective length of said left side expected route and a part within said effective length of said right side expected route at one or two first intersection points:
when a number of said first intersection points is two, calculate a first time required for said object to reach a first intersection point at which said straight line first crosses in said moving direction of said object at said current point in time, and when said number of said first intersection points is one, calculate said first time required for said object to reach said first intersection point; and
in a case when a time condition that said first time is less than or equal to a first predetermined time is satisfied, determine that there exists said target object of alerting, and generate said request signal.

5. The driving support apparatus according to claim 3, wherein said alert request means is configured to:
calculate a formula of a straight line extending toward a moving direction of said object at said current point in time based on said object information acquired by said object information acquisition means;
in a case when a straight line expressed by said formula of a straight line crosses at least one of a first circle expressed by said left side expected route formula and a second circle expressed by said right side expected route formula at two or four second intersection points:
when a number of said second intersection points is four,
identify two second intersection points from among said four second intersection points at which said straight line expressed by said formula of a straight line crosses said first circle or said second circle at a portion where said straight line enters a target region which is a region between said first circle and said second circle from outside said target region in said moving direction of said object at said current point in time,
compare a length of said left side expected route from said left end of said own vehicle to an intersection point positioned on said left side expected route among said two identified intersection points in a turning direction of said own vehicle with a length of said right side expected route from said right end of said own vehicle to an intersection point positioned on said right side expected route among said two identified intersection points in a turning direction of said own vehicle,
extract an intersection point with a shorter length from among said two intersection points as a target intersection point, and
calculate a second time required for said object to reach said extracted target intersection point, and
when said number of said second intersection points is two,
extract a second intersection point from among said two second intersection points at which said straight line expressed by said formula of a straight line crosses said first circle or said second circle at a portion where said straight line enters said target region from outside said target region in said moving direction of said object at a current point in time, and
calculate a second time required for said object to reach said extracted intersection point,
determine whether or not a time condition that said second time is less than or equal to second predetermined time is satisfied, and
in a case when a length condition is satisfied, said length condition being a condition that a length of said left side expected route from said left end of said own vehicle to an intersection point at which said time condition is determined to be satisfied in a turning direction of said own vehicle is less than or equal to said left side effective length of said left side expected route when said determined intersection point is positioned on said left side expected route, or a length of said right side expected route from said right end of said own vehicle to an intersection point at which said time condition is determined to be satisfied in a turning direction of said own vehicle is less than or equal to said right side effective length of said right side expected route when said determined intersection point is positioned on said right side expected route, determine that there exists said target object of alerting, and generate said request signal.

6. A driving support apparatus comprising:
a driving support electronic control unit configured to:
  acquire object information including a position of an object existing around an own vehicle with respect to said own vehicle, a moving direction of said object, and a moving speed of said object, using a first sensor apparatus mounted in said own vehicle;
  acquire own vehicle information including an own vehicle speed which is a vehicle speed of said own vehicle, a yaw rate of said own vehicle, and a direction indicator signal showing a state of a direction indicator of said own vehicle, using a second sensor apparatus mounted in said own vehicle;
  determine whether or not said own vehicle is trying to start turning left or right based on said own vehicle information;
  estimate an expected route of said own vehicle at a current point in time based on said own vehicle speed and said yaw rate upon determining that said own vehicle is trying to start turning left or right, where a formula of a circle is used as an expected route formula expressing said expected route; and
  generate a request signal to alert a driver of said own vehicle based on said object information and said expected route; and
a warning electronic control unit configured to conduct an operation to alert said driver in response to said request signal, wherein:
  a center of said circle is positioned at a position shifted from a current position of said own vehicle in a direction perpendicular to a traveling direction of said own vehicle at a current point in time by a length of an estimated turning radius estimated using at least said yaw rate at said current point in time to a left side with respect to said traveling direction when said own vehicle is turning left and to a right side with respect to said traveling direction when said own vehicle is turning right,
  a radius of said circle is said estimated turning radius, and
  said driving support electronic control unit is configured to:
    calculate a turning angle of said own vehicle from a point in time upon determining that said own vehicle is trying to start turning left or right to said current point in time, using at least said yaw rate;
    calculate a value based on a product of said estimated turning radius and a remaining turning angle, which is an angle obtained by subtracting said calculated turning angle from a predetermined angle, as an effective length of said expected route;
    determine whether or not a target object of alerting exists, which is an object that crosses a part within said effective length of said expected route within a predetermined time, using said object information; and
    generate said request signal upon determining that said target object of alerting exists.

7. The driving support apparatus according to claim 6, wherein:
said driving support electronic control unit is configured to determine that said own vehicle is trying to start turning left or right upon determining that any one of at least one of following three conditions is satisfied:
  a first condition which is satisfied in a case when said direction indicator signal shows that said direction indicator has changed from a non-operating state to an operating state when own vehicle speed is more than or equal to a predetermined first vehicle speed threshold and is less than or equal to a predetermined second vehicle speed threshold greater than said first vehicle speed threshold,
  a second condition which is satisfied in a case when said own vehicle speed has become more than or equal to said first vehicle speed threshold and less than or equal to said second vehicle speed threshold when said direction indicator signal shows that said direction indicator is in said operating state, and
  a third condition which is satisfied in a case when said direction indicator signal shows that said direction indicator has changed from said non-operating state to said operating state at a same time of said own vehicle speed becoming more than or equal to said first vehicle speed threshold and less than or equal to said second vehicle speed threshold.

8. The driving support apparatus according to claim 7, wherein:
said driving support electronic control unit is configured to:
  estimate a left side expected route through which a left end of said own vehicle at said current point in time is expected to pass and a right side expected route through which a right end of said own vehicle at said current point in time is expected to pass as said expected routes; and
  use a formula of a circle as a left side expected route formula expressing said left side expected route and a right side expected route formula expressing said right side expected route,
a center of a circle of said left side expected route formula is positioned at a position shifted from said left end of said own vehicle in a direction perpendicular to a traveling direction of said own vehicle at said current point in time by a length of a left side turning radius which is a turning radius of said left end calculated as said estimated turning radius to a left side with respect to said traveling direction when said own vehicle is turning left and to a right side with respect to said traveling direction when said own vehicle is turning right, and a radius of said circle is said left side turning radius,
a center of a circle of said right side expected route formula is positioned at a position shifted from said right end of said own vehicle in a direction perpendicular to a traveling direction of said own vehicle at said current point in time by a length of a right side turning radius which is a turning radius of said right end calculated as said estimated turning radius to a left side with respect to said traveling direction when said own vehicle is turning left and to a right side with respect to said traveling direction when said own vehicle is turning right, and a radius of said circle is said right side turning radius, and said driving support electronic control unit is configured to:
calculate a value based on a product of said left side turning radius and said remaining turning angle as said effective length of said left side expected route; and calculate a value based on a product of said right side turning radius and said remaining turning angle as said effective length of said right side expected route.

9. The driving support apparatus according to claim 8, wherein:

said driving support electronic control unit is configured to:
calculate a formula of a straight line extending toward a moving direction of said object at said current point in time based on said acquired object information;

in a case when a straight line expressed by said formula of said straight line crosses at least one of a part within said effective length of said left side expected route and a part within said effective length of said right side expected route at one or two first intersection points:
when a number of said first intersection points is two, calculate a first time required for said object to reach a first intersection point at which said straight line first crosses in said moving direction of said object at said current point in time, and
when said number of said first intersection points is one, calculate said first time required for said object to reach said first intersection point; and in a case when a time condition that said first time is less than or equal to a first predetermined time is satisfied, determine that there exists said target object of alerting, and generate said request signal.

10. The driving support apparatus according to claim 8, wherein said driving support electronic control unit configured to:
calculate a formula of a straight line extending toward a moving direction of said object at said current point in time based on said acquired object information;
in a case when a straight line expressed by said formula of a straight line crosses at least one of a first circle expressed by said left side expected route formula and a second circle expressed by said right side expected route formula at two or four second intersection points:
when a number of said second intersection points is four,
identify two second intersection points from among said four second intersection points at which said straight line expressed by said formula of a straight line crosses said first circle or said second circle at a portion where said straight line enters a target region which is a region between said first circle and said second circle from outside said target region in said moving direction of said object at said current point in time, compare a length of said left side expected route from said left end of said own vehicle to an intersection point positioned on said left side expected route among said two identified intersection points in a turning direction of said own vehicle with a length of said right side expected route from said right end of said own vehicle to an intersection point positioned on said right side expected route among said two identified intersection points in a turning direction of said own vehicle, extract an intersection point with a shorter length from among said two intersection points as a target intersection point, and calculate a second time required for said object to reach said extracted target intersection point, and
when said number of said second intersection points is two,
extract a second intersection point from among said two second intersection points at which said straight line expressed by said formula of a straight line crosses said first circle or said second circle at a portion where said straight line enters said target region from outside said target region in said moving direction of said object at a current point in time, and calculate a second time required for said object to reach said extracted intersection point, determine whether or not a time condition that said second time is less than or equal to second predetermined time is satisfied, and in a case when a length condition is satisfied, said length condition being a condition that a length of said left side expected route from said left end of said own vehicle to an intersection point at which said time condition is determined to be satisfied in a turning direction of said own vehicle is less than or equal to said left side effective length of said left side expected route when said determined intersection point is positioned on said left side expected route, or a length of said right side expected route from said right end of said own vehicle to an intersection point at which said time condition is determined to be satisfied in a turning direction of said own vehicle is less than or equal to said right side effective length of said right side expected route when said determined intersection point is positioned on said right side expected route, determine that there exists said target object of alerting, and generate said request signal.

* * * * *